(12) United States Patent
Fujikawa

(10) Patent No.: US 12,436,435 B2
(45) Date of Patent: Oct. 7, 2025

(54) LIQUID CRYSTAL APPARATUS AND ELECTRONIC DEVICE

(71) Applicant: SEIKO EPSON CORPORATION, Tokyo (JP)

(72) Inventor: Shinsuke Fujikawa, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/619,194

(22) Filed: Mar. 28, 2024

(65) Prior Publication Data

US 2024/0329475 A1    Oct. 3, 2024

(30) Foreign Application Priority Data

Mar. 29, 2023    (JP) ................................ 2023-052655

(51) Int. Cl.
     *G02F 1/1362*      (2006.01)

(52) U.S. Cl.
     CPC .. *G02F 1/136286* (2013.01); *G02F 1/136254* (2021.01)

(58) Field of Classification Search
     CPC ............... G09G 3/006; G09G 2330/12; G09G 2300/0426; G09G 2320/041; G09G 3/02; G09G 2310/08; G09G 2330/02; G09G 3/3614; G09G 3/3648; G09G 3/3655; G06F 3/04164; G02F 2201/121; G02F 1/1345; G02F 1/13452; G02F 1/13454
See application file for complete search history.

(56) References Cited

U.S. PATENT DOCUMENTS

| 2004/0141137 A1 | 7/2004 | Hirabayashi |
| 2009/0267614 A1* | 10/2009 | Inoue .................... G02F 1/1309 445/3 |
| 2011/0065349 A1 | 3/2011 | Lee et al. |
| 2013/0128210 A1 | 5/2013 | Nagasawa |

(Continued)

FOREIGN PATENT DOCUMENTS

| CN | 115274686 A | * 11/2022 |
| JP | H04215048 | 8/1992 |
| JP | H09243979 | 9/1997 |

(Continued)

OTHER PUBLICATIONS

CN-115274686-A (Year: 2022).*

*Primary Examiner* — Sanjiv D. Patel
(74) *Attorney, Agent, or Firm* — JCIPRNET

(57) ABSTRACT

A liquid crystal apparatus includes a first electrode disposed between a first substrate and a liquid crystal layer, a second electrode disposed between a second substrate and the liquid crystal layer, an electrode lead line electrically coupled to the first electrode, a plurality of drive signal lines including a first drive signal line that intersects with the electrode lead line in plan view, a first conductive layer disposed between the electrode lead line and the first drive signal line and electrically coupled to the second electrode, and a measurement circuit, and the measurement circuit supplies a potential to each of the first electrode and the second electrode in a first period and a second period, and stops the supply of the potential to the first electrode and supplies the same potential as that in the second period to the second electrode in a third period.

18 Claims, 18 Drawing Sheets

(56) References Cited

U.S. PATENT DOCUMENTS

2015/0049071 A1    2/2015  Kaneko
2021/0325702 A1   10/2021  Tomikawa et al.

FOREIGN PATENT DOCUMENTS

| JP | 3281763    | 5/2002  |
| JP | 2004110021 | 4/2004  |
| JP | 2010152061 | 7/2010  |
| JP | 2010156916 | 7/2010  |
| JP | 2011059660 | 3/2011  |
| JP | 6103091    | 3/2017  |
| JP | 2021170079 | 10/2021 |
| WO | 2008090786 | 7/2008  |
| WO | 2013154039 | 10/2013 |

* cited by examiner

LIQUID CRYSTAL APPARATUS AND ELECTRONIC DEVICE

The present application is based on, and claims priority from JP Application Serial Number 2023-052655, filed Mar. 29, 2023, the disclosure of which is hereby incorporated by reference herein in its entirety.

BACKGROUND

1. Technical Field

The present disclosure relates to a liquid crystal apparatus and an electronic device.

2. Related Art

Liquid crystal used in a liquid crystal apparatus deteriorates due to long-term application of a DC voltage component. Further, when the liquid crystal apparatus is used as a light valve of a projector, the liquid crystal also deteriorates due to a chemical action caused by incidence of high-intensity light and heat. The deterioration of the liquid crystal is, for example, a phenomenon in which the number of mobile ions including anions and cations increase in the liquid crystal and thus insulation of the liquid crystal decreases. The decrease in insulation appears, for example, as a decrease in voltage holding rate of the liquid crystal and is visually recognized as a display defect such as stains or unevenness in a liquid crystal panel. JP-A-4-215048 discloses a method of accelerating and evaluating such a deterioration phenomenon in liquid crystal. In this method, a pair of electrodes for deterioration evaluation are provided outside a display region of the liquid crystal panel to perform an accelerated test on the liquid crystal panel for 100 hours, a voltage of 5 V is applied between the electrodes for deterioration evaluation for 50 μs, and then, a voltage holding rate after 16.7 ms is measured for evaluation of deterioration of the liquid crystal.

According to the present applicant's research, it has been found that, for example, when an acceleration test with incidence of high-intensity light is performed using a liquid crystal panel, there are a stage in which the number of mobile ions in liquid crystal increases relatively moderately and a stage in which the number of mobile ions in the liquid crystal increases rapidly thereafter. Further, when, for example, UV light other than visible light is incident on the liquid crystal panel, a chemical action is intensified due to high energy of the UV light, and deterioration of the liquid crystal progresses rapidly.

When the number of mobile ions in the liquid crystal becomes larger, occurrence of a problem such as deterioration of display quality of the liquid crystal panel cannot be avoided, and thus from the viewpoint of preventive maintenance, there has been a demand for ascertaining that the liquid crystal panel is reaching an end of its life before the liquid crystal panel reaches the end of the life.

However, the method disclosed in JP-A-4-215048 has a problem that it is difficult to perform preventive maintenance. Specifically, according to the present applicant's verification results, in the method disclosed in JP-A-4-215048, it is difficult to observe a situation in which the number of mobile ions in the liquid crystal gradually increases at a stage in which the number of mobile ions increase relatively moderately.

SUMMARY

A liquid crystal apparatus according to an aspect of the present disclosure includes: a first substrate, a liquid crystal layer, a second substrate facing the first substrate via the liquid crystal layer, a first electrode disposed between the first substrate and the liquid crystal layer, a second electrode disposed between the second substrate and the liquid crystal layer, an electrode lead line disposed between the first substrate and the liquid crystal layer and electrically coupled to the first electrode, a plurality of drive signal lines disposed between the first substrate and the liquid crystal layer and including a first drive signal line intersecting with the electrode lead line in plan view, a first conductive layer disposed between the electrode lead line and the first drive signal line and electrically coupled to the second electrode, and a measurement circuit electrically coupled to each of the first electrode and the second electrode, wherein the measurement circuit supplies a potential to each of the first electrode and the second electrode so that a potential difference between the first electrode and the second electrode becomes a first potential difference in a first period, supplies a potential to each of the first electrode and the second electrode so that the potential difference becomes a second potential difference having a polarity different from that of the first potential difference in a second period after the first period, and stops the supply of the potential to the first electrode and supplies the same potential to the second electrode as that in the second period in a third period after the second period.

A liquid crystal apparatus according to an aspect of the present disclosure includes: a first substrate, a liquid crystal layer, a second substrate facing the first substrate via the liquid crystal layer, a first electrode disposed between the first substrate and the liquid crystal layer, a second electrode disposed between the second substrate and the liquid crystal layer, a plurality of drive signal lines disposed between the first substrate and the liquid crystal layer and including a second drive signal line at least a portion of which overlaps the first electrode in plan view, a measurement circuit electrically coupled to each of the first electrode and the second electrode, and a first control circuit configured to control potentials of the plurality of drive signal lines, wherein the measurement circuit supplies a potential to each of the first electrode and the second electrode so that a potential difference between the first electrode and the second electrode becomes a first potential difference in a first period, supplies a potential to each of the first electrode and the second electrode so that the potential difference becomes a second potential difference having a polarity different from that of the first potential difference in a second period after the first period, and stops the supply of the potential to the first electrode and supplies the same potential to the second electrode as that in the second period in a third period after the second period, and the first control circuit controls the potential of the second drive signal line to be constant at least in the third period.

An electronic device according to an aspect of the present disclosure includes the liquid crystal apparatus according to the aspect.

DESCRIPTION OF EMBODIMENTS

Hereinafter, embodiments of the present disclosure are described with reference to the drawings. Here, in each drawing to be described below, sizes of respective members may be different from the actual sizes in order to make each member a recognizable size. Further, in each drawing below, when necessary, XYZ axes are used as coordinate axes orthogonal to each other, and in each drawing, a direction indicated by each arrow along the axis is set as a + direction, and a direction opposite to the + direction is set as a − direction.

1. First Embodiment

1-1. Overview of Configuration of Liquid Crystal Panel 100

Figure 1:
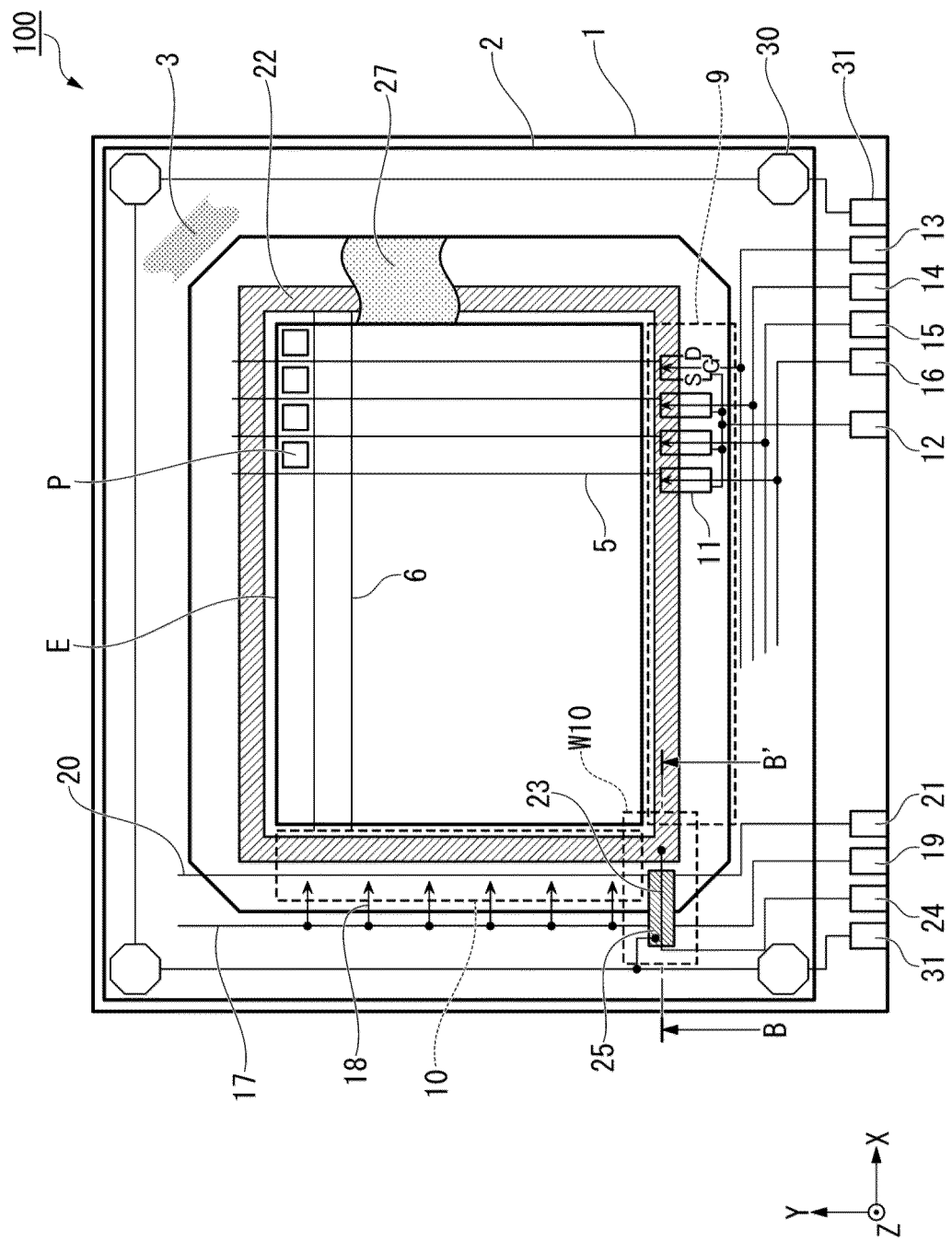
FIG. 1 is a plan view illustrating a schematic configuration of a liquid crystal panel used in a liquid crystal apparatus according to a first embodiment.

FIG. 1 is a plan view illustrating a schematic configuration of a liquid crystal panel 100 used in a liquid crystal apparatus 1000 of a first embodiment. In FIG. 1, a +X direction may be referred to as rightward or a right side, and a −X direction may be referred to as leftward or a left side. Further, a +Y direction is referred to as an upward or upper side, and a −Y direction is referred to as a downward or lower side. Further, viewing from a +Z direction is called a plan view or planar manner.

For example, the liquid crystal panel 100 according to the present embodiment is an active drive type liquid crystal panel in which a plurality of pixels P having a pixel switching element 8 such as a thin film transistor (TFT) are disposed in a display region E. The liquid crystal panel 100 constitutes the liquid crystal apparatus 1000 in combination with a measurement circuit 200 which will be described below, and can be appropriately used as a light modulation apparatus in a projection-type display apparatus serving as an electronic device, or the like.

The liquid crystal panel 100 includes an element substrate 1 and a facing substrate 2. The element substrate 1 and the facing substrate 2 are bonded to each other via a sealing material 3. The sealing material 3 is provided in a frame shape along an outer edge of the facing substrate 2. The sealing material 3 is an adhesive made of photocurable resin, thermosetting resin, or the like, and contains a gap material such as a glass fiber or a glass bead for setting a gap between the element substrate 1 and the facing substrate 2 to a predetermined size. In FIG. 1, only a part of the sealing material 3 is illustrated, and the remaining part of the sealing material 3 is omitted appropriately.

Although not illustrated in FIG. 1, a liquid crystal layer 4 is disposed in a region sandwiched between the element substrate 1 and the facing substrate 2 and surrounded by the sealing material 3. The liquid crystal layer 4 will be described below with reference to FIG. 2. For example, the liquid crystal layer 4 is formed by using a liquid crystal dropping method of dropping liquid crystal. When the liquid crystal layer 4 is formed by using the liquid crystal dropping method, a liquid crystal inlet for filling the liquid crystal is not present in the liquid crystal panel 100. The liquid crystal layer 4 is configured of, for example, liquid crystal having negative dielectric anisotropy.

The element substrate 1 includes a display region E in the region surrounded by the sealing material 3. In the display region E, the plurality of pixels P are disposed in a matrix shape. In the display region E, a plurality of signal lines 5 extending in a Y-axis direction are disposed at regular intervals in the X-axis direction. In the display region E, a plurality of scanning lines 6 extending in the X-axis direction are disposed at regular intervals in the Y-axis direction. Each pixel P is disposed to correspond to one position at which the signal lines 5 and the scanning lines 6 intersect with each other.

Although not illustrated in FIG. 1, each pixel P includes a pixel electrode 7 having a light transmitting property and the pixel switching element 8 disposed to correspond to the pixel electrode 7. The pixel electrode 7 and the pixel switching element 8 will be described below with reference to FIG. 2. The pixel electrode 7 is a transparent electrode formed of a transparent conductive material such as indium tin oxide (ITO), for example. The pixel switching element 8 is, for example, an N-channel TFT.

For example, each signal line 5 is electrically coupled to a source of the pixel switching element 8 of each pixel P corresponding to each signal line 5. Each scanning line 6 is electrically coupled to a gate of the pixel switching element 8 of each pixel P corresponding to each scanning line 6. In each pixel P, a drain of the pixel switching element 8 is electrically coupled to the pixel electrode 7.

The element substrate 1 includes a signal line drive circuit 9 and a scanning line drive circuit 10. In a region between the display region E and the sealing material 3, the signal line drive circuit 9 is disposed on the lower side of the display region E, and the scanning line drive circuit 10 is disposed on the left side of the display region E. A lower end of each signal line 5 is electrically coupled to the signal line drive circuit 9. A left end of each scanning line 6 is electrically coupled to the scanning line drive circuit 10.

For example, the signal line drive circuit 9 includes a plurality of demultiplexers. For example, each demultiplexer includes four switching elements 11. FIG. 1 illustrates only the four switching elements 11 included in the demultiplexer located on the rightmost side among the plurality of demultiplexers included in the signal line drive circuit 9. For example, the switching element 11 is an N-channel TFT, similarly to the pixel switching element 8.

A drain (D) of each switching element 11 is electrically coupled to the signal line 5 corresponding to each switching element 11. A source(S) of each switching element 11 is electrically coupled to a video signal terminal 12. The video signal terminal 12 is one of a plurality of mounting terminals disposed at a lower end portion of the element substrate 1, and is used as an input terminal for the video signal VID.

A gate (G) of the rightmost switching element 11 among the four switching elements 11 is electrically coupled to a first selection signal terminal 13. The first selection signal terminal 13 is one of the plurality of mounting terminals and is used as an input terminal for the first selection signal SEL1.

The gate of the switching element 11 located second from the right among the four switching elements 11 is electrically coupled to a second selection signal terminal 14. The second selection signal terminal 14 is one of the plurality of mounting terminals and is used as an input terminal for the second selection signal SEL2.

The gate of the switching element 11 located third from the right among the four switching elements 11 is electrically coupled to a third selection signal terminal 15. The third selection signal terminal 15 is one of the plurality of mounting terminals and is used as an input terminal for the third selection signals SEL3.

The gate of the leftmost switching element 11 among the four switching elements 11 is electrically coupled to a fourth selection signal terminal 16. The fourth selection signal terminal 16 is one of the plurality of mounting terminals and is used as an input terminal for the fourth selection signal SEL4.

The four switching elements 11 included in one demultiplexer are controlled to be turned on or off according to the first to fourth selection signals SEL1 and SEL4. In one horizontal period, each switching element 11 is exclusively controlled so that switching element 11 is turned on, and the video signal VID is distributed and input to the video signal terminal 12 in synchronization with an on-timing of each switching element 11, so that a desired video signal VID is supplied to each signal line 5.

In order to ensure writing capability suitable for high-speed driving of the liquid crystal panel 100, a channel width of each switching element 11 is large. Therefore, typically, a disposition in which the gate electrode of each switching element 11 extends in the Y-axis direction is often used. The signal line drive circuit 9 is configured of the plurality of demultiplexers including the four switching elements 11 as described above. In other words, the signal line drive circuit 9 includes a plurality of switching elements 11 electrically coupled to the plurality of signal lines 5 on a one-to-one basis.

For example, when the liquid crystal panel 100 is a full-high definition (FHD) panel, the signal line drive circuit 9 includes 1920/4=480 demultiplexers. For example, when each demultiplexer includes eight switching elements 11, the signal line drive circuit 9 includes 1920/8=240 demultiplexers.

For example, the scanning line drive circuit 10 is configured of a sequential selection circuit such as a shift register. Therefore, typically, a clock signal main line 17 which is a main wiring of the clock signal CLY extends in the Y-axis direction, and a plurality of clock signal branch lines 18 for supplying the clock signal CLY to a unit circuit of each shift register extend from the clock signal main line 17 to the right side. The clock signal main line 17 is electrically coupled to a clock signal terminal 19. The clock signal terminal 19 is one of the plurality of mounting terminals and is used as an input terminal for the clock signal CLY.

Although FIG. 1 illustrates a configuration in which the clock signal CLY input to the clock signal terminal 19 is directly supplied to the scanning line drive circuit 10, a configuration in which the clock signal CLY input to the clock signal terminal 19 is set to a low-amplitude signal, is converted into a high-amplitude signal by a level shift circuit disposed on the element substrate 1, and is supplied to the scanning line drive circuit 10 may be adopted.

Although FIG. 1 illustrates a configuration in which one clock signal CLY is supplied to the scanning line drive circuit 10, a configuration in which an inverted signal CLYB of the clock signal CLY is supplied to the scanning line drive circuit 10 together with the clock signal CLY may be adopted. In this case, the two clock signals CLY and CLYB are supplied to the shift register via a buffer circuit after a phase difference is adjusted by a phase difference correction circuit.

An output control signal ENBY for shaping a scanning line selection waveform is supplied to the scanning line drive circuit 10 via an output control signal line 20 extending in the Y-axis direction. The output control signal line 20 is electrically coupled to an output control signal terminal 21. The output control signal terminal 21 is one of the plurality of mounting terminals, and is used as an input terminal for the output control signal ENBY. For example, the output control signal ENBY is input to an AND circuit together with an output signal of each stage of the shift register, and an output signal of the AND circuit is supplied to the scanning line 6 via a buffer circuit appropriately as a scanning signal for turning on the pixel switching element 8.

As is understood from the above description, the scanning line drive circuit 10 sequentially selects the plurality of scanning lines 6 disposed in the display region E in synchronization with the clock signal CLY. More specifically, the scanning line drive circuit 10 sequentially supplies a scanning signal to each scanning line 6 in synchronization with the clock signal CLY. A period in which one scanning line 6 is selected, that is, a period in which a scanning signal is supplied to one scanning line 6 is included in one horizontal period.

The element substrate 1 includes a detection electrode 22 disposed in a region between the display region E and the sealing material 3. For example, the detection electrode 22 is formed of a transparent conductive material such as ITO, like the pixel electrode 7. The detection electrode 22 is disposed outside the display region E. The detection electrode 22 is disposed in a frame shape surrounding the display region E. The detection electrode 22 may be formed in a so-called solid film pattern or may be formed by a plurality of pixel electrodes 7 being coupled. The solid film pattern is, for example, an electrode pattern that continuously covers all or part of the region between the display region E and the sealing material 3.

The element substrate 1 includes an electrode lead line 23 electrically coupled to the detection electrode 22. For example, the electrode lead line 23 extends in the X-axis direction from a lower left corner of the detection electrode 22 to the left side. The detection electrode 22 is electrically coupled to a first electrode coupling terminal 24 via the electrode lead line 23. The first electrode coupling terminal 24 is one of a plurality of mounting terminals, and is electrically coupled to a measurement circuit 200 described below.

As illustrated in FIG. 1, the clock signal main line 17, the clock signal branch line 18, and the output control signal line 20 do not overlap the detection electrode 22 in plan view. The clock signal main line 17, the clock signal branch line 18, and the output control signal line 20 are examples of a plurality of drive signal lines. That is, in the first embodiment, the plurality of drive signal lines do not overlap the detection electrode 22 in plan view. As described above, the clock signal main line 17, the clock signal branch line 18, and the output control signal line 20 are electrically coupled to the scanning line drive circuit 10. That is, the plurality of drive signal lines are electrically coupled to the scanning line drive circuit 10. Since the output control signal is input to the AND circuit at the subsequent stage relative to the shift register to which the clock signal is input, a configuration in which the output control signal line 20 is disposed closer to the display region E than the clock signal main line 17 is frequently used.

As described above, the plurality of drive signal lines do not overlap the detection electrode 22 in plan view, but the electrode lead line 23 electrically coupled to the detection electrode 22 intersects with the clock signal main line 17 and the output control signal line 20 in plan view. That is, the plurality of drive signal lines include the clock signal main line 17 and the output control signal line 20 as first drive signal lines intersecting the electrode lead lines 23 in plan view. In the present embodiment, in order to curb a coupling capacitance between the electrode lead line 23 and the first drive signal line, a first conductive layer 25 extending in the X-axis direction is disposed in a region in which the electrode lead line 23 intersects with the first drive signal line. The first conductive layer 25 is disposed between the electrode lead line 23 and the first drive signal line.

A structure of a cross section including the clock signal main line 17, the output control signal line 20, the electrode lead line 23, and the first conductive layer 25 will be described below with reference to FIG. 2. Although not illustrated in FIG. 1, the element substrate 1 includes a first alignment film 26 disposed to cover the detection electrode 22 and the pixel electrode 7. The first alignment film 26 will be described below with reference to FIG. 2.

The facing substrate 2 includes a light shielding member 27 having a light shielding property, a common electrode 28 having a light transmitting property, and a second alignment film 29 disposed to cover the common electrode 28. In FIG. 1, an illustration of the common electrode 28 and the second alignment film 29 is omitted. The common electrode 28 and the second alignment film 29 will be described below with reference to FIG. 2.

The light shielding member 27 is disposed to surround the display region E in plan view. The detection electrode 22 is covered with the light shielding member 27. In FIG. 1, only a part of the light shielding member 27 is illustrated, and the remaining part of the light shielding member 27 is appropriately omitted. The common electrode 28 is formed of a transparent conductive material such as ITO, for example. The common electrode 28 is electrically coupled to two second electrode coupling terminals 31 of the element substrate 1 via transfers 30 disposed to correspond to four corners of the facing substrate 2.

Each of the two second electrode coupling terminals 31 is one of the plurality of mounting terminals disposed at the lower end portion of the element substrate 1, and is used as an input terminal for the common potential Vcom. The common potential Vcom input to the second electrode coupling terminal 31 is supplied to the common electrode 28 via the four transfers 30. The first conductive layer 25 is electrically coupled to the second electrode coupling terminal 31. That is, the first conductive layer 25 is electrically coupled to the common electrode 28. Therefore, the common potential Vcom input to the second electrode coupling terminal 31 is also supplied to the first conductive layer 25.

Although not illustrated, the common potential Vcom input to the second electrode coupling terminal 31 is also supplied to one end of an auxiliary capacitor included in the pixel circuit disposed on the element substrate 1. The common potential Vcom may be supplied to each of the common electrode 28 and the auxiliary capacitor through separate systems. In FIG. 1, the configuration in which one scanning line drive circuit 10 is disposed on the left side of the display region E is illustrated, but in practice, a configuration in which the scanning line drive circuits 10 are disposed on both the left side and the right side of the display region E is often used in order to cope with high-speed driving.

Figure 2:
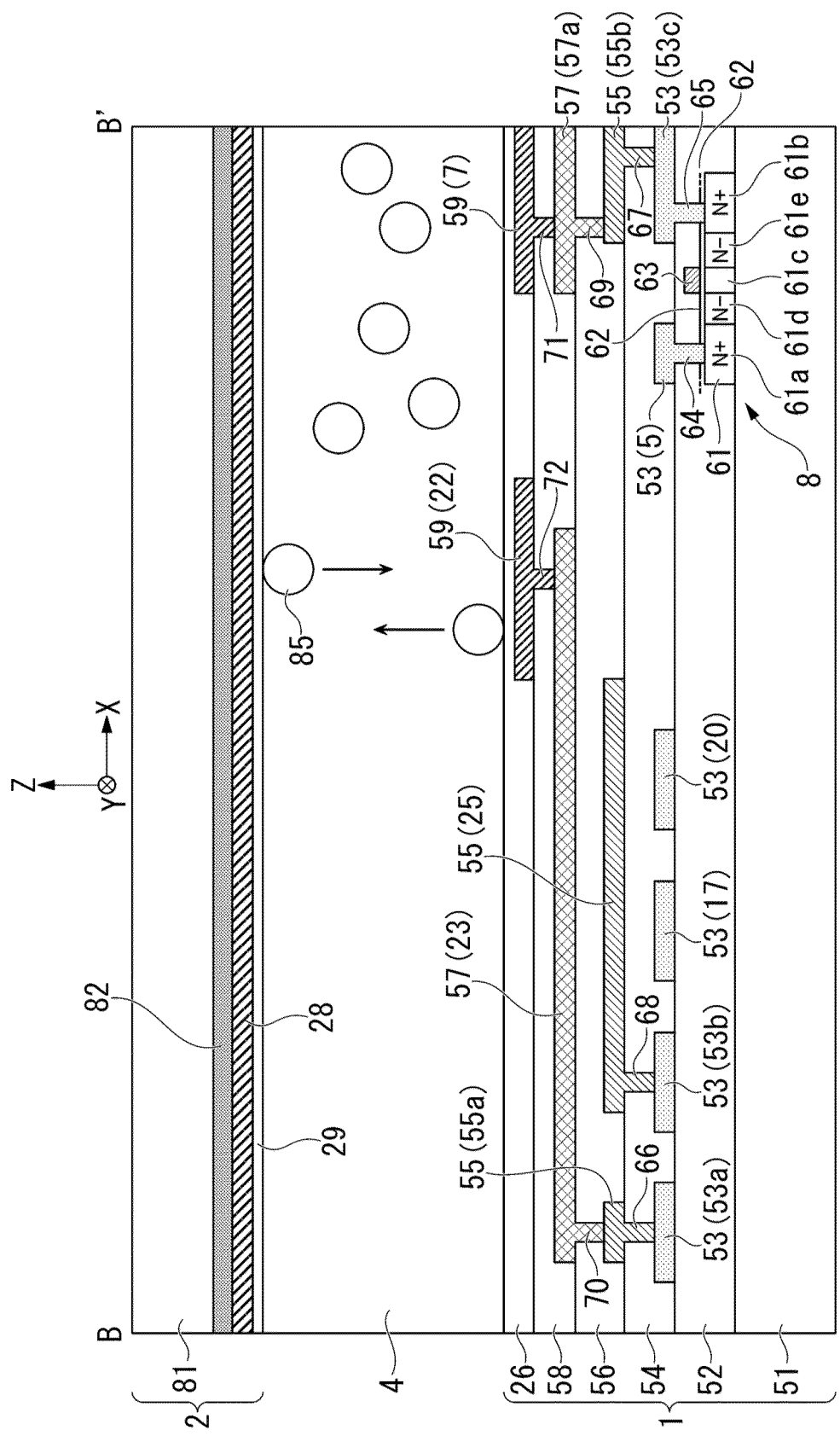
FIG. 2 is a cross-sectional view taken along line B-B' of a region W10 illustrated in FIG. 1.

FIG. 2 is a cross-sectional view taken along line B-B' of a region W10 illustrated in FIG. 1. In FIG. 2, a +Z direction may be referred to as an upward or upper side, and a −Z direction may be referred to as a downward or lower side. Further, in FIG. 2, a +X direction may be referred to as rightward or a right side, and a −X direction may be referred to as leftward or a left side, as in FIG. 1. In FIG. 2, the illustration of the light shielding member 27 (light shielding film 82) is simplified for the sake of description, and it is assumed that the light shielding member 27 is present in the entire region W10.

As illustrated in FIG. 2, the liquid crystal layer 4 is disposed between the element substrate 1 and the facing substrate 2. The element substrate 1 includes a first substrate 51, the pixel switching element 8, a first insulating film 52, a first wiring layer 53, a second insulating film 54, a second wiring layer 55, a third insulating film 56, a third wiring layer 57, a fourth insulating film 58, a transparent electrode layer 59, and the first alignment film 26. The facing substrate 2 includes a second substrate 81, the light shielding film 82, the common electrode 28, and the second alignment film 29.

The first substrate 51 and the second substrate 81 are substrates having a light transmission property. For example, the first substrate 51 and the second substrate 81 are glass substrates, quartz substrates, or the like. The light shielding film 82 is disposed on a lower surface of the second substrate 81 on the liquid crystal layer side, and constitutes the light shielding member 27, a black matrix, and the like. The common electrode 28 is a transparent electrode disposed on the liquid crystal layer side of the light shielding film 82, and is formed of a transparent conductive material such as ITO. The second alignment film 29 is disposed on the liquid crystal layer side of the common electrode 28 and is formed of an inorganic material such as silicon oxide. As described above, the common electrode 28 of the facing substrate 2 is electrically coupled to the second electrode coupling terminal 31 of the element substrate 1 via the transfer 30.

The pixel switching element 8 corresponding to each pixel P is disposed on an upper surface of the first substrate 51. The pixel switching element 8 includes a semiconductor layer 61, a gate insulating film 62, and a gate electrode layer 63. For example, when the pixel switching element 8 is an N-channel TFT, the semiconductor layer 61 typically includes a first high-concentration region 61a, a second high-concentration region 61b, a channel region 61c, a first low-concentration region 61d, and a second low-concentration region 61e.

The first high-concentration region 61a and the second high-concentration region 61b are high-concentration N-type regions in the semiconductor layer 61. The first high-concentration region 61a is a region corresponding to the source of the pixel switching element 8, and the second high-concentration region 61b is a region corresponding to the drain of the pixel switching element 8. The first low-concentration region 61d is a region between the first high-concentration region 61a and the channel region 61c, and is an N-type region having a low concentration. The second low-concentration region 61e is a region between the second high-concentration region 61b and the channel region 61c and is an N-type region having a low concentration.

The gate insulating film 62 is disposed to cover the semiconductor layer 61. The gate electrode layer 63 is disposed on the upper surface of gate insulating film 62 to face the channel region 61c. Although not illustrated in FIG. 2, the gate electrode layer 63 is electrically coupled to the scanning line 6 corresponding to each pixel P. The first insulating film 52 is disposed on the upper surface of the first substrate 51 to cover the pixel switching element 8 configured as described above.

In practice, a pixel circuit of each pixel P includes not only the pixel switching element 8 but also a conductive layer and a dielectric film constituting an auxiliary capacitor, but in FIG. 2, illustration of the auxiliary capacitor is appropriately omitted. Further, in FIG. 2, only a part of the gate insulating film 62 is illustrated, and the remaining part of the gate insulating film 62 is omitted appropriately.

The first wiring layer 53 is disposed on the upper surface of the first insulating film 52. The first wiring layer 53 includes a detection electrode line 53a, a common potential line 53b, a clock signal main line 17, the output control signal line 20, a signal line 5, and a first drain relay line 53c.

The detection electrode line 53a is electrically coupled to the first electrode coupling terminal 24 illustrated in FIG. 1. The common potential line 53b is disposed on the right side of the detection electrode line 53a, and is electrically coupled to the second electrode coupling terminal 31 illustrated in FIG. 1. That is, the common potential line 53b is also electrically coupled to the common electrode 28 of the facing substrate 2 via the transfer 30. The clock signal main line 17 is disposed on the right side of the common potential line 53b and is electrically coupled to the clock signal terminals 19 illustrated in FIG. 1. The output control signal line 20 is disposed on the right side of clock signal main line 17, and is electrically coupled to the output control signal terminal 21 illustrated in FIG. 1.

The signal line 5 is electrically coupled to the first high-concentration region 61a of the semiconductor layer 61, that is, the source of the pixel switching element 8 via a contact hole 64. The first drain relay line 53c is electrically coupled to the second high-concentration region 61b of the semiconductor layer 61, that is, the drain of the pixel switching element 8 via the contact hole 65.

The second insulating film 54 is disposed on the upper surface of the first insulating film 52 to cover the first wiring layer 53 configured as described above. The second wiring layer 55 is disposed on an upper surface of the second insulating film 54. The second wiring layer 55 includes a detection electrode relay line 55a, a second drain relay line 55b, and a first conductive layer 25.

The detection electrode relay line 55a is electrically coupled to the detection electrode line 53a via the contact hole 66. The second drain relay line 55b is electrically coupled to the first drain relay line 53c via a contact hole 67. The first conductive layers 25 is electrically coupled to the common potential line 53b via a contact hole 68. That is, the first conductive layers 25 are electrically coupled to the common electrode 28 and the second electrode coupling terminal 31 via the common potential line 53b.

The third insulating film 56 is disposed on the upper surface of the second insulating film 54 to cover the second wiring layer 55 configured as described above. The third wiring layer 57 is disposed on an upper surface of the third insulating film 56. The third wiring layer 57 includes a third drain relay line 57a, and the electrode lead line 23.

The third drain relay line 57a is electrically coupled to the second drain relay line 55b via the contact hole 69. The electrode lead line 23 is electrically coupled to the detection electrode relay line 55a via a contact hole 70. That is, the electrode lead line 23 is electrically coupled to the first electrode coupling terminal 24 via the detection electrode relay line 55a and the detection electrode line 53a.

The fourth insulating film 58 is disposed on the upper surface of the third insulating film 56 to cover the third wiring layer 57 configured as described above. The transparent electrode layer 59 is disposed on an upper surface of the fourth insulating film 58. The transparent electrode layer 59 is an electrode layer formed of a transparent conductive material such as ITO. The transparent electrode layer 59 includes the pixel electrode 7 disposed in the display region E and the detection electrode 22 disposed outside the display region E.

The pixel electrode 15 is electrically coupled to the third drain relay line 57a via a contact hole 71. That is, the pixel electrode 7 is electrically coupled to the drain of the pixel switching element 8 via the third drain relay lines 57a, the second drain relay lines 55b, and the first drain relay lines 53c. The detection electrode 22 is electrically coupled to the electrode lead lines 23 via a contact hole 72. That is, the detection electrode 22 is electrically coupled to the first electrode coupling terminals 24 via the electrode lead lines 23, the detection electrode relay line 55a, and the detection electrode line 53a.

The first alignment film 26 is disposed on the upper surface of the fourth insulating film 58 to cover the transparent electrode layer 59 configured as described above. The first alignment film 26 is formed of an inorganic material such as silicon oxide, similar to the second alignment film 29.

The electrode lead line 23 included in the third wiring layer 57 extends in the X-axis direction from a position immediately below the detection electrode 22 to the left side. The clock signal main line 17 and the output control signal line 20 included in the first wiring layer 53 extend in the Y-axis direction and do not overlap the detection electrode 22 in plan view. With such a wiring structure, the electrode lead line 23 electrically coupled to the detection electrode 22 intersects with the first drive signal line including the clock signal main line 17 and the output control signal line 20 in plan view. In the region in which the electrode lead line 23 intersects with the first drive signal line, the first conductive layer 25 extending in the X-axis direction to pass through a region directly above the first drive signal line is disposed in the second wiring layer 55. That is, the first conductive layer 25 is disposed between the electrode lead line 23 and the first drive signal line in the region in which the electrode lead line 23 intersects with the first drive signal line.

As understood from the above description, the liquid crystal panel 100 according to the first embodiment includes at least the first substrate 51, the liquid crystal layer 4, the second substrate 81, the detection electrode 22, the common electrode 28, the electrode lead line 23, the plurality of drive signal lines (the clock signal main line 17, the clock signal branch line 18, and the output control signal line 20), and the first conductive layer 25. The second substrate 81 faces the first substrate 51 via the liquid crystal layer 4. The detection electrode 22 is disposed between the first substrate 51 and the liquid crystal layer 4. The common electrode 28 is disposed between the second substrate 81 and the liquid crystal layer 4. The electrode lead line 23 is disposed between the first substrate 51 and the liquid crystal layer 4 and is electrically coupled to the detection electrode 22. The plurality of drive signal lines include a first drive signal line (the clock signal main line 17 and the output control signal line 20) disposed between the first substrate 51 and the liquid crystal layer 4 and intersecting the electrode lead lines 23 in plan view. The first conductive layer 25 is disposed between the electrode lead line 23 and the first drive signal line, and is electrically coupled to the common electrode 28. The detection electrode 22 is an example of a first electrode. The common electrode 28 is an example of a second electrode.

The liquid crystal panel 100 of the first embodiment includes at least the transparent electrode layer 59, the first wiring layer 53, the second wiring layer 55, and the third wiring layer 57. The transparent electrode layer 59 is an electrode layer disposed between the first substrate 51 and the liquid crystal layer 4 and including the detection electrode 22. The first wiring layer 53 is a wiring layer disposed between the first substrate 51 and the transparent electrode layer 59, and including the first drive signal line. The second wiring layer 55 is a wiring layer disposed between the first wiring layer 53 and the transparent electrode layer 59 and including the first conductive layer 25. The third wiring layer 57 is a wiring layer disposed between the second wiring layer 55 and the transparent electrode layer 59 and including the electrode lead lines 23.

1-2. Overview of Configuration of Liquid Crystal Apparatus 1000

Figure 3:
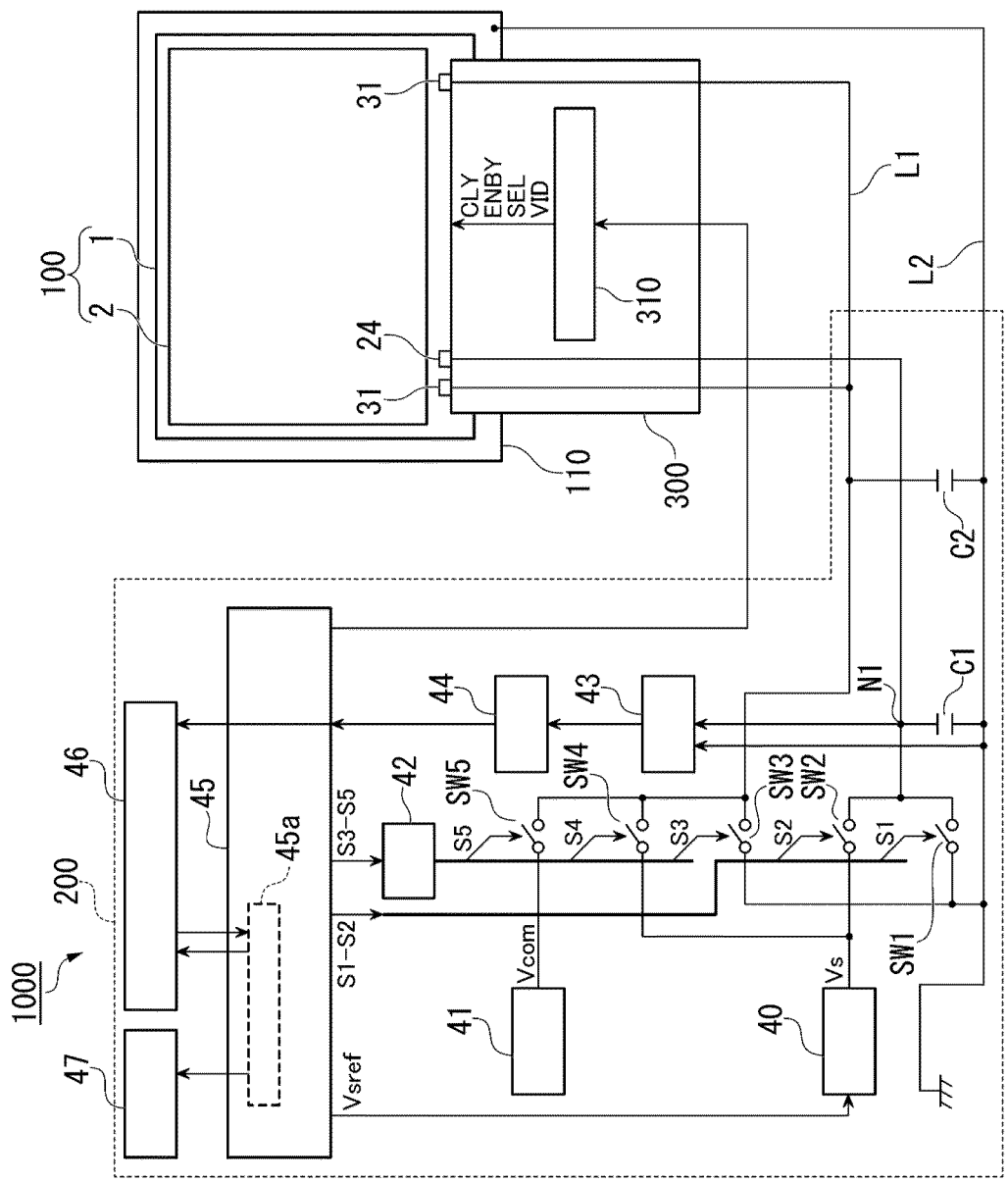
FIG. 3 is an illustrative diagram illustrating a schematic configuration of the liquid crystal apparatus of the first embodiment.

FIG. 3 is an illustrative diagram illustrating a schematic configuration of the liquid crystal apparatus 1000. The liquid crystal apparatus 1000 includes the liquid crystal panel 100, the measurement circuit 200, and a chip on film 300. The liquid crystal panel 100 is electrically coupled to the measurement circuit 200 via the COF 300. To be more specific, each of the mounting terminals disposed on the element substrate 1 of the liquid crystal panel 100 is electrically coupled to the measurement circuit 200 via the COF 300. Further, as illustrated in the drawing, the clock signal CLY, the output control signal ENBY, the selection signal SEL, the video signal VID, and the like are supplied from a drive integrated circuit (IC) 310. Further, a wiring on the COF 300 electrically coupled to the first electrode coupling terminal 24 is disposed to avoid the drive IC 310. With such a configuration, a wiring from the first electrode coupling terminal 24 to the detection electrode 22 in the first substrate 51 intersects with the clock signal CLY, the output control signal ENBY, and the like.

The measurement circuit 200 includes a measurement potential generation circuit 40, a common potential generation circuit 41, a level shifter 42, an amplification circuit 43, an A/D converter 44, a central control circuit 45, a measured value storage circuit 46, a display information generation circuit 47, a first switch SW1, a second switch SW2, a third switch SW3, a fourth switch SW4, a fifth switch SW5, a first capacitor C1, a second capacitor C2, a common electrode line L1, a ground potential line L2, and a first node N1. The COF 300 includes a drive IC 310.

The common electrode line L1 is electrically coupled to the second electrode coupling terminal 31 illustrated in FIG. 1 via the COF 300. That is, the common electrode line L1 is electrically coupled to the common electrode 28 and the first conductive layer 25 via the second electrode coupling terminal 31. The common electrode line L1 is an example of a second electrode line.

The ground potential line L2 is a wiring to which a ground potential is applied. The ground potential line L2 is electrically coupled to a ground of a digital circuit system in the liquid crystal apparatus 1000 at one point. With such a configuration, it is possible to achieve an effect of curbing of measurement noise caused by the digital circuit system at the time of measurement which will be described below. The ground potential line L2 is electrically coupled to the common electrode line L1 via the second capacitor C2. That is, the second capacitor C2 is electrically coupled between the common electrode line L1 and the ground potential line L2. For example, the second capacitor C2 has a capacitance value of 0.1 µF or more. A potential of the common electrode 28 is stabilized by the second capacitor C2. Accordingly, at the time of measurement which will be described below, measurement noise received by the detection electrode 22 having a coupling capacitance mainly due to the liquid crystal layer 4 between the detection electrode 22 and the common electrode 28 is curbed. Further, in the liquid crystal apparatus 1000, the liquid crystal panel 100 is held by a holder 110 made of a conductor, and the ground potential line L2 is electrically coupled to the holder 110. An effect of curbing of the measurement noise received by the detection electrode 22 at the time of measurement which will be described below is achieved by electrically coupling the ground potential line L2 to the holder 110.

The first node N1 in the measurement circuit 200 is electrically coupled to the first electrode coupling terminal 24 illustrated in FIG. 1 via the COF 300. That is, the first node N1 is electrically coupled to the detection electrode 22 via the first electrode coupling terminal 24. Thus, the measurement circuit 200 is electrically coupled to each of the detection electrode 22 and the common electrode 28.

The first node N1 is electrically coupled to the ground potential line 12 via the first switch SW1. The first node N1 is electrically coupled to an output terminal of the measurement potential generation circuit 40 via the second switch SW2. The first node N1 is electrically coupled to the ground potential line L2 via the first capacitor C1. That is, the first capacitor C1 is electrically coupled between the first node N1 and the ground potential line L2. For example, the first capacitor C1 has a capacitance value of about 1 nF to 10 nF. The measurement noise received by the detection electrode 22 at the time of measurement which will be described below is curbed by the first capacitor C1. Further, detection sensitivity to an increase in mobile ions 85 can be adjusted by a capacitance value of the first capacitor C1.

A state of the first switch SW1 is controlled by a first control signal S1 output from the central control circuit 45. For example, as the first control signal S1, a logic signal having an amplitude of 5 V is output from the central control circuit 45, and the first switch SW1 comes to an ON state at a logic "H". A state of the second switch SW2 is controlled by a second control signal S2 output from the central control circuit 45. For example, as the second control signal S2, the logic signal having an amplitude of 5 V is output from the central control circuit 45, and the second switch SW2 comes to an ON state at the logic "H". That is, the first switch SW1 and the second switch SW2 are controlled so that the first switch SW1 and the second switch SW2 come to an ON state by the first voltage (5 V).

The common electrode line L1 is electrically coupled to the ground potential line L2 via the third switch SW3. The common electrode line L1 is electrically coupled to the output terminal of the measurement potential generation circuit 40 via the fourth switch SW4. The common electrode line L1 is electrically coupled to an output terminal of the common potential generation circuit 41 via the fifth switch SW5.

A state of the third switch SW3 is controlled by the third control signal S3 output from the central control circuit 45 via the level shifter 42. For example, the logic signal having an amplitude of 5 V is output from the central control circuit 45 as the third control signal S3, but this logic signal is converted into, for example, the logic signal having an amplitude of 15 V by the level shifter 42. That is, the third control signal S3 having an amplitude of 15 V is output from the level shifter 42, and the third switch SW3 comes to an ON state at the logic "H".

A state of the fourth switch SW4 is controlled by a fourth control signal S4 output from the central control circuit 45 via the level shifter 42. For example, as the fourth control signal S4, the logic signal having an amplitude of 5 V is output from the central control circuit 45, but this logic signal is converted into, for example, the logic signal having an amplitude of 15 V by the level shifter 42. That is, the fourth control signal S4 having an amplitude of 15 V is output from the level shifter 42, and the fourth switch SW4 comes to an ON state at the logic "H".

A state of the fifth switch SW5 is controlled by the fifth control signal S5 output from the central control circuit 45 via the level shifter 42. For example, as the fifth control signal S5, the logic signal having an amplitude of 5 V is output from the central control circuit 45, but this logic signal is converted into the logic signal having an amplitude of 15 V by the level shifter 42. That is, the fifth control signal S5 having an amplitude of 15 V is output from the level shifter 42, and the fifth switch SW5 comes to an ON state at the logic "H".

As described above, the third switch SW3, the fourth switch SW4, and the fifth switch SW5 are controlled so that the third switch SW3, the fourth switch SW4, and the fifth switch SW5 come to an ON state by a second voltage (15 V) higher than the first voltage (5 V).

The measurement potential generation circuit 40 outputs a measurement potential Vs corresponding to a reference voltage Vsref output from the central control circuit 45. For example, the measurement potential generation circuit 40 outputs the measurement potential Vs having the same polarity and absolute value as the reference voltage Vsref. That is, the measurement potential Vs output from the measurement potential generation circuit 40 is variably controlled by the central control circuit 45. Such a measurement potential generation circuit 40 can be realized by, for example, a voltage follower to which the reference voltage Vsref is input.

The common potential generation circuit 41 outputs a predetermined common potential Vcom. For example, the common potential Vcom is 5 V at the time of normal driving of the liquid crystal panel 100.

The amplification circuit 43 amplifies a potential of the first node N1 electrically coupled to the detection electrode 22. In the following description, the potential of the first node N1 may be referred to as a first node potential. The amplification circuit 43 outputs the amplified first node potential to the A/D converter 44. The A/D converter 44 converts the first node potential amplified by the amplification circuit 43 into a digital value. The A/D converter 44 outputs the digital value of the first node potential to the central control circuit 45 as a measured value of the potential of the detection electrode 22. In the following description, the potential of the detection electrode 22 may be referred to as a detection electrode potential Vd.

Thus, in the present embodiment, the amplification circuit 43 and the A/D converter 44 form an example of a potential measurement circuit that measures the potential of the first node N1 as a detection electrode potential Vd and outputs a measured value of the detection electrode potential Vd to the central control circuit 45.

For example, the amplification circuit 43 is a non-inverting amplification circuit using an operational amplifier. A ground terminal of the amplification circuit 43 is electrically coupled to the ground potential line L2 to which the holder 110, the first capacitor C1, and the second capacitor C2 are electrically coupled. Thus, the ground terminal of the amplification circuit 43 is electrically coupled to the ground potential line L2, thereby making it possible to curb superimposition of noise components involved in an operation of the digital circuit system constituting the measurement circuit 200 on the measured value of the detection electrode potential Vd.

Further, as understood from the configuration of the above-described amplification circuit 43, the measured value of the detection electrode potential Vd obtained from the A/D converter 44 is a value according to a potential difference between the first node potential, that is, the potential of the detection electrode 22 and the ground potential.

The central control circuit 45 controls each circuit included in the measurement circuit 200 at the time of measurement of the deterioration situation of the liquid crystal layer 4. Specifically, the central control circuit 45 outputs the reference voltage Vsref to the measurement potential generation circuit 40. The central control circuit 45 outputs the first control signal S1 to the first switch SW1 and outputs the second control signal S2 to the second switch SW2. The central control circuit 45 outputs the third to fifth control signals S3 to S5 to the third switch SW3 to the fifth switch SW5 via the level shifter 42. Thus, the central control circuit 45 in the present embodiment is an example of a third control circuit that outputs the reference voltage Vsref to the measurement potential generation circuit 40 and controls the first to fifth switches SW1 to SW5.

The central control circuit 45 stores the measured value of the detection electrode potential Vd output from the A/D converter 44, in the measured value storage circuit 46. The measured value storage circuit 46 stores the measured value of the detection electrode potential Vd under the control of the central control circuit 45. The central control circuit 45 includes a determination circuit 45a. The determination circuit 45a determines the deterioration situation of the liquid crystal layer 4 based on the measured value stored in the measured value storage circuit 46. The display information generation circuit 47 generates display information of the deterioration situation of the liquid crystal layer 4 based on the measured value and the determination results.

The central control circuit 45 controls the drive IC 310 so that various signals necessary for driving of the liquid crystal panel 100 are output from the drive IC 310 at the time of normal driving of the liquid crystal panel 100. The drive IC 310 outputs the clock signal CLY, the output control signal ENBY, the video signal VID, and the selection signal SEL to the liquid crystal panel 100 under the control of the central control circuit 45. The selection signal SEL includes the first to fourth selection signals SEL1 and SEL4. Signals output from the drive IC 310 include a start pulse signal to the scanning line drive circuit 10, a scanning direction designation signal, or the like in addition to the above signals.

As described with reference to FIG. 1, the clock signal CLY input to the clock signal terminal 19 is supplied to the scanning line drive circuit 10 via the clock signal main line 17 and the clock signal branch line 18. The output control signal ENBY input to the output control signal terminal 21 is supplied to the scanning line drive circuit 10 via the output control signal line 20.

The video signal VID input to the video signal terminal 12 is supplied to the source of each switching element 11 of all the demultiplexers included in the signal line drive circuit 9. For example, the first to fourth selection signals SEL1 and SEL4 among the selection signals SEL input to the first to fourth control signal terminals 13 to 16 are supplied to the gate electrodes of the four switching elements 11 included in the demultiplexer located on the rightmost side of the signal line drive circuit 9.

The video signal VID and the selection signal SEL are supplied to the signal line drive circuit 9 and the clock signal CLY and the output control signal ENBY are supplied to the scanning line drive circuit 10, so that a scanning signal for switching the pixel switching element 8 of each pixel P to the ON state is sequentially supplied to each scanning line 6 and the potential applied to the pixel electrode 7 of each pixel P is supplied to each signal line 5. As a result, a light transmittance of each pixel P becomes a value determined by a potential difference between the pixel electrode 7 and the common electrode 28. Thus, a state in which the liquid crystal panel 100 operates as a light modulation apparatus by the light transmittance of each pixel P being controlled, to display a video, is referred to as the time of the normal driving of the liquid crystal panel 100. Further, in each pixel P, AC driving is performed at the time of the normal driving in which an image is displayed, and a polarity of a voltage applied to the liquid crystal layer 4 of each pixel P is inverted for each one frame period in which update of a transmittance state of the pixel P included in the display region E ends.

Further, at the time of the normal driving of the liquid crystal panel 100, the central control circuit 45 of the measurement circuit 200 controls the first switch SW1, the third switch SW3, and the fourth switch SW4 so that the first switch SW1, the third switch SW3, and the fourth switch SW4 come to an OFF state and controls the second switch SW2 and the fifth switch SW5 so that the second switch SW2 and the fifth switch SW5 come to an ON state. Accordingly, at the time of the normal driving of the liquid crystal panel 100, the common potential Vcom output from the common potential generation circuit 41 of the measurement circuit 200 is supplied to the common electrode 28 of the liquid crystal panel 100. At the same time, Vsref is adjusted so that the detection electrode 22 becomes Vs=Vcom.

Further, each circuit forming the measurement circuit 200 may be configured such that some or all of functions realized by the respective circuits are realized by, for example, a control program of the central control circuit 45. Further, the measurement circuit 200 may be one integrated circuit (IC) or may be divided into a plurality of ICs.

As understood from the above description, the central control circuit 45 and the drive IC 310 cooperate to supply the clock signal CLY and the output control signal ENBY to the liquid crystal panel 100. The clock signal CLY is a signal for defining potentials of the clock signal main line 17 and the clock signal branch line 18. The output control signal ENBY is a signal for defining a potential of the output control signal line 20. Therefore, the central control circuit 45 and the drive IC 310 are an example of a first control circuit that controls the potentials of the plurality of drive signal lines including the clock signal main line 17, the clock signal branch line 18, and the output control signal line 20.

Further, the central control circuit 45 and the drive IC 310 cooperate to supply the video signal VID and the selection signal SEL to the liquid crystal panel 100. The selection signal SEL is a signal for defining the potentials of the gate electrodes of the plurality of switching elements 11 electrically coupled to the plurality of signal lines 5 on a one-to-one basis. The video signal VID is a signal for defining the potentials supplied to the plurality of signal lines 5 via the plurality of switching elements 11. Therefore, the central control circuit 45 and the drive IC 310 are an example of a second control circuit that controls the potentials of the gate electrodes of the plurality of switching elements 11 and the potentials supplied to the plurality of signal lines 5 via the plurality of switching elements 11.

As described above, although a form in which the central control circuit 45 and the drive IC 310 have both a function of the first control circuit and a function of the second control circuit is exemplified in the present embodiment, a control circuit having the function of the first control circuit and a control circuit having the function of the second control circuit may be separately provided.

1-3. Overview of Method for Measuring Physical Property of Liquid Crystal Layer 4

Figure 4:
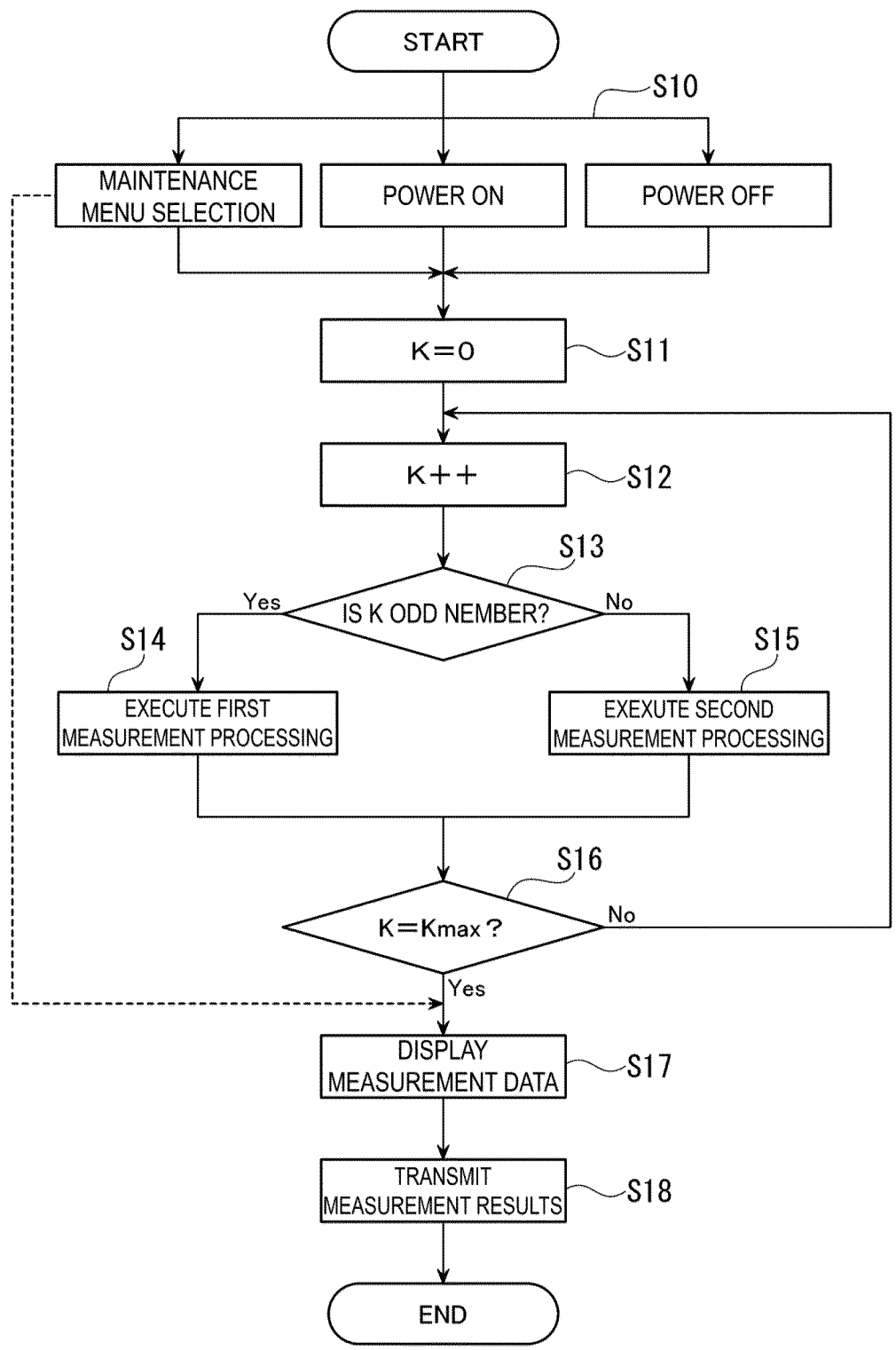
FIG. 4 is a schematic flowchart illustrating a method of measuring a physical property of a liquid crystal layer.

FIG. 4 is a schematic flowchart illustrating a method of measuring a physical property of the liquid crystal layer 4 of the liquid crystal panel 100. Hereinafter, a method of measuring the physical property of the liquid crystal layer 4 will be described with reference to FIG. 4.

As illustrated in FIG. 4, in step S10, when a predetermined event occurs, the liquid crystal apparatus 1000 transitions from a normal driving mode in which the normal driving is performed to a measurement mode in which measurement of the physical property of the liquid crystal layer 4 is performed, and starts the measurement of the physical property of the liquid crystal layer 4. Here, the predetermined event includes power-on and power-off of a projection-type display apparatus using the liquid crystal apparatus 1000, a measurement instruction from a maintenance menu selection in the projection-type display apparatus using the liquid crystal apparatus 1000, and the like, and a measurement start command from the projection-type display apparatus is transmitted due to occurrence of these events. When the central control circuit 45 of the measurement circuit 200 receives the measurement start command from the projection-type display apparatus, the central control circuit 45 starts measurement of the physical property of the liquid crystal layer 4.

Further, step S10 shows a concept of a measurement mode transition event. In practice, for example, an instruction from the maintenance menu selection is an interrupt processing instruction, and the projection-type display apparatus using the liquid crystal apparatus 1000 is powered on. Further, in the measurement mode transition event, all of the exemplified "maintenance menu selection," "power-on," and "power-off" are not mandatory. Further, in the present disclosure, measurement of the physical property of the liquid crystal layer 4 is performed, for example, in a state in which a light source of the projection-type display apparatus is in an OFF state. Alternatively, the present disclosure is implemented as a configuration in which light from the light source is shielded by a mechanical light shielding mechanism. At the time of the measurement of the physical property of the liquid crystal layer 4, when the light source of the projection-type display apparatus is in the OFF state, no problem occurs in display of the projection-type display apparatus.

Further, when the projection-type display apparatus using the liquid crystal apparatus 1000 is powered on, the clock signal CLY and the output control signal ENBY are supplied to the scanning line drive circuit 10 in order to determine a state of the pixel electrode 7. That is, the clock signal CLY and the output control signal ENBY are supplied to the scanning line drive circuit 10 in each of a non-measurement period in which the liquid crystal apparatus 1000 operates in the normal driving mode and a measurement period in which the liquid crystal apparatus 1000 operates in the measurement mode.

The clock signal CLY and the output control signal ENBY are rectangular wave signals having amplitudes as high as 15V and frequencies well exceeding the order of kHz. That is, the first control circuit including the central control circuit 45 and the drive IC 310 changes the potentials of the plurality of drive signal lines into a rectangular waveform in the non-measurement period and the measurement period. The first control circuit in a general liquid crystal panel has several operation modes for analysis, but after energization, for example, the clock signal CLY is intended to be always output, and is not assumed to be arbitrarily stopped. Therefore, it is necessary to take measures against the clock signal which always operates or the like, in order to modify an existing liquid crystal panel and mount a function of measuring the physical property of the liquid crystal layer 4 at a low cost. As will be described below, the measurement period includes at least the first discharging period T4. Therefore, the first control circuit changes the potentials of the plurality of drive signal lines into a rectangular waveform at least in the first discharging period T4. As described above, the plurality of drive signal lines include the clock signal main line 17, the clock signal branch line 18, and the output control signal line 20. Signals required by the scanning line drive circuit 10 include the start pulse signal, the scanning direction designation signal, and the like, but in view of an operating frequencies of the signals and the like, handling of the clock signal CLY and the output control signal ENBY should be considered first. This will be described in a first embodiment and a second embodiment. Similarly, consideration should be given to dealing with the selection signal SEL of the signal line drive circuit 9. This will be described in a third embodiment.

When the measurement start command is received, the central control circuit 45 first resets a count value K indicating the number of times of execution of measurement processing, which will be described below, to "0" (step S11). Subsequently, the central control circuit 45 adds "1" to the count value K (step S12). Subsequently, the central control circuit 45 determines whether or not the count value K is an odd number (step S13).

When the count value K is an odd number (step S13: Yes), the central control circuit 45 executes first measurement processing (step S14). On the other hand, when the count value K is an even number (step S13: No), the central control circuit 45 executes second measurement processing (step S15). Specific content of the first measurement processing and the second measurement processing will be described below.

After the central control circuit 45 executes the first measurement processing or the second measurement processing, the central control circuit 45 determines whether or not the count value K is equal to an upper limit value Kmax (step S16). When the count value K is not equal to the upper limit value Kmax (step S16: No), the central control circuit 45 returns to step S12. On the other hand, when the count value K is equal to the upper limit value Kmax (step S16: Yes), the central control circuit 45 proceeds to step S17, which will be described below. Further, the upper limit value Kmax is set in advance in a control program of the measurement circuit 200. Alternatively, a numerical value may be set by an input means (not illustrated). The input means is, for example, an input key included in the measurement circuit 200, a personal computer (PC) coupled to the projection-type display apparatus using the liquid crystal apparatus 1000 in a wired or wireless manner, or the like. When the upper limit value Kmax is set to 2 or more, it is possible to calculate an average value of a plurality of measurement results of the first measurement processing or the second measurement processing and obtain data with good reproducibility. In a detailed measurement example, which will be described below, the upper limit value Kmax=20, and an average value in ten times of first measurement processing is calculated.

As understood from the description of the processing from step S11 to step S16, the central control circuit 45 alternately executes the first measurement processing and the second measurement processing until the count value K becomes equal to the upper limit value Kmax. For example, when the upper limit value Kmax is "10," each of the first measurement processing and the second measurement processing is executed five times. Hereinafter, the first measurement processing and the second measurement processing will be described in detail with reference to FIGS. 5 and 6.

Figure 5:
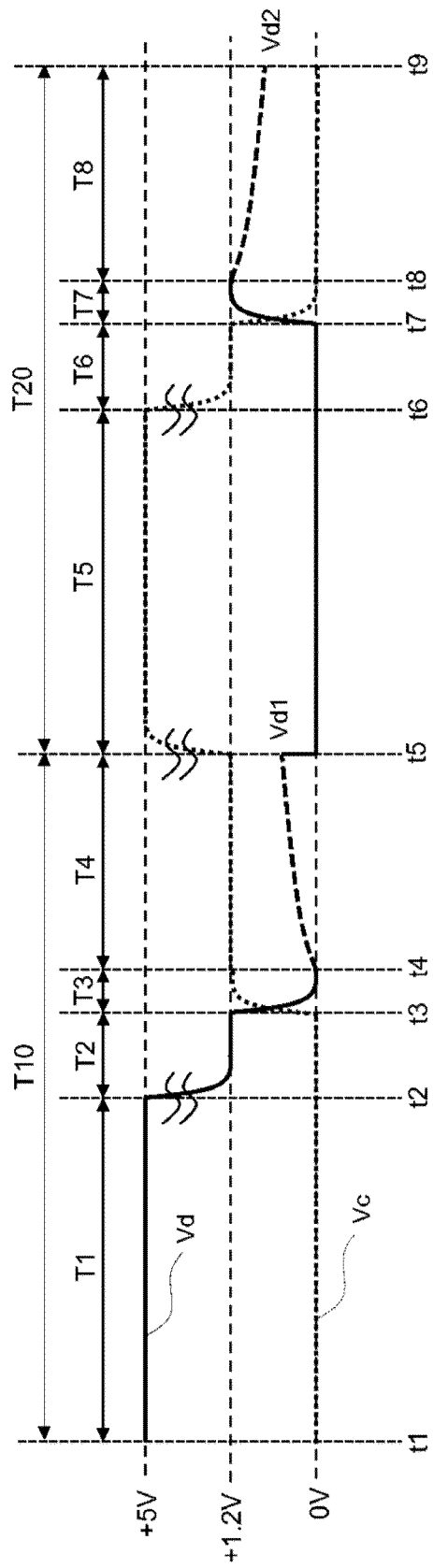
FIG. 5 is a diagram illustrating a change over time in potential of each of a detection electrode and a common electrode in the first embodiment.

FIG. 5 is a diagram illustrating a change over time in potential of each of the detection electrode 22 and the common electrode 28 at the time of execution of the first measurement processing and the second measurement processing. In FIG. 5, a horizontal axis represents time, and a vertical axis represents voltage. In FIG. 5, for convenience of description, a display of the potential of each electrode is different from actual one. For example, a value of 1.2 V on the vertical axis is plotted in a portion of approximately half 5 V. In FIG. 5, the detection electrode potential Vd which is the potential of the detection electrode 22 is indicated by a solid line with some exception, and a common electrode potential Vc which is the potential of the common electrode 28 is indicated by a dotted line.

Figure 6:
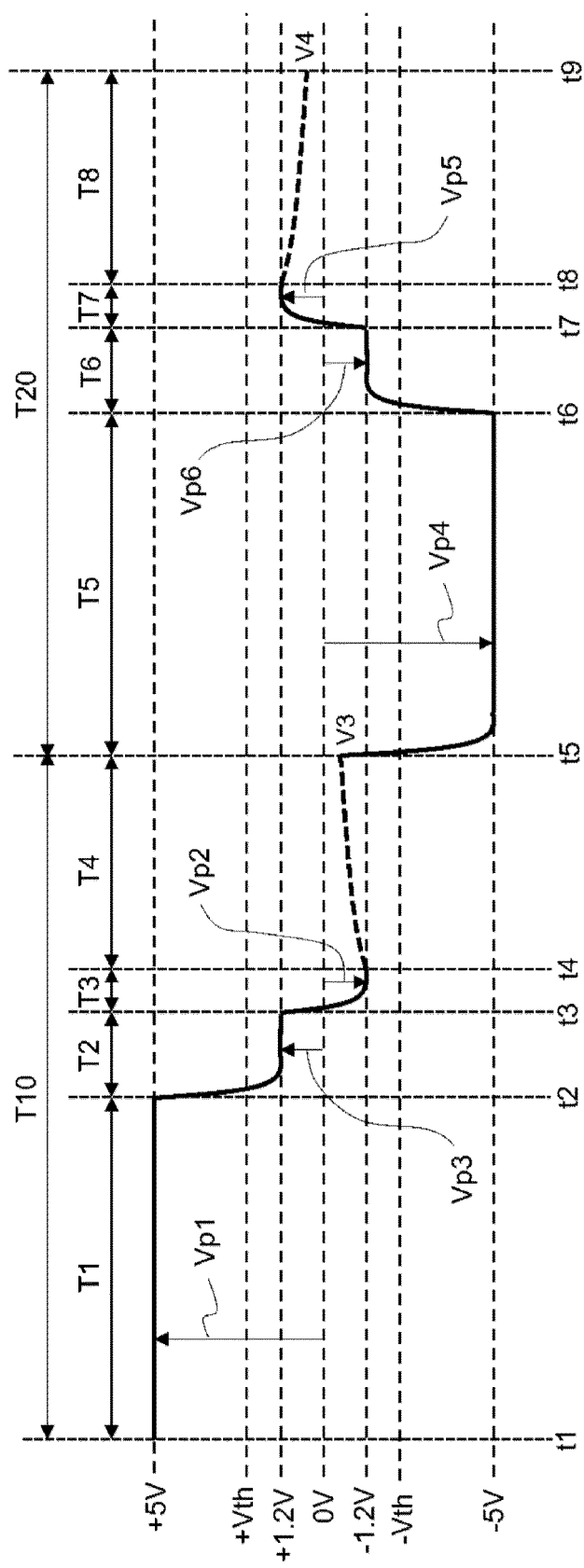
FIG. 6 is a diagram illustrating a change over time in potential difference between the detection electrode and the common electrode at the time of execution of first measurement processing and second measurement processing in the first embodiment.

FIG. 6 is a diagram illustrating change over time in potential difference between the detection electrode 22 and the common electrode 28 at the time of execution of the first measurement processing and the second measurement processing. In FIG. 6, a horizontal axis represents time, and a vertical axis represents a voltage of the detection electrode 22 when the common electrode 28 is used as a reference. In other words, the voltage is a voltage applied to the liquid crystal layer 4 in the detection electrode 22. In FIG. 6, a polarity of a potential difference when the detection electrode potential Vd is higher than the common electrode potential Vc is defined as a positive polarity.

In FIGS. 5 and 6, the first measurement processing is executed in a period T10 from time t1 to time t5. In the following description, the period T10 in which the first measurement processing is executed may be referred to as a first measurement period T10. The first measurement period T10 includes a first reverse sweep period T1, a first relaxation period T2, a first charging period T3, and a first discharging period T4. The first reverse sweep period T1 is a period from time t1 to time t2. The first relaxation period T2 is a period from time t2 to time t3. The first charging period T3 is a period from time t3 to time t4. The first discharging period T4 is a period from time t4 to time t5.

In the first reverse sweep period T1, the measurement circuit 200 supplies a potential to each of the detection electrode 22 and the common electrode 28 so that the potential difference between the detection electrode 22 and the common electrode 28 becomes a first potential difference Vp1.

Specifically, in the first reverse sweep period T1, the central control circuit 45 outputs, for example, the reference voltage Vsref of +5 V to the measurement potential generation circuit 40. Thus, the measurement potential Vs of +5 V is output from the measurement potential generation circuit 40. Further, in the first reverse sweep period T1, the central control circuit 45 controls the second switch SW2 and the third switch SW3 so that the second switch SW2 and the third switch SW3 come to an ON state and controls the first switch SW1, the fourth switch SW4, and the fifth switch SW5 so that the first switch SW1, the fourth switch SW4, and the fifth switch SW5 come to an OFF state.

In the first reverse sweep period T1, the central control circuit 45 controls the first to fifth switches SW1 to SW5 as described above, so that the output terminal of the measurement potential generation circuit 40 is electrically coupled to the detection electrode 22, and the ground potential line L2 is electrically coupled to the common electrode 28. Thus, in the first reverse sweep period T1, the measurement potential Vs of +5 V is supplied to the detection electrode 22, and the ground potential, that is, 0 V is supplied to the common electrode 28. As a result, as illustrated in FIG. 5, in the first reverse sweep period T1, the detection electrode potential Vd becomes +5 V, and the common electrode potential Vc becomes 0 V. Further, as illustrated in FIG. 6, in the first reverse sweep period T1, the potential difference between the detection electrode 22 and the common electrode 28 becomes the first potential difference Vp1, that is, +5 V.

Thus, in the first reverse sweep period T1, the measurement circuit 200 supplies the measurement potential Vs of +5 V to the detection electrode 22 and supplies the ground potential to the common electrode 28 so that the potential difference between the detection electrode 22 and the common electrode 28 becomes the first potential difference Vp1 of +5 V. In the present embodiment, the first reverse sweep period T1 corresponds to a first period.

In the first relaxation period T2 between the first reverse sweep period T1 and the first charging period T3, the measurement circuit 200 supplies a potential to each of the detection electrode 22 and the common electrode 28 so that the potential difference between the detection electrode 22 and the common electrode 28 becomes a third potential difference Vp3 having the same polarity as the first potential difference Vp1 and having an absolute value smaller than that of the first potential difference Vp1.

Specifically, in the first relaxation period T2, the central control circuit 45 outputs, for example, the reference voltage Vsref of +1.2 V to the measurement potential generation circuit 40. Accordingly, the measurement potential Vs of +1.2 V is output from the measurement potential generation circuit 40. Further, in the first relaxation period T2, the central control circuit 45 controls the second switch SW2 and the third switch SW3 so that the second switch SW2 and the third switch SW3 come to an ON state, and controls the first switch SW1, the fourth switch SW4, and the fifth switch SW5 so that the first switch SW1, the fourth switch SW4, and the fifth switch SW5 come to an ON state.

In the first relaxation period T2, the central control circuit 45 controls the first to fifth switches SW1 to SW5 as described above, so that the output terminal of the measurement potential generation circuit 40 is electrically coupled to the detection electrode 22, and the ground potential line L2 is electrically coupled to the common electrode 28. Accordingly, in the first relaxation period T2, the measurement potential Vs of +1.2 V is supplied to the detection electrode 22, and the ground potential is supplied to the common electrode 28. As a result, as illustrated in FIG. 5, in the first relaxation period T2, the detection electrode potential Vd becomes +1.2 V, and the common electrode potential Vc becomes 0 V. Further, as illustrated in FIG. 6, in the first relaxation period T2, the potential difference between the detection electrode 22 and the common electrode 28 becomes the third potential difference Vp3, that is, +1.2 V.

Thus, in the first relaxation period T2, the measurement circuit 200 supplies the measurement potential Vs of +1.2 V to the detection electrode 22 and supplies the ground potential to the common electrode 28 so that the potential difference between the detection electrode 22 and the common electrode 28 becomes the third potential difference Vp3 (+1.2 V) having the same polarity as the first potential difference Vp1 and having the absolute value smaller than the absolute value of the first potential difference Vp1. In the present embodiment, the first relaxation period T2 corresponds to a fourth period.

In the first charging period T3 after the first reverse sweep period T1 and after the first relaxation period T2, the measurement circuit 200 supplies a potential to each of the detection electrode 22 and the common electrode 28 so that the potential difference between the detection electrode 22 and the common electrode 28 becomes a second potential difference Vp2 having a polarity different from that of the first potential difference Vp1.

Specifically, in the first charging period T3, the central control circuit 45 outputs, for example, the reference voltage Vsref of +1.2 V to the measurement potential generation circuit 40. Thus, the measurement potential Vs of +1.2 V is output from the measurement potential generation circuit 40. Further, in the first charging period T3, the central control circuit 45 controls the first switch SW1 and the fourth switch SW4 so that the first switch SW1 and the fourth switch SW4 come to an ON state and controls the second switch SW2, the third switch SW3, and the fifth switch SW5 so that the second switch SW2, the third switch SW3, and the fifth switch SW5 come to an OFF state.

In the first charging period T3, the central control circuit 45 controls the first to fifth switches SW1 to SW5 as described above, so that the output terminal of the measurement potential generation circuit 40 is electrically coupled to the common electrode 28 and the ground potential line L2 is electrically coupled to the detection electrode 22. Thus, in the first charging period T3, the ground potential is supplied to the detection electrode 22, and the measurement potential Vs of +1.2 V is supplied to the common electrode 28. As a result, as illustrated in FIG. 5, in the first charging period T3, the detection electrode potential Vd becomes +0 V, and the common electrode potential Vc becomes +1.2 V. Further, as illustrated in FIG. 6, in the first charging period T3, the potential difference between the detection electrode 22 and the common electrode 28 becomes the second potential difference Vp2, that is, −1.2 V.

Thus, in the first charging period T3, the measurement circuit 200 supplies the measurement potential Vs of +1.2 V to the common electrode 28 and supplies the ground potential to the detection electrode 22 so that the potential difference between the detection electrode 22 and the common electrode 28 becomes the second potential difference Vp2 (−1.2 V) having a polarity different from that of the first potential difference Vp1. In the present embodiment, the first charging period T3 corresponds to a second period.

In the first discharging period T4 after the first charging period T3, the measurement circuit 200 stops the supply of the potential to the detection electrode 22, and supplies the same potential as that in the first charging period T3 to the common electrode 28 to measure the detection electrode potential Vd at least once, for example, at the time of the end of the first discharging period T4.

Specifically, in the first discharging period T4, the central control circuit 45 outputs, for example, the reference voltage Vsref of +1.2 V to the measurement potential generation circuit 40. Thus, the measurement potential Vs of +1.2 V is output from the measurement potential generation circuit 40. Further, in the first discharging period T4, the central control circuit 45 controls the fourth switch SW4 so that the fourth switch SW4 comes to an ON state, and controls the first switch SW1, the second switch SW2, the third switch SW3, and the fifth switch SW5 so that the first switch SW1, the second switch SW2, the third switch SW3, and the fifth switch SW5 come to an OFF state.

In the first discharging period T4, the central control circuit 45 controls the first to fifth switches SW1 to SW5 as described above, so that the output terminal of the measurement potential generation circuit 40 is electrically coupled to the common electrode 28, and the ground potential line L2 is electrically discoupled from the detection electrode 22. Thus, in the first discharging period T4, since the measurement potential Vs of +1.2 V is continuously supplied to the common electrode 28, but supply of the potential to the detection electrode 22 is stopped, the liquid crystal layer 4 discharges charge charged during the first charging period T3. As a result, as illustrated in FIG. 5, in the first discharging period T4, the detection electrode potential Vd1 gradually changes from 0 V that is the ground potential to the potential (+1.2 V) applied to the common electrode 28, and reaches the potential Vd1 at time t5. A value of the detection electrode potential Vd1 depends on the number of mobile ions 85 contained in the liquid crystal layer 4 as illustrated in FIG. 2. Accordingly, as will be described below, it is possible to determine the deterioration situation of the liquid crystal layer 4, by measuring the detection electrode potential Vd1 at the time of the end of the first discharging period T4. Further, as illustrated in FIG. 6, the detection electrode potential Vd1 at the time of the end of the first discharging period T4 corresponds to a potential difference V3 with the common electrode 28 as a reference.

For example, the central control circuit 45 measures the detection electrode potential Vd1 at time t5 when the first discharging period T4 ends. Specifically, the detection electrode potential Vd1 is amplified by the amplification circuit 43, and an output of the amplification circuit 43 is input to the A/D converter 44. The central control circuit 45 acquires a digital value output from the A/D converter 44 at time t5 as the measured value of the detection electrode potential Vd1. The central control circuit 45 stores the measured value of the detection electrode potential Vd1 obtained at time t5 in the measured value storage circuit 46.

Thus, in the first discharging period T4, the measurement circuit 200 stops supply of the potential to the detection electrode 22 and supplies the measurement potential Vs of +1.2 V which is the same as that in the first charging period T3 to the common electrode 28 to measure the detection electrode potential Vd1 at least once, for example, at time t5 when the first discharging period T4 ends. In the present embodiment, the first discharging period T4 corresponds to a third period.

The first measurement processing has been described above.

The first reverse sweep period T1 is preferably longer than one frame period in the display region E. For example, when the one frame period is about 16 ms, the first reverse sweep period T1 is equal to or longer than 20 ms. Further, in the above description, the case in which the first potential difference Vp1 in the first reverse sweep period T1 is +5 V has been exemplified, but the absolute value of the first potential difference Vp1 is preferably equal to or greater than the maximum applied voltage of the liquid crystal layer 4 of the pixel P in normal driving. In other words, the absolute value of the first potential difference Vp1 is preferably equal to or greater than the maximum applied voltage of the liquid crystal layer 4 in the display region E. A reason that a length of the first reverse sweep period T1 and the absolute value of the first potential difference Vp1 are set as described above will be described below.

The first charging period T3 is preferably shorter than one frame period in the display region E. For example, when the one frame period is about 16 ms, the first charging period T3 is 5 ms. Further, in the above description, a case in which an absolute value of the second potential difference Vp2 in the first charging period T3 is 1.2 V has been exemplified, but the absolute value of the second potential difference Vp2 is preferably greater than 0 V and smaller than a threshold voltage Vth of the liquid crystal layer 4. For example, in a vertical alignment (VA) liquid crystal panel 100, when the gap is about 2.6 µm, the threshold voltage Vth of the liquid crystal layer 4 is about 2.1 V. Further, the threshold voltage Vth of the liquid crystal layer 4 is a driving voltage at which a transmittance or brightness of the liquid crystal layer 4 becomes about 10% at a maximum gradation ratio, and more preferably, is a voltage immediately before liquid crystal molecules start to move or a voltage immediately before an alignment state of the liquid crystal molecules starts to change. In the present embodiment, since the liquid crystal panel 100 is of a normally black type, the threshold voltage Vth of the liquid crystal layer 4 as described above is defined. In the case of a normally white type liquid crystal panel 100, for example, the threshold voltage Vth of the liquid crystal layer 4 can be defined as a driving voltage at which the transmittance or brightness of the liquid crystal layer 4 is about 90% at a maximum gradation ratio. A reason that the length of the first charging period T3 and the absolute value of the second potential difference Vp2 are set as described above will be described below.

Further, in the above description, a case in which the absolute value of the third potential difference Vp3 in the first relaxation period T2 is 1.2 V which is the same as the absolute value of the second potential difference Vp2 has been exemplified, but the absolute value of the third potential difference Vp3 is preferably greater than 0 V and smaller than the threshold voltage Vth of the liquid crystal layer 4 as described above. A reason that the absolute value of the third potential difference Vp3 is set as described above will be described below. Further, the absolute value of the third potential difference Vp3 does not necessarily have to be the same as the absolute value of the second potential difference Vp2. Further, the potential difference may change gradually with time, for example, in a process in which the potential difference changes from the first potential difference Vp1 to the third potential difference Vp3.

The first discharging period T4 is preferably shorter than one frame period in the display region E. In general, a holding rate of the liquid crystal is evaluated by a potential holding rate in a hold period (frame period). Therefore, when a length of the first discharging period T4 is about the same as one frame period, it is difficult to accurately discriminate a degree of initial deterioration of the liquid crystal layer 4 due to the fact that the measured value of the detection electrode potential Vd1 is too small. The first discharging period T4 is 100 ms or 200 ms.

Next, the second measurement processing will be described.

In FIGS. 5 and 6, the second measurement processing is executed in a period T20 from time t5 to time t9. In the following description, the period T20 in which the second measurement processing is executed may be referred to as a second measurement period T20. The second measurement period T20 includes a second reverse sweep period T5, a second relaxation period T6, a second charging period T7, and a second discharging period T8. The second reverse sweep period T5 is a period from time t5 to time t6. The second relaxation period T6 is a period from time t6 to time t7. The second charging period T7 is a period from time t7 to time t8. The second discharging period T8 is a period from time t8 to time t9.

In the second reverse sweep period T5 after the first discharging period T4, the measurement circuit 200 supplies a potential to each of the detection electrode 22 and the common electrode 28 so that the potential difference between the detection electrode 22 and the common electrode 28 becomes a fourth potential difference Vp4 having a polarity different from that of the first potential difference Vp1 and having the same absolute value as that of the first potential difference Vp1.

Specifically, in the second reverse sweep period T5, the central control circuit 45 outputs, for example, the reference voltage Vsref of +5 V to the measurement potential generation circuit 40. Thus, the measurement potential Vs of +5 V is output from the measurement potential generation circuit 40. Further, in the second reverse sweep period T5, the central control circuit 45 controls the first switch SW1 and the fourth switch SW4 so that the first switch SW1 and the fourth switch SW4 come to an ON state, and controls the second switch SW2, the third switch SW3, and the fifth switch SW5 so that the second switch SW2, the third switch SW3, and the fifth switch SW5 come to an OFF state.

In the second reverse sweep period T5, the central control circuit 45 controls the first to fifth switches SW1 to SW5 as described above, so that the output terminal of the measurement potential generation circuit 40 is electrically coupled to the common electrode 28 and the ground potential line L2 is electrically coupled to the detection electrode 22. Thus, in the second reverse sweep period T5, the measurement potential Vs of +5 V is supplied to the common electrode 28, and the ground potential is supplied to the detection electrode 22. As a result, as illustrated in FIG. 5, in the second reverse sweep period T5, the detection electrode potential Vd becomes 0 V, and the common electrode potential Vc becomes +5 V. Further, as illustrated in FIG. 6, in the second reverse sweep period T5, the potential difference between the detection electrode 22 and the common electrode 28 becomes the fourth potential difference Vp4, that is, −5 V.

Thus, in the second reverse sweep period T5, the measurement circuit 200 supplies the measurement potential Vs of +5 V to the common electrode 28 and supplies the ground potential to the detection electrode 22 so that the potential difference between the detection electrode 22 and the common electrode 28 becomes the fourth potential difference Vp4 (−5 V) having a polarity different from that of the first potential difference Vp1 and having the same absolute value as that of the first potential difference Vp1. In the present embodiment, the second reverse sweep period T5 corresponds to a fifth period.

In the second relaxation period T6 between the second reverse sweep period T5 and the second charging period T7, the measurement circuit 200 supplies a potential to each of the detection electrode 22 and the common electrode 28 so that the potential difference between the detection electrode 22 and the common electrode 28 becomes a sixth potential difference Vp6 having the same polarity as the fourth potential difference Vp4 and having an absolute value smaller than the absolute value of the fourth potential difference Vp4.

Specifically, in the second relaxation period T6, the central control circuit 45 outputs, for example, the reference voltage Vsref of +1.2 V to the measurement potential generation circuit 40. Thus, the measurement potential Vs of +1.2 V is output from the measurement potential generation circuit 40. Further, in the second relaxation period T6, the central control circuit 45 controls the first switch SW1 and the fourth switch SW4 so that the first switch SW1 and the fourth switch SW4 come to an ON state and controls the second switch SW2, the third switch SW3, and the fifth switch SW5 so that the second switch SW2, the third switch SW3, and the fifth switch SW5 come to an OFF state.

In the second relaxation period T6, the central control circuit 45 controls the first to fifth switches SW1 to SW5 as described above, so that the output terminal of the measurement potential generation circuit 40 is electrically coupled to the common electrode 28, and the ground potential line L2 is electrically coupled to the detection electrode 22. Thus, in the second relaxation period T6, the measurement potential Vs of +1.2 V is supplied to the common electrode 28, and the ground potential is supplied to the detection electrode 22. As a result, as illustrated in FIG. 5, in the second relaxation period T6, the detection electrode potential Vd becomes 0 V, and the common electrode potential Vc becomes +1.2 V. Further, as illustrated in FIG. 6, in the second relaxation period T6, the potential difference between the detection electrode 22 and the common electrode 28 becomes the sixth potential difference Vp6, that is, −1.2 V.

Thus, in the second relaxation period T6, the measurement circuit 200 supplies the measurement potential Vs of +1.2 V to the common electrode 28 and supplies the ground potential to the detection electrode 22 so that the potential difference between the detection electrode 22 and the common electrode 28 becomes a sixth potential difference Vp6 (−1.2 V) having the same polarity as the fourth potential difference Vp4 and having an absolute value smaller than the absolute value of the fourth potential difference Vp4. In the present embodiment, the second relaxation period T6 corresponds to an eighth period.

In the second charging period T7 after the second reverse sweep period T5 and after the second relaxation period T6, the measurement circuit 200 supplies a potential to each of the detection electrode 22 and the common electrode 28 so that the potential difference between the detection electrode 22 and the common electrode 28 becomes a fifth potential difference Vp5 having a polarity different from that of the fourth potential difference Vp4.

Specifically, in the second charging period T7, the central control circuit 45 outputs, for example, the reference voltage Vsref of +1.2 V to the measurement potential generation circuit 40. Thus, the measurement potential Vs of +1.2 V is output from the measurement potential generation circuit 40. Further, in the second charging period T7, the central control circuit 45 controls the second switch SW2 and the third switch SW3 so that the second switch SW2 and the third switch SW3 come to an ON state, and controls the first switch SW1, the fourth switch SW4, and the fifth switch SW5 so that the first switch SW1, the fourth switch SW4, and the fifth switch SW5 come to an OFF state.

In the second charging period T7, the central control circuit 45 controls the first to fifth switches SW1 to SW5 as described above, so that the output terminal of the measurement potential generation circuit 40 is electrically coupled to the detection electrode 22, and the ground potential line L2 is electrically coupled to the common electrode 28. Thus, in the second charging period T7, the ground potential is supplied to the common electrode 28, and the measurement potential Vs of +1.2 V is supplied to the detection electrode 22. As a result, as illustrated in FIG. 5, in the second charging period T7, the detection electrode potential Vd becomes +1.2 V, and the common electrode potential Vc becomes 0 V. Further, as illustrated in FIG. 6, in the second charging period T7, the potential difference between the detection electrode 22 and the common electrode 28 becomes the fifth potential difference Vp5, that is, +1.2 V.

Thus, in the second charging period T7, the measurement circuit 200 supplies the measurement potential Vs of +1.2 V to the detection electrode 22 and supplies the ground potential to the common electrode 28 so that the potential difference between the detection electrode 22 and the common electrode 28 becomes the fifth potential difference Vp5 (+1.2 V) having a polarity different from that of the fourth potential difference Vp4. In the present embodiment, the second charging period T7 corresponds to a sixth period.

In the second discharging period T8 after the second charging period T7, the measurement circuit 200 stops the supply of the potential to the detection electrode 22 and supplies the same potential as that in the second charging period T7 to the common electrode 28 to measure the detection electrode potential Vd at least once, for example, at the time of the end of the second discharging period T8.

Specifically, in the second discharging period T8, the central control circuit 45 outputs, for example, the reference voltage Vsref of +1.2 V to the measurement potential generation circuit 40. Thus, the measurement potential Vs of +1.2 V is output from the measurement potential generation circuit 40. Further, in the second discharging period T8, the central control circuit 45 controls the third switch SW3 so that the third switch SW3 comes to an ON state and controls the first switch SW1, the second switch SW2, the fourth switch SW4, and the fifth switch SW5 so that the first switch SW1, the second switch SW2, the fourth switch SW4, and the fifth switch SW5 come to an OFF state.

In the second discharging period T8, the central control circuit 45 controls the first to fifth switches SW1 to SW5 as described above, so that the output terminal of the measurement potential generation circuit 40 is electrically decoupled from the detection electrode 22 and the ground potential line L2 is electrically coupled to the common electrode 28. Thus, in the second discharging period T8, since the ground potential is continuously supplied to the common electrode 28, but supply of the potential to the detection electrode 22 is stopped, the liquid crystal layer 4 discharges charge charged in the second charging period T7. As a result, as illustrated in FIG. 5, in the second discharging period T8, the detection electrode potential Vd gradually changes from +1.2 V to the potential (0 V) applied to the common electrode 28 and reaches the potential Vd2 at time t9. A value of the potential Vd2 depends on the number of mobile ions 85 contained in the liquid crystal layer 4. Accordingly, as will be described below, it is possible to determine the deterioration situation of the liquid crystal layer 4 by measuring the detection electrode potential Vd2 at the time of the end of the second discharging period T8.

As illustrated in FIG. 6, the detection electrode potential Vd2 at the time of the end of the second discharging period T8 corresponds to a potential difference V4 with the common electrode 28 as a reference.

The central control circuit 45, for example, measures the detection electrode potential Vd2 at time t9 when the second discharging period T8 ends. Specifically, the detection electrode potential Vd2 is amplified by the amplification circuit 43, and the output of the amplification circuit 43 is input to the A/D converter 44. In view of a driving power supply voltage (for example, 5 V) of the measurement circuit 20, high amplification is difficult. For example, when +1.1 V which is 0.1 V lower than +1.2 V is obtained as Vd2, a settable amplification factor is limited to about 4 times. On the other hand, when +0.1 V which is 0.1 V higher than 0 V is obtained as Vd1, a possible amplification factor can be 20 times or more. Accordingly, it is preferable to use the detection electrode potential Vd1 obtained through the first measurement processing for a determination of deterioration of the liquid crystal layer 4 from the viewpoint of detection sensitivity. The central control circuit 45 acquires a digital value output from the A/D converter 44 at time t9 as the measured value of the detection electrode potential Vd2. The central control circuit 45 stores the measured value of the detection electrode potential Vd2 obtained at time t9 in the measured value storage circuit 46.

Thus, in the second discharging period T8, the measurement circuit 200 stops supply of the potential to the detection electrode 22 and supplies the same ground potential as that in the second charging period T7 to the common electrode 28 to measure the detection electrode potential Vd2 at least once, for example, at time t9 when the second discharging period T8 ends. In the present embodiment, the second discharging period T8 corresponds to a seventh period. In the description, the detection electrode potential Vd (Vd1 or Vd2) is measured in each of the first measurement processing and the second measurement processing, but the measurement may be performed in at least one of the first measurement processing and the second measurement processing.

The second measurement processing has been described above.

The second reverse sweep period T5 is preferably longer than one frame period in the display region E. For example, when the one frame period is about 16 ms, the second reverse sweep period T5 is equal to or longer than 20 ms. Further, in the above description, a case in which the fourth potential difference Vp4 in the second reverse sweep period T5 is −5 V has been exemplified, but the absolute value of the fourth potential difference Vp4 is preferably equal to or higher than the maximum applied voltage of the liquid crystal layer 4 of the pixel P in normal driving. In other words, the absolute value of the fourth potential difference Vp4 is preferably equal to or greater than the maximum applied voltage of the liquid crystal layer 4 in the display region E. A reason that a length of the second reverse sweep period T5 and the absolute value of the fourth potential difference Vp4 are set as described above will be described below.

The second charging period T7 is preferably shorter than one frame period in the display region E. For example, when the one frame period is about 16 ms, the second charging period T7 is 5 ms. Further, in the above description, a case in which an absolute value of the fifth potential difference Vp5 in the second charging period T7 is 1.2 V has been exemplified, but the absolute value of the fifth potential difference Vp5 is preferably greater than 0 V and smaller than the threshold voltage Vth of the liquid crystal layer 4 as described above. A reason that a length of the second charging period T7 and the absolute value of the fifth potential difference Vp5 are set as described above will be described below.

Further, in the above description, a case in which the absolute value of the sixth potential difference Vp6 in the second relaxation period T6 is 1.2 V which is the same as the absolute value of the fifth potential difference Vp5 has been exemplified, but the absolute value of the sixth potential difference Vp6 is preferably greater than 0 V and smaller than the threshold voltage Vth of the liquid crystal layer 4 as described above. A reason that the absolute value of the sixth potential difference Vp6 is set as described above will be described below. Further, the absolute value of the sixth potential difference Vp6 does not necessarily have to be the same as the absolute value of the fifth potential difference Vp5. Further, the potential difference may change gradually with time, for example, in a process in which change occurs from the fourth potential difference Vp4 to the sixth potential difference Vp6.

For the same reason in the first discharging period T4, the second discharging period T8 is preferably longer than one frame period in the display region E. For example, the second discharging period T8 is 100 ms or 200 ms. The length of the first discharging period T4 or the second discharging period T8 is not limited to that described above. For example, the length can be adjusted by the absolute value of the second potential difference Vp2 (the fifth potential difference Vp5), the mobility of the mobile ions which are degradation products of the liquid crystal that is a measurement target, and the like. To be more specific, for example, when the absolute value of the second potential difference Vp2 (the fifth potential difference Vp5) is 0.8 V smaller than 1.2 V in the embodiment, a time of the detection electrode potential variation due to the movement of the mobile ions is delayed, and thus, the first discharging period T4 (the second discharging period T8) having a long time may be suitable. For example, the time 400 ms or more.

As understood from FIG. 6, the liquid crystal layer 4 in a region of the detection electrode 22 is AC-driven by alternately repeating the first measurement processing and the second measurement processing as described above. Thus, it is possible to curb deterioration of the liquid crystal layer 4 due to application of a DC voltage to the liquid crystal layer 4 at the time of measurement of ng the physical property of the liquid crystal layer 4.

Hereinafter, the description will be continued with reference to FIG. 4.

As already described above, the central control circuit 45 alternately executes the first measurement processing and the second measurement processing until the count value K becomes equal to the upper limit value Kmax. When the count value K is equal to the upper limit value Kmax (step S16: Yes), the central control circuit 45 proceeds to step S17, which will be described below. When all the measurement processes end, for example, the central control circuit 45 controls the fifth switch SW5 so that the fifth switch SW5 comes to an ON state and controls the third switch SW3 and the fourth switch SW4 so that the third switch SW3 and the fourth switch SW4 come to an OFF state. Accordingly, the common potential Vcom is applied to the common electrode 28. Further, the central control circuit 45 outputs the common potential Vcom as the reference voltage Vsref. Further, the second switch SW2 is controlled so that the second switch SW2 is ON, and the first switch SW1 is controlled so that the first switch SW1 comes to an OFF state. As a result, the common potential Vcom is applied to the first node N1, that is, the detection electrode 22.

In step S17, the display information generation circuit 47 creates display data indicating a deterioration situation of the liquid crystal layer 4 based on measured values of the detection electrode potentials Vd1 and Vd2 stored in the measured value storage circuit 46. At the time of the normal driving of the liquid crystal panel 100, the central control circuit 45 displays the display data generated by the display information generation circuit 47 in the display region E of the liquid crystal panel 100 via a panel control circuit. A display of the deterioration situation of the liquid crystal layer 4 may be performed only when it is necessary to notify a user, such as when the liquid crystal panel 100 is approaching an end of its life and the measured values of the detection electrode potentials Vd1 and Vd2 reach a preset threshold Vd_th.

Further, a display indicating the deterioration situation of the liquid crystal layer 4 may be performed by a projection-type display apparatus using the liquid crystal apparatus 1000, which will be described below. For example, when the projection-type display apparatus is a three-panel type projection-type display apparatus including three liquid crystal apparatuses 1000 corresponding to RGB, the projection-type display apparatus may integrally display deterioration situations of the liquid crystal panels 100 of the three liquid crystal apparatuses 1000 instead of the liquid crystal apparatus 1000 individually displaying the deterioration situation of the liquid crystal layer 4.

In step S18, the central control circuit 45 transmits data regarding the measurement results to the projection-type display apparatus using the liquid crystal apparatus 1000. The projection-type display apparatus performs necessary processing such as reporting processing using a reporting means such as an audio apparatus or a warning lamp based on data indicating the deterioration situation of the liquid crystal layer 4. Further, step S18 may be omitted depending on a specification of the projection-type display apparatus using the liquid crystal apparatus 1000.

Measurement results of the deterioration situation of the liquid crystal layer 4 can also be displayed from the maintenance menu of the projection-type display apparatus using the liquid crystal apparatus 1000. The maintenance menu is implemented, for example, as a part of a setting menu in the projection-type display apparatus. In step S10, when the central control circuit 45 receives a measurement result display instruction command from the projection-type display apparatus using the liquid crystal apparatus 1000, the central control circuit 45 proceeds to step S17 and displays the measurement results in the display region E of the liquid crystal panel 100.

1-4. Overview of Relationship Between Usage Time and Discharging Characteristics of Liquid Crystal Panel 100

Figure 7:
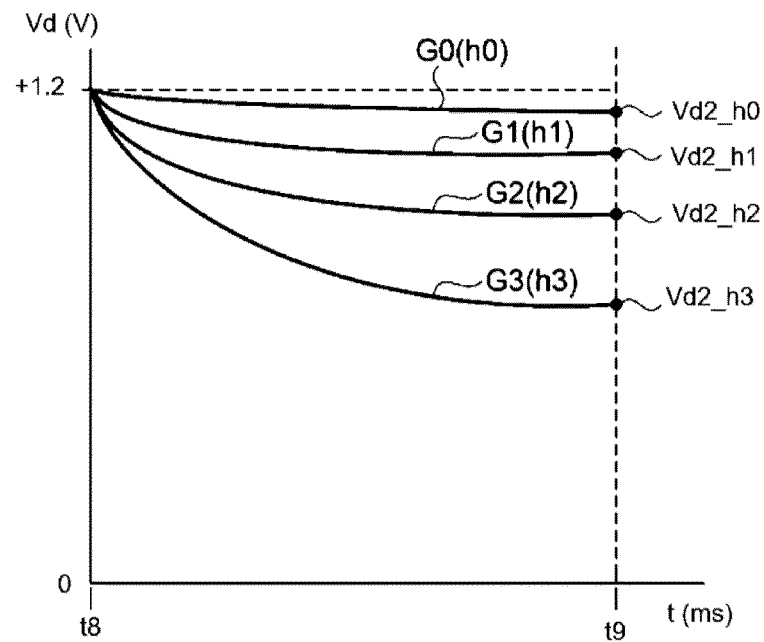
FIG. 7 is a diagram illustrating a relationship between a usage time and discharging characteristics.

FIG. 7 is a graph showing a relationship between a usage time and discharging characteristics of the liquid crystal panel 100. The usage time is, for example, a cumulative usage time. In a projection-type display apparatus, the usage time corresponds to, for example, a cumulative lighting time. Since an enormous amount of time is required to verify the cumulative usage time (lighting time) through an experiment, description will be given with data obtained when a continuous acceleration test with an incident light intensity or temperature higher than an actual usage condition is performed. Specifically, the discharging characteristics are, for example, change over time of the detection electrode potential Vd in the second discharging period T8 illustrated in FIG. 5. A vertical axis in FIG. 7 represents the detection electrode potential Vd in the second discharging period T8. A horizontal axis in FIG. 7 represents time in the second discharging period T8. In FIG. 7, time t8 corresponds to time t8 illustrated in FIG. 5, that is, a start time of the second discharging period T8. Further, in FIG. 7, time t9 corresponds to time t9 illustrated in FIG. 5, that is, an end time of the second discharging period T8. For example, time t9 is a time after 150 ms from time t8. Therefore, when the horizontal axis represents elapsed time from the start of discharging, time t8 is zero and time t9 is 150.

In FIG. 7, a discharging curve G0 indicates a discharging curve at the start of usage of the liquid crystal panel 100, that is, at a usage time h0 when the usage time is 0, and a discharging curve G3 indicates a discharging curve at a usage time h3 immediately before the liquid crystal panel 100 reaches the end of life. A discharging curve G1 indicates a discharging curve at a point in time when a usage time h1 has elapsed from the start of usage of the liquid crystal panel 100, and a discharging curve G2 indicates a discharging curve at a point in time when a usage time h2 has elapsed from the start of usage of the liquid crystal panel 100. Here, a relationship between the usage times is h0<h1<h2<h3.

In each discharging curve, the detection electrode potential Vd at time t8 is close to +1.2 V, but the detection electrode potential Vd at time t9, that is, the detection electrode potential Vd2 differs. That is, the detection electrode potential Vd2 decreases with progress of the test under the continuous acceleration test.

Thus, when the usage time of the liquid crystal panel 100 increases, the detection electrode potential Vd2 at time t9 decreases. This is because the mobile ions 85 in the liquid crystal layer 4 increase due to a chemical reaction caused by incidence of high-intensity light with the usage time of the liquid crystal panel 100, and the discharging curve changes. In the present embodiment, the determination circuit 45*a* determines the deterioration situation of the liquid crystal layer 4 based on the measured value of the detection electrode potential Vd2 stored in the measured value storage circuit 46.

Figure 8:
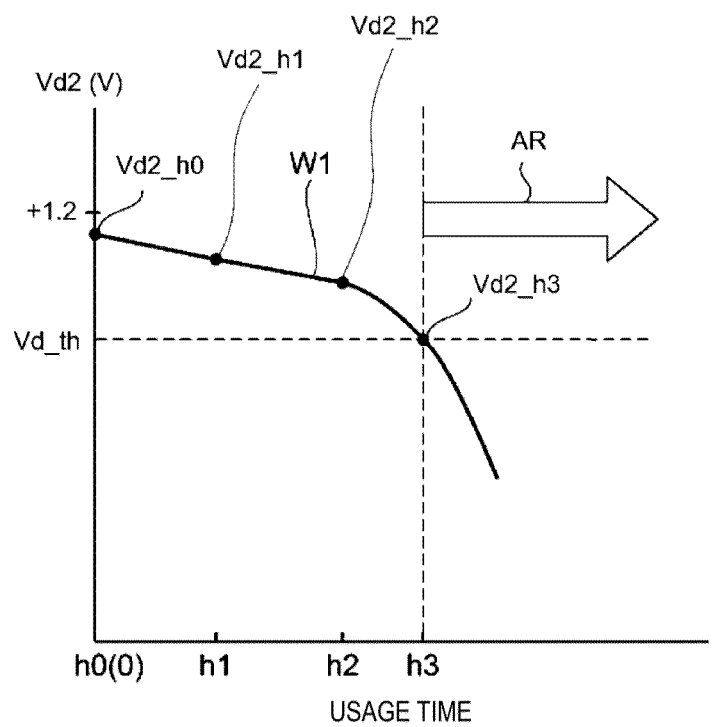
FIG. 8 is a diagram illustrating a relationship between the usage time and a measured value.

FIG. 8 is a graph showing a relationship between the usage time of the liquid crystal panel 100 and the detection electrode potential Vd2 at time t9. A vertical axis represents the detection electrode potential Vd2 at time t9, and a horizontal axis represents the usage time of the liquid crystal panel 100.

As illustrated in FIG. 8, the value of the detection electrode potential Vd2 at time t9 changes depending on lengths of the usage times h0, h1, h2, and h3 of the liquid crystal panel 100, and transitions along a transition line W1. Typically, a value indicated by the transition line W1 gradually decreases as the usage time increases. That is, the detection electrode potential Vd2 gradually decreases in an order of Vd2_*h*0, Vd2_*h*1, Vd2_*h*2, and Vd2_*h*3 The value indicated by the transition line W1 shows that, from the vicinity exceeding the usage time h3, a rate of a decrease in the measured value Vd2 to an increase in the usage time increases rapidly, and when the usage time h3 is exceeded, the number of mobile ions 85 in the liquid crystal layer 4 rapidly increases and the liquid crystal panel 100 reaches the end of the life. Thus, the transition line W1 changes non-linearly with respect to the usage time of the liquid crystal panel 100. For display quality, it has been confirmed that, after a time indicated by an arrow AR beyond the usage time h3, occurrence of stains or unevenness on a display screen becomes noticeable, a corresponding decrease in brightness also occurs, and thus the display quality is degraded.

When the measured value of the detection electrode potential Vd2 falls below the threshold Vd_th, a control program for the central control circuit 45 is set up in the determination circuit 45*a* to report to the user or an administrator that the liquid crystal panel 100 is reaching the end of the life. Alternatively, as will be described below, the control program of the central control circuit 45 that can confirm a relationship between a usage time of the liquid crystal panel 100 up to now and the detection electrode potential Vd2 is set up.

Further, the measured value of the detection electrode potential Vd2 to be compared with the threshold Vd_th may be an average value of a plurality of measured values. Further, the threshold Vd_th may be changed depending on a situation in which the liquid crystal panel 100 is used. For example, when higher display quality is required or when maintenance of the liquid crystal panel 100 takes time, the threshold Vd_th may be set to a detection electrode potential Vd2_*h*2 corresponding to the usage time h2 so that the report can be made early.

Further, the determination circuit 45*a* may determine the deterioration situation of the liquid crystal panel 100 based on the measured value of the detection electrode potential Vd1 obtained at the time of the end of the first discharging period T4. In this case, the threshold Vd_th to be compared with the measured value of the detection electrode potential Vd1 obtained at the time of the end of the first discharging period T4 may be set to a value different from the threshold Vd_th to be compared with the measured value of the detection electrode potential Vd2 obtained at the time of the end of the second discharging period T8.

1-5. Operations and Effects of First Reverse Sweep Period T1 and Second Reverse Sweep Period T5

As described above, in the present embodiment, the first reverse sweep period T1 is inserted at the beginning of the first measurement period T10, and the second reverse sweep period T5 is inserted at the beginning of the second measurement period T20. Thus, the mobile ions 85 contained in the liquid crystal layer 4 can be effectively initially disposed in either the common electrode 28 or the detection electrode 22 immediately after the start of the first measurement period T10 and immediately after the start of the second measurement period T20. By adjusting an initial disposition of the mobile ions 85 in this manner, it is easy for measurement reproducibility to be obtained. Since an influence of an internal electric field due to the mobile ions 85 is also reflected in the measured value, it is easy for an increase in the mobile ions 85 to appear as change in the measured value.

Each of the first reverse sweep period T1 and the second reverse sweep period T5 is preferably longer than one frame period. For example, each of the first reverse sweep period T1 and the second reverse sweep period T5 is equal to or longer than 20 ms. Thus, among the mobile ions 85 contained in the liquid crystal layer 4, the mobile ions 85 having low mobility can also be effectively initially disposed. It is difficult for the mobile ions 85 having low mobility to move in the liquid crystal layer 4. Therefore, when the first reverse sweep period T1 and the second reverse sweep period T5 are normal frame periods, it is difficult to control the initial disposition of the mobile ions 85 having low mobility within the normal frame period. Even when the measured value is obtained in a state in which the initial disposition of the mobile ions 85 having low mobility cannot be controlled, sufficient measurement reproducibility may not be obtained.

Figure 9:
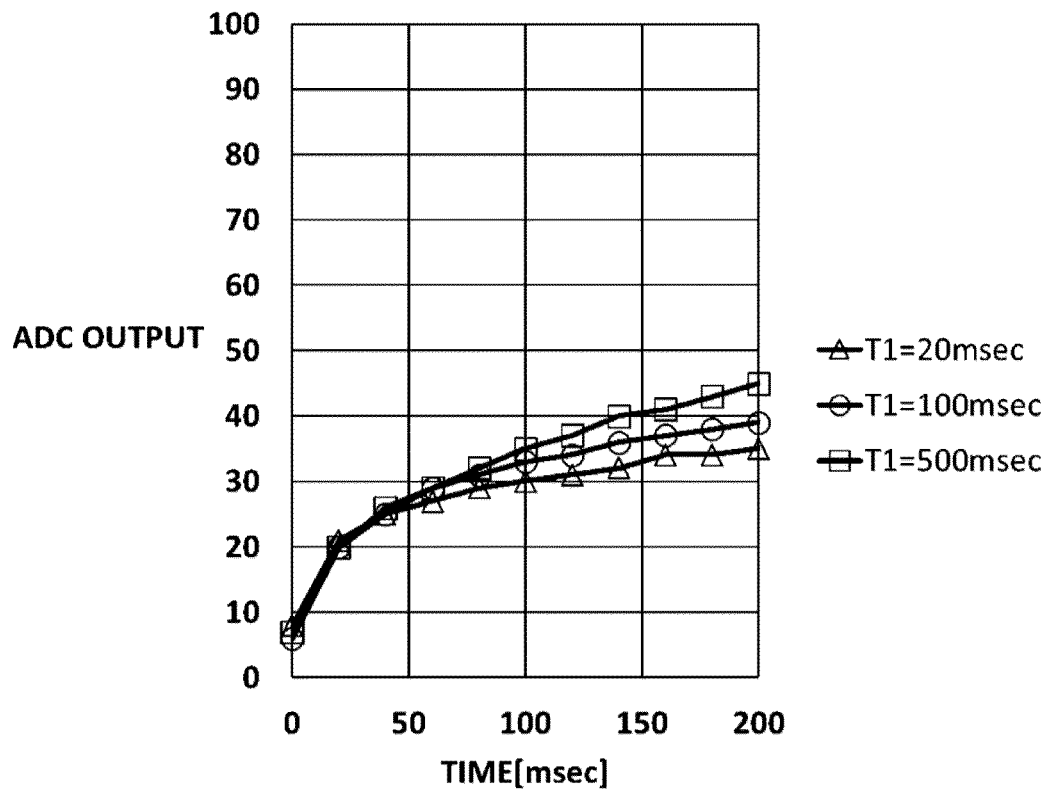
FIG. 9 is a diagram illustrating an effect of a reverse sweep period.

FIG. 9 is a diagram illustrating effects of the first reverse sweep period T1 and the second reverse sweep period T5. Detailed actual measurement data illustrated in FIG. 9 and subsequent figures is basically the result obtained by applying the voltage illustrated in FIG. 6 to the liquid crystal layer 4, and there is no problem in describing an operation of the first reverse sweep period T1 or the like. FIG. 9 illustrates measurement results for the detection electrode potential Vd in the first discharging period T4 for each of a case in which the first reverse sweep period T1 is 20 ms, a case in which the first reverse sweep period T1 is 100 ms, and a case in which the first reverse sweep period T1 is 500 ms. More specifically, the results illustrated in FIG. 9 are results obtained by amplifying the detection electrode potential Vd in the first discharging period T4 by 11 times and performing measurement for each of the three cases at a very initial stage of a deterioration test of the liquid crystal panel 100.

In FIG. 9, a horizontal axis represents time from the start of discharging in the first discharging period T4, and a vertical axis represents the measured value of the detection electrode potential Vd in the first discharging period T4. The first discharging period T4 is 200 ms. In FIG. 9, a vertical axis represents the measured value of the detection electrode potential Vd as a digital value output from the A/D converter 44. In this measurement, an A/D converter with 10-bit specification is used as s, and a measured value 1023 corresponds to about 2.5 V.

As illustrated in FIG. 9, when the first reverse sweep period T1 is longer, the measured value at the time of the end of the first discharging period T4 becomes greater. The reason for this is that the first reverse sweep period T1 is inserted at the beginning of the first measurement period T10 so that in particular, the mobile ions 85 having low mobility are effectively initially disposed on any one of the common electrode 28 and the detection electrode 22. These results suggest that, by lengthening the first reverse sweep period T1 and the second reverse sweep period T5, progress of deterioration of the liquid crystal layer 4 can be tracked with high sensitivity from the initial use of the liquid crystal panel 100. Further, although FIG. 9 illustrates the difference at the very initial stage of the continuous acceleration test, effects of the first reverse sweep period T1 can be confirmed also in the measurement at the time of the end of the test. The discharging characteristics clearly changed between the case in which the first reverse sweep period T1 was 20 ms and the case in which the first reverse sweep period T1 was 100 ms. Specifically, when the first reverse sweep period T1 was set to 100 ms, the measured value of the detection electrode potential Vd was clearly higher than that when the first reverse sweep period T1 was set to 20 ms.

Figure 10:
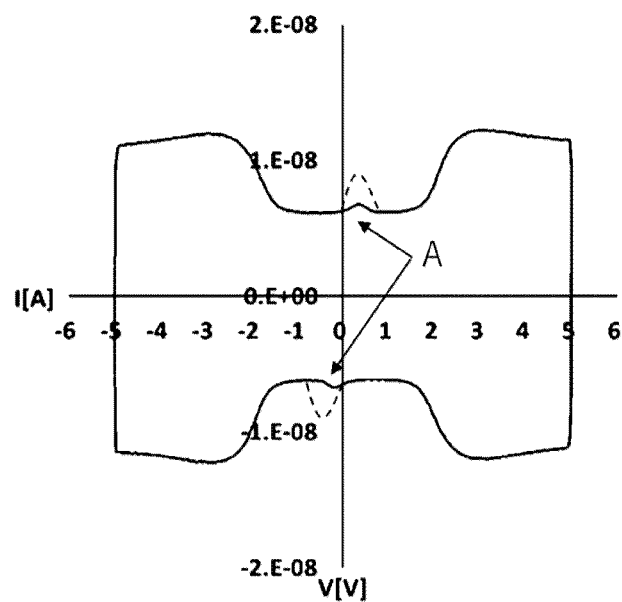
FIG. 10 is a diagram of electrical characteristics of the liquid crystal layer.

FIG. 10 is a diagram of electrical characteristics of the liquid crystal layer 4. A horizontal axis represents a voltage applied to the liquid crystal layer 4, and a vertical axis represents a current. The electrical characteristics can be obtained, for example, by measuring the current when a triangular wave voltage of +5 V at 0.1 Hz is applied to the liquid crystal layer 4. This scheme is a measurement method generally referred to as cyclic voltammetry. As indicated by reference sign A in FIG. 10, a current due to the mobile ions 85 typically appears as an incremental current with respect to a charging current of the liquid crystal layer 4 and exhibits a peak current at a relatively low voltage. As the deterioration of the liquid crystal layer 4 progresses, this peak current appears as a large peak as indicated by a broken line, for example. In the method as described above, presence of mobile ions 85 can be quantitatively evaluated using a dedicated precision measuring instrument, but it is not realistic in terms of cost to implement such a function in the projection-type display apparatus using the liquid crystal apparatus 1000. However, according to the configuration of the present application, the deterioration situation of the liquid crystal layer 4 can be quantified with a relatively simple circuit configuration.

A voltage applied to the liquid crystal layer 4 in the first reverse sweep period T1 and the second reverse sweep period T5 is preferably equal to or higher than a maximum applied voltage at the time of the normal driving of the liquid crystal panel 100. In other words, the absolute value of the first potential difference Vp1 in the first reverse sweep period T1 and the absolute value of the fourth potential difference Vp4 in the second reverse sweep period T5 are preferably equal to or higher than the maximum applied voltage at the time of the normal driving of the liquid crystal panel 100. Thus, the measurement can be performed in a state in which the influence of a display state of the liquid crystal panel 100 before the measurement is performed has been curbed. The detection electrode 22 is provided along an outer edge of the display region E and observes the mobile ions 85 diffusing along a substrate surface from the display region E. Incidentally, in each pixel P, movement of the mobile ions 85 may be limited by a driving voltage. That is, whether the mobile ions 85 exist on the common electrode 28 side or the detection electrode 22 side depends on a driving voltage of the pixel P and is uncontrolled. However, in the first reverse sweep period T1 and the second reverse sweep period T5, when the voltage applied to the liquid crystal layer 4 in the detection electrode 21 is set to be equal to or higher than the maximum applied voltage applied to the liquid crystal layer 4 at the time of the normal driving in each pixel P, the mobile ions 85 that cannot be moved by normal driving can be controlled and initially disposed. Further, when the first reverse sweep period T1 and the second reverse sweep period T5 are set to be longer than one frame, moving distances of the mobile ions 85 become longer than that at the time of normal driving, which is effective for the initial disposition. The voltage applied to the liquid crystal layer 4 in the first reverse sweep period T1 and the second reverse sweep period T5 may be a voltage equal to or higher than the threshold voltage Vth of the liquid crystal layer 4.

Figure 11:
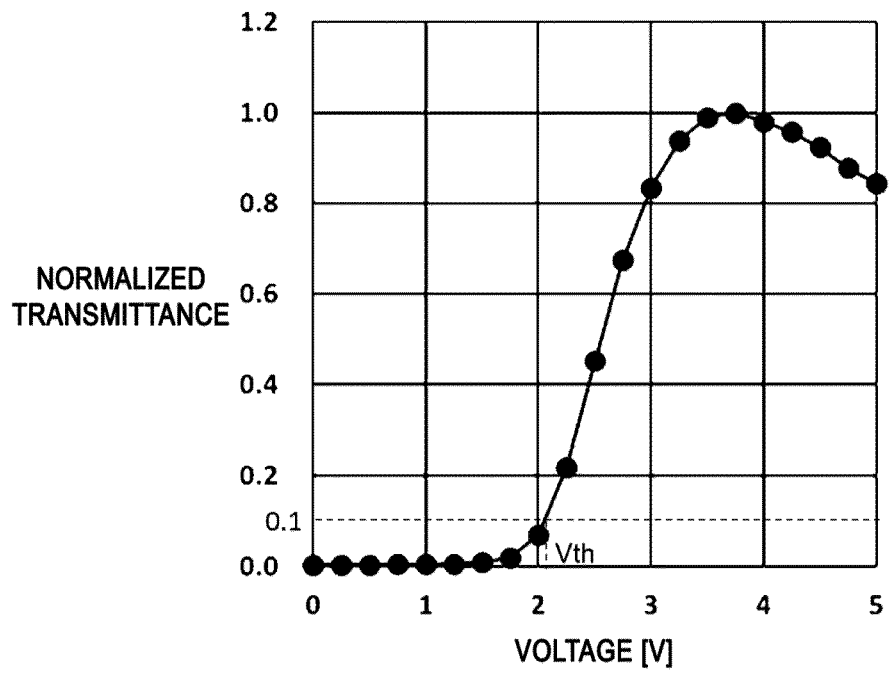
FIG. 11 is a diagram illustrating a relationship between a normalized transmittance of the liquid crystal layer and a voltage.

FIG. 11 is a graph showing a relationship between a normalized transmittance of the liquid crystal layer 4 and an applied voltage. Characteristics of the transmittance vary depending on a gap and a liquid crystal material of the liquid crystal layer 4, but for example, when the liquid crystal panel 100 is a normally black type VA liquid crystal panel and the gap of the liquid crystal layer 4 is about 2.6 µm, the transmittance of the liquid crystal layer 4 is maximized when a voltage slightly lower than 4 V is applied, as illustrated in FIG. 11. Accordingly, in the pixel P in a held state at the time of the normal driving of the liquid crystal panel 100, the maximum applied voltage of the liquid crystal layer 4 is set to a value smaller than 4 V. In this case, it is unknown whether mobile ions 85 that move at a voltage of about 4 V applied to the liquid crystal layer 4, for example, in one frame period at the time of the normal driving of the liquid crystal panel 100, in other words, in a polarity holding period of the pixel P are located on the common electrode 28 or the detection electrode 22. However, it is possible to effectively initially dispose the mobile ions 85 that move at about 4 V on either the common electrode 28 or the detection electrode 22 by applying a voltage of +5 V, which is equal to or higher than the maximum applied voltage at the time of the normal driving of the liquid crystal panel 100, to the liquid crystal layer 4 for a period longer than one frame period in the first reverse sweep period T1 and the second reverse sweep period T5. Further, the maximum applied voltage may be determined by observing the potential supplied to the data line. For example, when the common electrode 28 is driven for display with a fixed potential, the maximum applied voltage is approximately half an amplitude of a data line supply potential when the liquid crystal panel 100 is set to the maximum gradation display. In another example, when the potential of the common electrode 28 is inverted according to a display polarity, the maximum applied voltage is substantially close to the amplitude of the data line supply potential when the liquid crystal panel 100 is set to the maximum gradation display.

Further, from FIG. 9, it is possible to pick up measured values in which the effects of the first reverse sweep period T1 and the second reverse sweep period T5 are not much reflected. Specifically, as illustrated in FIG. 9, in a period from a start point in time of the first discharging period T4 to about 50 ms, there is substantially no difference between the measured values obtained in the three cases. That is, in the first discharging period T4, there are two stages of a first stage from the start point in time of the first discharging period T4 to about 50 ms, and a second stage from about 50 ms to an end point in time of the first discharging period T4. It can be considered that the measured value in the first stage reflects behaviors of the mobile ions 85 having relatively high mobility, and the measured value in the second stage reflects behaviors of the mobile ions 85 having relatively low mobility.

Accordingly, when the mobile ions 85 having relatively high mobility are focused, the measured value in the first stage may be adopted. On the other hand, when the mobile ions 85 having relatively low mobility are focused, a difference between measured values obtained at two different points in time in the second stage may be adopted. For example, this is a difference between a measured value obtained at a point in time when 50 ms has elapsed from the start point in time of the first discharging period T4 and the measured value obtained at the end point in time of the first discharging period T4. Accordingly, the measured value may not be a measured value at the time of the end of the first discharging period T4 or the second discharging period T8.

1-6. Effects of First Relaxation Period T2 and Second Relaxation Period T6

As described above, in the present embodiment, the first relaxation period T2 is inserted between the first reverse sweep period T1 and the first charging period T3 in the first measurement period T10, and the second relaxation period T6 is inserted between the second reverse sweep period T5 and the second charging period T7 in the second measurement period T20. Thus, the influence of the dielectric anisotropy of the liquid crystal layer 4 can be avoided, and the measurement can be performed without moving the accumulated mobile ions 85.

As described above, for example, the threshold voltage Vth of the liquid crystal layer 4 is about 2.1 V. That is, when the voltage applied to the liquid crystal layer 4 in the first relaxation period T2 and the second relaxation period T6 is lower than the threshold voltage Vth, the measurement can be performed while curbing the influence of the dielectric anisotropy of the liquid crystal layer 4. In other words, when the absolute value of the third potential difference Vp3 in the first relaxation period T2 and the absolute value of the sixth potential difference Vp6 in the second relaxation period T6 are greater than 0 V and smaller than the threshold voltage Vth, the measurement can be performed while curbing the influence of the dielectric anisotropy of the liquid crystal layer 4 from the first relaxation period to the first discharging period. The same applies to the second relaxation period to the second discharging period. In addition, in the first charging period T3 and the second charging period T7, it is possible to curb movement of the mobile ions 85 having high mobility. Further, when the liquid crystal layer 4 is charged and discharged at a low voltage, the mobile ions 85 having high mobility can be efficiently captured and measured.

As described above, in the present embodiment, when the transition occurs from the first reverse sweep period T1 to the first relaxation period T2, a voltage applied to the liquid crystal layer 4 is switched from +5 V to +1.2 V without change in the polarity. Further, when transition occurs from the second reverse sweep period T5 to the second relaxation period T6, the voltage applied to the liquid crystal layer 4 is switched from −5 V to −1.2 V without change in the polarity. Therefore, lengths of the first relaxation period T2 and the second relaxation period T6 are set in consideration of a response time of the liquid crystal layer 4. In consideration of the response time of the liquid crystal layer 4, the first relaxation period T2 and the second relaxation period T6 are preferably set to be longer than one frame period. For example, the first relaxation period T2 and the second relaxation period T6 are 20 ms, 50 ms, or the like. In the case of a liquid crystal material having a rapid response, the time may be set to be shorter than 20 ms.

1-7. Effects of First Charging Period T3 and Second Charging Period T7

Basically, the first charging period T3 and the second charging period 17 are preferably as short as possible. The reason for this is that, when the first charging period T3 and the second charging period T7 are shortened, it is easy for an action of the mobile ions 85 having high mobility to be captured as change in the measured value. For example, the first charging period T3 and the second charging period T7 are preferably shorter than the one frame period at the time of the normal driving of the liquid crystal panel 100.

In the present embodiment, the potential supplied to each of the common electrode 28 and the detection electrode 22 is controlled by the measurement circuit 200. The second capacitor C2 electrically coupled to the common electrode 28 has a relatively large capacitance value. Further, the third switch SW3 and the fourth switch SW4 are electrically coupled to the common electrode line L1. When an on-resistances of the third switch SW3 and the fourth switch SW4 are large, it is difficult to shorten the first charging period T3 and the second charging period T7. For example, in commercially available switch ICs, an on-resistance at the time of 5 V driving is about 1 kΩ. For example, when a capacitance value of the second capacitor C2 is 0.2 µF, 5 τ is 1 ms. When lengths of the first charging period T3 and the second charging period T7 are set to about 5 t and the amplification circuit 43 that amplifies the detection electrode potential Vd by about 10 times is used, this time constant τ is large enough to affect the measured value.

On the other hand, in the first discharging period T4 and the second discharging period T8, it is required to set off-resistances of the first switch SW1 and the second switch SW2 electrically coupled to the detection electrode 22 to sufficiently great values. When the off-resistances of the first switch SW1 and the second switch SW2 are small, this has an influence on holding of the potential of the first node N1, that is, the detection electrode potential Vd. Further, when the off-resistances of the first switch SW1 and the second switch SW2 vary greatly, this is likely to affect the measured value.

Thus, in the present embodiment, a configuration in which a relatively high second voltage of, for example, 15 V is applied to the third switch SW3 and the fourth switch SW4 in order to reduce the on-resistances of the third switch SW3 and the fourth switch SW4 is adopted. On the other hand, in the present embodiment, a configuration in which a relatively low first voltage of, for example, 5 V is applied to the first switch SW1 and the second switch SW2 in order to increase the off-resistances of the first switch SW1 and the second switch SW2 is adopted. Further, driving the first switch SW1 and the second switch SW2 with the first voltage of 5 V means that the on-resistance of each switch increases. However, since the first capacitor C1 electrically coupled to a node of the detection electrode 22 has the capacitance value smaller than that of the second capacitor C2 electrically coupled to a node of the common electrode 28, handling can be performed without a problem in terms of time constant.

In the present embodiment, a configuration in which a relatively high second voltage such as 15 V is also supplied to the fifth switch SW5 in consideration of responsiveness of the common electrode 28 at the time of the normal driving of the liquid crystal panel 100 is adopted. For example, commercially available switch ICs can be used for the first to fifth switches SW1 to SW5. That is, a driving voltage of 5 V or 15 V is applied to switch ICs used as the first to fifth switches SW1 to SW5. In this case, a power supply voltage of 5 V or 15 Vis supplied to each of the switch ICs.

Figure 12:
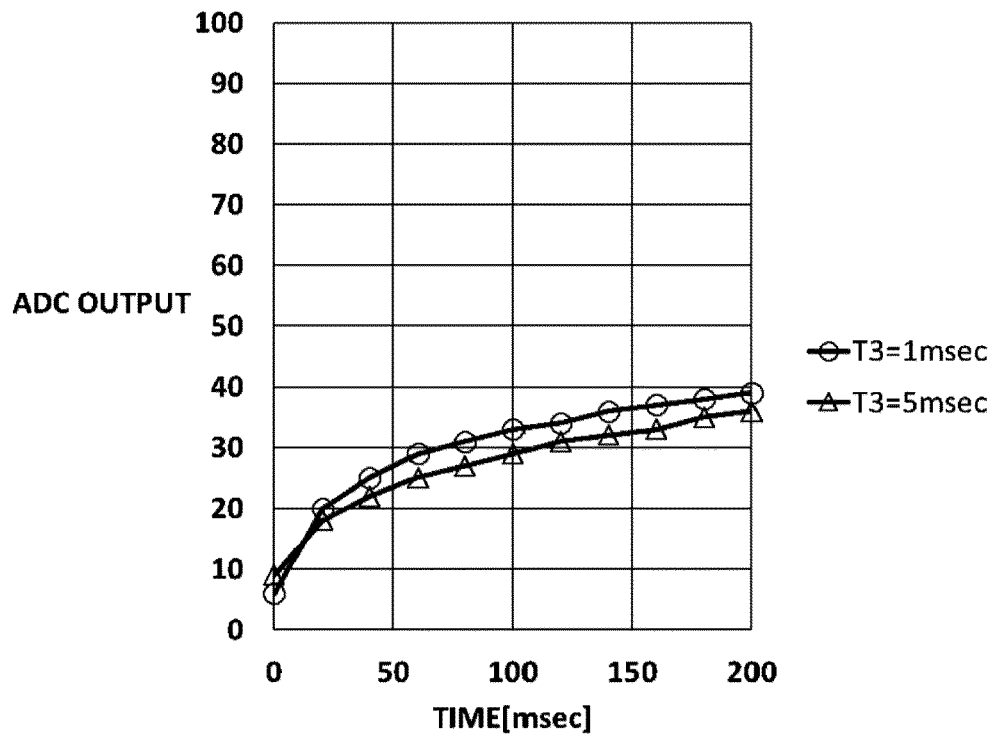
FIG. 12 is a diagram illustrating an effect of a charging period.

FIG. 12 is a diagram illustrating effects of the first charging period T3 and the second charging period T7. FIG. 12 illustrates measurement results for the detection electrode potential Vd in the first discharging period T4 for each of a case in which the first charging period T3 is 1 ms and a case in which the first charging period T3 is 5 ms. More specifically, the results are results of amplifying the detection electrode potential Vd in the first discharging period T4 by 11 times and performing measurement for each of the two cases at the very initial stage of the deterioration test of the liquid crystal panel 100.

In FIG. 12, a horizontal axis represents time from the start of discharging in the first discharging period T4, and a vertical axis represents the measured value of the detection electrode potential Vd in the first discharging period T4. As an example, the first discharging period T4 is 200 ms. Further, in FIG. 12, the vertical axis represents the measured value of the detection electrode potential Vd as a digital value output from the A/D converter 44. In this measurement, an A/D converter with 10-bit specification is used as the A/D converter 44, and a measured value 1023 corresponds to about 2.5 V.

As illustrated in FIG. 12, when the first charging period T3 is shorter, the measured value at the time of the end of the first discharging period T4 is greater. The reason for this is that the first charging period T3 is shortened so that the movement of the mobile ions 85 in the first charging period T3 is curbed, and the action of the mobile ions 85 having high mobility is efficiently reflected. These results suggest that, by lengthening the first charging period T3 and the second charging period T7, progress of deterioration of the liquid crystal layer 4 can be tracked with high sensitivity from the initial use of the liquid crystal panel 100.

When the results illustrated in FIG. 12 are observed in detail, the measured values obtained in the two cases appear to move approximately parallel to each other after 50 ms has elapsed from the start point in time of the first discharging period T4. That is, as described above, such a difference between the measured values is considered to be caused by the action of the mobile ions 85 having relatively high mobility. Thus, lengths of the first reverse sweep period T1 and the second reverse sweep period T5, and the first charging period T3 and the second charging period T7 have different effects on the measured value.

1-8. Effects of First Conductive Layer 25

As described above, in the measurement period in which the liquid crystal apparatus 1000 operates in the measurement mode, the clock signal CLY and the output control signal ENBY are supplied to the liquid crystal panel 100. Therefore, even in the first discharging period T4 and the second discharging period T8, the clock signal CLY and the output control signal ENBY are continuously supplied to a clock signal line 17 and the output control signal line 20. The clock signal CLY and the output control signal ENBY are rectangular wave signals having amplitudes as high as 15V and frequencies well exceeding the order of kHz. On the other hand, the first discharging period T4 and the second discharging period T8 are several 100 ms and are longer than a high level period or a low level period of the clock signal CLY and the output control signal ENBY. That is, the first discharging period T4 and the second discharging period T8 are longer than the period in which the potentials of the plurality of drive signal lines are held at the maximum value or the minimum value at the time of normal driving. In other words, in the first discharging period T4 and the second discharging period T8, the potential of the first drive signal line including the clock signal main line 17 and the output control signal line 20 does not become a constant potential.

Therefore, when a configuration in which the electrode lead line 23 electrically coupled to the detection electrode 22 intersects with the first drive signal line in plan view has to be adopted, a high-amplitude and high-frequency potential variation in the first drive signal line causes the potential of the detection electrode 22 to vary via a coupling capacitance generated between the lines. In the first discharging period T4 and the second discharging period T8, it is necessary to observe a slight potential change of about several 10 mV appearing in the detection electrode 22 according to a degree of progress of deterioration of the liquid crystal layer 4. Therefore, in the first discharging period T4 and the second discharging period T8, when a potential variation occurs in the detection electrode 22 due to the coupling capacitance between the electrode lead line 23 and the first drive signal line, it is difficult to accurately discriminate the degree of progress of the deterioration of the liquid crystal layer 4.

Therefore, in the present embodiment, the first conductive layer 25 electrically coupled to the common electrode 28 is disposed between the electrode lead line 23 and the first drive signal line in the region in which the electrode lead line 23 intersects with the first drive signal line in plan view. In the first discharging period T4 and the second discharging period T8, since the constant potential is supplied to the common electrode 28, the same constant potential as that for the common electrode 28 is also supplied to the first conductive layers 25. With such a configuration, in the first discharging period T4 and the second discharging period T8, a coupling capacitance generated between the electrode lead line 23 and the first drive signal line becomes negligibly small. As a result, since, in the first discharging period T4 and the second discharging period T8, an influence of the potential variation of the first drive signal line on the potential of the detection electrode 22 can be curbed, and a slight potential change that appears in the detection electrode 22 depending on the degree of progress of the deterioration of the liquid crystal layer 4 can be captured, it is possible to accurately discriminate the degree of progress of the deterioration of the liquid crystal layer 4.

1-9. Effect of Configuration in which Plurality of Drive Signal Lines do not Overlap Detection Electrode 22 in Plan View In the present embodiment, a configuration in which the plurality of drive signal lines, that is, the clock signal main line 17, the clock signal branch line 18, and the output control signal line 20 do not overlap the detection electrode 22 in plan view is adopted. By adopting such a configuration, it is possible to avoid generation of coupling capacitance between the detection electrode 22 and the plurality of drive signal lines. As a result, in the first discharging period T4 and the second discharging period T8, an influence of the potential variation of the plurality of drive signal lines on the potential of the detection electrode 22 can be further curbed, and a slight potential change appearing in the detection electrode 22 depending on the degree of progress of the deterioration of the liquid crystal layer 4 can be more accurately captured, it is possible to discriminate the degree of progress of the deterioration of the liquid crystal layer 4 more accurately.

1-10. Tracking of Progress of Deterioration of Liquid Crystal Layer 4

Figure 13:
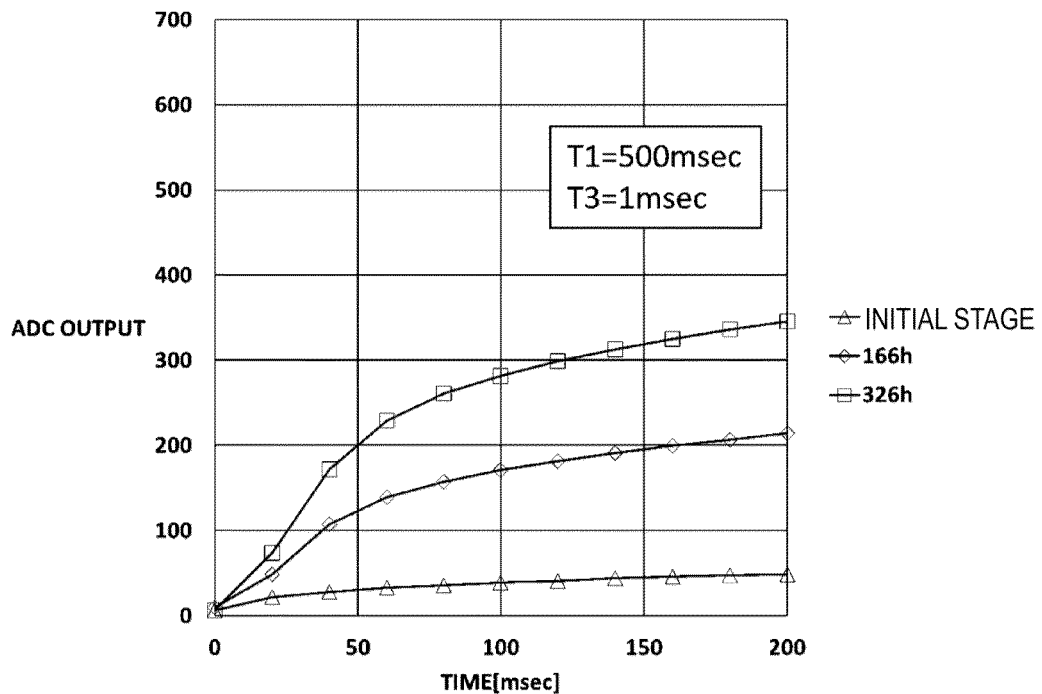
FIG. 13 is a first diagram illustrating results of tracking progress of deterioration of a liquid crystal layer.
Figure 14:
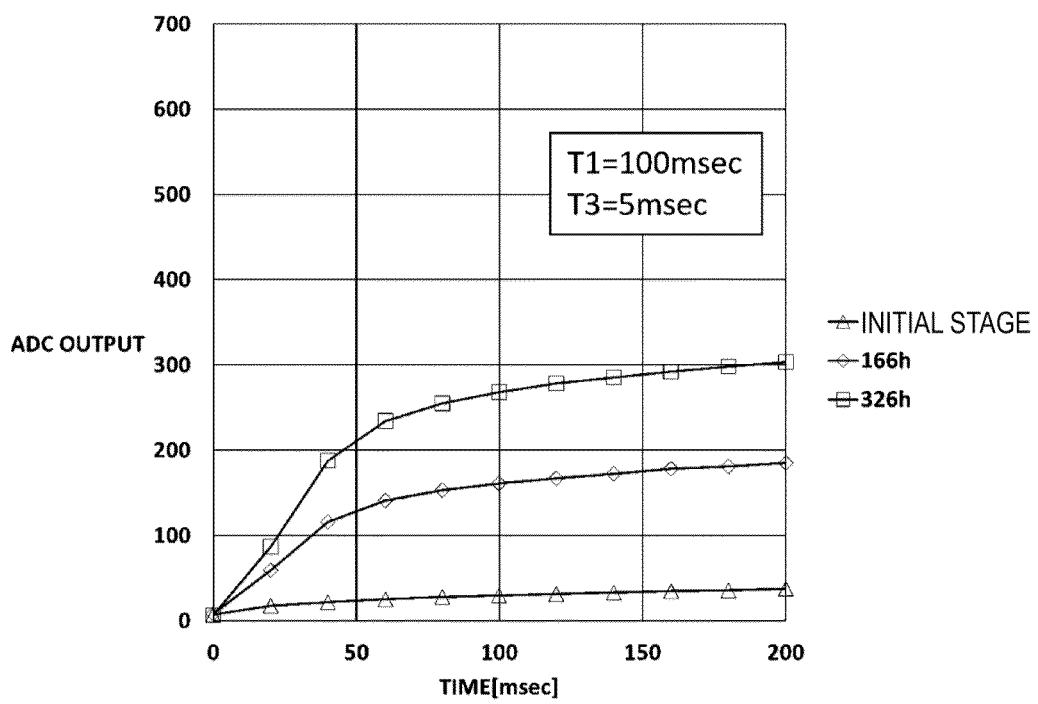
FIG. 14 is a second diagram illustrating results of tracking progress of deterioration of the liquid crystal layer.

FIG. 13 is a first diagram illustrating results of tracking of the progress of the deterioration of the liquid crystal layer 4. FIG. 14 is a second diagram illustrating results of tracking of the progress of the deterioration of the liquid crystal layer 4. Specifically, a continuous acceleration test in which the display region E was irradiated with blue light of 12 W/Cm2 for a predetermined time while the liquid crystal panel 100 is cooled to a condition of about 65° C. was performed. FIGS. 13 and 14 illustrate measurement results for the detection electrode potential Vd in the first discharging period T4 for each of a case in which an irradiation time is 0 hours (initial), a case in which the irradiation time is 166 hours, and a case in which the irradiation time is 326 hours.

Further, the results illustrated in FIG. 13 are results of measuring the detection electrode potential Vd in the first discharging period T4 under the condition that the first reverse sweep period T1 is set to 500 ms and the first charging period T3 is set to 1 ms. The results illustrated in FIG. 14 are measurement results of the detection electrode potential Vd in the first discharging period T4 under the condition that the first reverse sweep period T1 is set to 100 ms and the first charging period T3 is set to 5 ms.

In FIGS. 13 and 14, a horizontal axis represents time from the start of discharging in the first discharging period T4, and a vertical axis represents the measured value of the detection electrode potential Vd in the first discharging period T4. The first discharging period T4 is 200 ms. Further, in FIGS. 13 and 14, the vertical axis represents the measured value obtained by amplifying the detection electrode potential Vd by 11 times as a digital value output from the A/D converter 44. In this measurement, an A/D converter with 10-bit specification is used as the A/D converter 44, and a measured value 1023 corresponds to about 2.5 V.

As illustrated in FIGS. 13 and 14, according to the present embodiment, it can be seen that the progress of the deterioration of the liquid crystal layer 4 can be tracked with high sensitivity from the start of irradiation of the liquid crystal panel 100 with blue light, that is, from an initial stage of usage of the liquid crystal panel 100. Further, in the liquid crystal panel 100 used in an experiment, since a power supply wiring or the like of a peripheral circuit or the like is also disposed to reflect an actual product, the experimental results illustrated in FIGS. 13 and 14 are experimental results in which an influence of a parasitic capacitance of the detection electrode 22 is taken into consideration. Accordingly, it can be said from the experimental results illustrated in FIGS. 13 and 14 that the liquid crystal apparatus 1000 of the present embodiment has sufficient practicability so that the progress of the deterioration of the liquid crystal layer 4 can be detected as a change in voltage value.

1-11. Verification of Measurement Reproducibility

Figure 15:
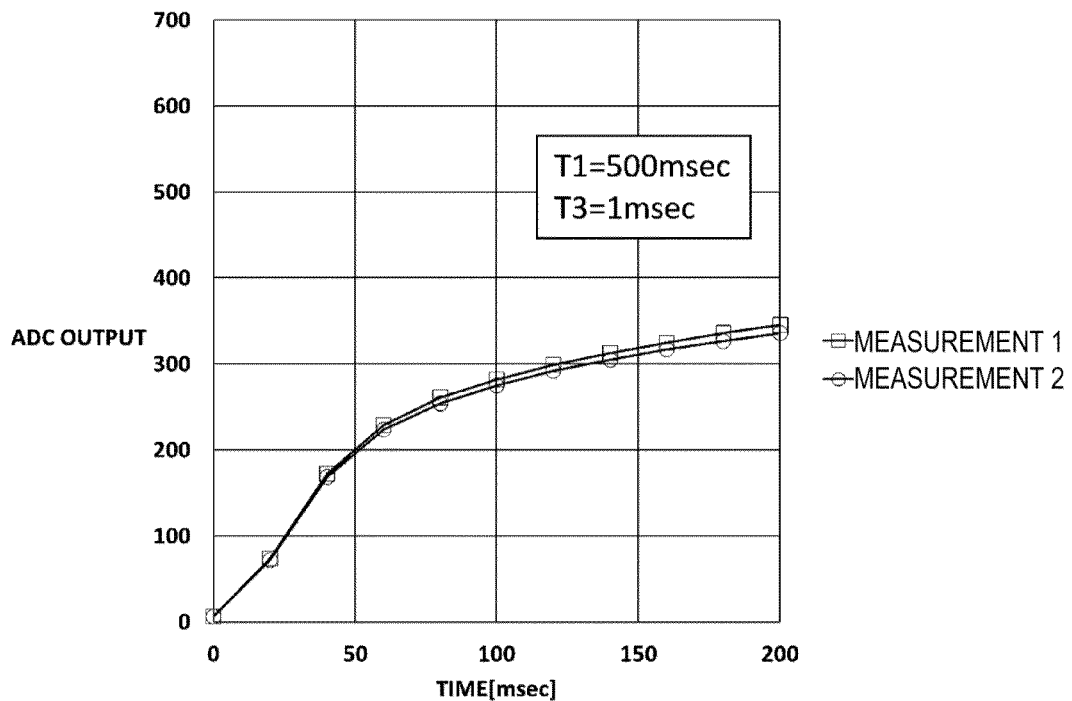
FIG. 15 is a first diagram illustrating results of verification of measurement reproducibility.
Figure 16:
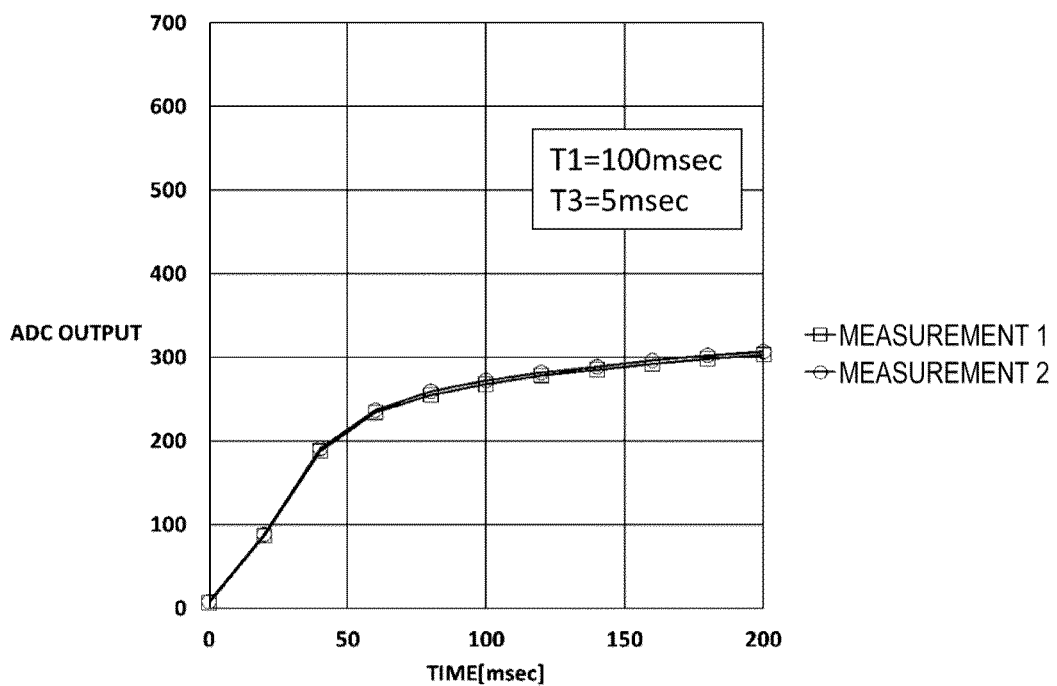
FIG. 16 is a second diagram illustrating results of verifying measurement reproducibility.

FIG. 15 is a first diagram illustrating results of verification of measurement reproducibility. FIG. 16 is a second diagram illustrating results of verifying measurement reproducibility. Specifically, FIG. 15 illustrates results acquired after 326 hours of the continuous acceleration test have elapsed in the experiment illustrated in FIG. 13. Similarly, FIG. 16 illustrates results acquired after 326 hours of the continuous acceleration test have elapsed in the experiment illustrated in FIG. 14. FIGS. 15 and 16 illustrate results of measuring the detection electrode potential Vd twice in the first discharging period T4 under respective measurement conditions. In FIGS. 15 and 16, measurement 1 indicates a first measurement result, and measurement 2 indicates a second measurement result. The second measurement was performed after a predetermined time had passed from the first measurement.

Further, the results illustrated in FIG. 15 are results of measuring the detection electrode potential Vd in the first discharging period T4 under the condition that the first reverse sweep period T1 is set to 500 ms and the first charging period T3 is set to 1 ms. The results illustrated in FIG. 16 are measurement results of the detection electrode potential Vd in the first discharging period T4 under the condition that the first reverse sweep period T1 is set to 100 ms and the first charging period T3 is set to 5 ms.

In FIGS. 15 and 16, a horizontal axis represents time from the start of discharging in the first discharging period T4, and a vertical axis represents the measured value of the detection electrode potential Vd in the first discharging period T4. The first discharging period T4 is 200 ms. Further, in FIGS. 15 and 16, the vertical axis represents the measured value obtained by amplifying the detection electrode potential Vd by 11 times as a digital value output from the A/D converter 44. In this measurement, an A/D converter with 10-bit specification is used as the A/D converter 44, and a measured value 1023 corresponds to about 2.5 V.

As illustrated in FIGS. 15 and 16, according to the present embodiment, it can be seen that the measurement can be performed with sufficient reproducibility. When the first reverse sweep period T1 and the second reverse sweep period T5 are not present, there is a possibility that such measurement reproducibility cannot be obtained depending on what has been performed electrically on the liquid crystal layer 4 of the liquid crystal panel 100 before the measurement. For example, when the measurement including charging and discharging of +1.2 V (the first charging period T3 and the first discharging period T4 performed at −1.2 V, and the second charging period T7 and the second discharging period T8 performed at +1.2 V) in the detection electrode 22 is performed, a phenomenon in which measured values change before and after optical characteristics such as voltage-transmittance of the display region E in FIG. 11 are measured may occur.

Effects of First Embodiment

As described above, the liquid crystal apparatus 1000 of the first embodiment includes the first substrate 51, the liquid crystal layer 4, the second substrate 81 facing the first substrate 51 via the liquid crystal layer 4, the detection electrode 22 disposed between the first substrate 51 and the liquid crystal layer 4, the common electrode 28 disposed between the second substrate 81 and the liquid crystal layer 4, the electrode lead line 23 disposed between the first substrate 51 and the liquid crystal layer 4 and electrically coupled to the detection electrode 22, the plurality of drive signal lines (the clock signal main line 17, the clock signal branch line 18, and the output control signal line 20) disposed between the first substrate 51 and the liquid crystal layer 4 and including the first drive signal line (the clock signal main line 17 and the output control signal line 20) intersecting with the electrode lead line 23 in plan view, the first conductive layer 25 disposed between the electrode lead line 23 and the first drive signal line and electrically coupled to the common electrode 28, and the measurement circuit 200 electrically coupled to each of the detection electrode 22 and the common electrode 28. The measurement circuit 200 supplies a potential to each of the detection electrode 22 and the common electrode 28 so that the potential difference between the detection electrode 22 and the common electrode 28 becomes the first potential difference Vp1 in the first reverse sweep period T1, supplies a potential to each of the detection electrode 22 and the common electrode 28 so that the potential difference becomes the second potential difference Vp2 having a polarity different from that of the first potential difference Vp1 in the first charging period T3, and stops the supply of the potential to the detection electrode 22 and supplies the same potential as that in the first charging period T3 to the common electrode 28 in the first discharging period T4 to measure the detection electrode potential Vd at least once.

As described above, in the present embodiment, the first reverse sweep period T1 is inserted before the first charging period T3 and the first discharging period T4. Thus, in the first reverse sweep period T1, the mobile ions 85 included in the liquid crystal layer 4 can be effectively initially disposed in either the common electrode 28 or the detection electrode 22. For example, positive ions are initially disposed in an electrode to which a negative potential is supplied among the common electrode 28 and the detection electrode 22, and negative ions are initially disposed in an electrode to which a positive potential is supplied among the common electrode 28 and the detection electrode 22. Thus, it is possible to obtain measurement reproducibility for the measured value of the detection electrode potential Vd obtained in the first discharging period T4 by adjusting the initial disposition of the mobile ions 85 before the first charging period T3 starts. Further, since an influence of an internal electric field due to the mobile ions 85 is also reflected in the measured value, it is easy for an increase in the mobile ions 85 to appear as change in the measured value. As a result, the progress of the deterioration of the liquid crystal layer 4 can be tracked with high sensitivity from initial use of the liquid crystal panel 100.

The first conductive layer 25 is disposed between the electrode lead line 23 and the first drive signal line, and is electrically coupled to the common electrode 28. Therefore, in the first discharging period T4, the constant potential of +1.2 V is also supplied to the first conductive layer 25 disposed between the electrode lead line 23 and the first drive signal line. Accordingly, in the first discharging period T4, the coupling capacitance generated between the electrode lead line 23 and the first drive signal line intersecting with each other in plan view becomes negligibly small. As a result, in the first discharging period T4, the influence of the potential variation of the first drive signal line on the potential of the detection electrode 22 can be curbed, and a slight potential change that appears in the detection electrode 22 depending on the degree of progress of the deterioration of the liquid crystal layer 4 can be captured, it is possible to accurately discriminate the degree of progress of the deterioration of the liquid crystal layer 4. Further, since the measurement can be performed even when the potential of the first drive signal line changes, it is not necessary to stop the clock signal or the like and it is possible to curb an increase in a register setting of the first control circuit.

In the liquid crystal apparatus 1000 of the first embodiment, the plurality of drive signal lines do not overlap the detection electrode 22 in plan view.

By adopting such a configuration, it is possible to avoid generation of the coupling capacitance between the detection electrode 22 and the plurality of drive signal lines. As a result, in the first discharging period T4 and the second discharging period T8, the influence of the potential variation of the plurality of drive signal lines on the potential of the detection electrode 22 can be further curbed, and the slight potential change appearing in the detection electrode 22 depending on the degree of progress of the deterioration of the liquid crystal layer 4 can be more accurately captured, it is possible to discriminate the degree of progress of the deterioration of the liquid crystal layer 4 more accurately.

The liquid crystal apparatus 1000 of the first embodiment further includes the first control circuit (the central control circuit 45 and the drive IC 310) that controls the potentials of the plurality of drive signal lines, and the first control circuit changes the potentials of the plurality of drive signal lines into a rectangular waveform at least in the first discharging period T4.

Thus, in the first discharging period T4, when the potentials of the plurality of drive signal lines change into the rectangular waveform, the potential variation in the rectangular waveform in the first drive signal line causes the potential of the detection electrode 22 to vary via the coupling capacitance generated between the electrode lead line 23 and the first drive signal line intersecting with each other in plan view. However, in the first discharging period T4, the constant potential is supplied to the first conductive layer 25 disposed between the electrode lead line 23 and the first drive signal line, so that the coupling capacitance generated between the electrode lead line 23 and the first drive signal line becomes negligibly small. As a result, in the first discharging period T4, the influence of the potential variation of the first drive signal line on the potential of the detection electrode 22 can be curbed, and a slight potential change that appears in the detection electrode 22 depending on the degree of progress of the deterioration of the liquid crystal layer 4 can be captured, it is possible to accurately discriminate the degree of progress of the deterioration of the liquid crystal layer 4.

In the liquid crystal apparatus 1000 of the first embodiment, the first discharging period T4 is longer than a period in which the potentials of the plurality of drive signal lines are held at the maximum value or the minimum value at the time of normal driving.

When the first discharging period T4 is longer than the period in which the potentials of the plurality of drive signal lines are held at the maximum value or the minimum value at the time of normal driving, the potential of the first drive signal line including the clock signal main line 17 and the output control signal line 20 does not become a constant potential in the first discharging period T4. In this case, a rectangular waveform potential variation in the first drive signal line causes the potential of the detection electrode 22 to vary via the coupling capacitance generated between the electrode lead line 23 and the first drive signal line which intersect each other in plan view. However, in the first discharging period T4, the constant potential is supplied to the first conductive layer 25 disposed between the electrode lead line 23 and the first drive signal line, so that the coupling capacitance generated between the electrode lead line 23 and the first drive signal line becomes negligibly small. As a result, in the first discharging period T4, the influence of the potential variation of the first drive signal line on the potential of the detection electrode 22 can be curbed, and the first discharging period can be set to be long. Therefore, since and a slight potential change that appears in the detection electrode 22 depending on the degree of progress of the deterioration of the liquid crystal layer 4 can be captured, it is possible to accurately discriminate the degree of progress of the deterioration of the liquid crystal layer 4.

The liquid crystal apparatus 1000 of the first embodiment further includes the transparent electrode layer 59 disposed between the first substrate 51 and the liquid crystal layer 4 and including the detection electrode 22, the first wiring layer 53 disposed between the first substrate 51 and the transparent electrode layer 59 and including the first drive signal line, the second wiring layer 55 disposed between the first wiring layer 53 and the transparent electrode layer 59 and including the first conductive layer 25, and the third wiring layer 57 disposed between the second wiring layer 55 and the transparent electrode layer 59 and including the electrode lead line 23.

According to the above embodiment, since the detection electrode 22, the electrode lead lines 23, and the first conductive layer 25 can be disposed using a typical wiring structure of the liquid crystal panel 100, it is possible to curb an increase in manufacturing cost.

The liquid crystal apparatus 1000 of the first embodiment further includes the plurality of scanning lines 6, and the scanning line drive circuit 10 that sequentially selects the plurality of scanning lines 6, and the plurality of drive signal lines are electrically coupled to the scanning line drive circuit 10.

In general, the high-amplitude and high-frequency potential variation occurs in a plurality of drive signal lines electrically coupled to the scanning line drive circuit 10. Therefore, when the plurality of drive signal lines include the first drive signal line intersecting with the electrode lead line 23 in plan view, the coupling capacitance generated between the electrode lead line 23 and the first drive signal line becomes a particularly large problem. However, in the present embodiment, since the first conductive layer 25 is disposed between the first drive signal line electrically coupled to the scanning line drive circuit 10 and the electrode lead line 23, the coupling capacitance generated between the first drive signal line in which the high-amplitude and high-frequency potential variation occurs and the electrode lead line 23 can be reduced to a negligible level.

The liquid crystal apparatus 1000 of the first embodiment further includes a plurality of pixel electrodes 7 disposed in the display region E, and the detection electrode 22 is disposed outside the display region E.

In this case, since the amount of the detectable mobile ions 85 increases as an area of the detection electrode 22 increases, the sensitivity to the increase in the mobile ions 85 can be improved.

However, when the area of the detection electrode 22 increases, at least some of the plurality of drive signal lines may overlap the detection electrode 22 in plan view. In this case, the coupling capacitance generated between the plurality of drive signal lines and the detection electrode 22 becomes a problem, but this problem is solved by the third embodiment to be described below.

In the liquid crystal apparatus 1000 of the first embodiment, the measurement circuit 200 supplies a potential to each of the detection electrode 22 and the common electrode 28 so that the potential difference becomes the third potential difference Vp3 having the same polarity as the first potential difference Vp1 and having the absolute value smaller than that of the first potential difference Vp1 in the first relaxation period T2 between the first reverse sweep period T1 and the first charging period T3.

Thus, it is possible to transition from the first reverse sweep period T1 to the first charging period T3 without moving the mobile ions 85 initially disposed in the first reverse sweep period T1 by inserting the first relaxation period T2 between the first reverse sweep period T1 and the first charging period T3.

Accordingly, according to the above embodiment, the progress of the deterioration of the liquid crystal layer 4 can be tracked with high sensitivity from initial use of the liquid crystal panel 100 with higher measurement reproducibility.

In the liquid crystal apparatus 1000 of the first embodiment, the measurement circuit 200 supplies a potential to each of the detection electrode 22 and the common electrode 28 so that the potential difference becomes the fourth potential difference Vp4 having a polarity different from that of the first potential difference Vp1 and having the same absolute value as the first potential difference Vp1 in the second reverse sweep period T5 after the first discharging period T4, supplies a potential to each of the detection electrode 22 and the common electrode 28 so that the potential difference becomes the fifth potential difference Vp5 having a polarity different from that of the fourth potential difference Vp4 in the second charging period T7 after the second reverse sweep period T5, and stops the supply of the potential to the detection electrode 22 and supplies the same potential as that in the second charging period T7 to the common electrode 28 in the second discharging period T8 after the second charging period T7 to measure the detection electrode potential Vd at least once.

As described above, in the present embodiment, the second reverse sweep period T5 is inserted before the second charging period T7 and the second discharging period T8. Accordingly, in the second reverse sweep period T5, the mobile ions 85 included in the liquid crystal layer 4 can be effectively initially disposed in either the common electrode 28 or the detection electrode 22. Thus, by adjusting the initial disposition of the mobile ions 85 before the second charging period T7 starts, it is possible to obtain measurement reproducibility of the measured value of the detection electrode potential Vd obtained in the second discharging period T8. Further, since an influence of an internal electric field due to the mobile ions 85 is also reflected in the measured value, it is easy for an increase in the mobile ions 85 to appear as change in the measured value. As a result, the progress of the deterioration of the liquid crystal layer 4 can be tracked with high sensitivity from initial use of the liquid crystal panel 100.

Further, according to the above embodiment, since the liquid crystal layer 4 is AC-driven, it is possible to curb deterioration of the liquid crystal layer 4 caused by application of a DC voltage to the liquid crystal layer 4 at the time of measurement of the detection electrode potential Vd.

In the liquid crystal apparatus 1000 of the first embodiment, the measurement circuit 200 supplies a potential to each of the detection electrode 22 and the common electrode 28 so that the potential difference becomes a sixth potential difference Vp6 having the same polarity as the fourth potential difference Vp4 and having an absolute value smaller than the absolute value of the fourth potential difference Vp4 in the second relaxation period T6 between the second reverse sweep period T5 and the second charging period T7.

Thus, by inserting the second relaxation period T6 between the second reverse sweep period T5 and the second charging period T7, it is possible to perform transition from the second reverse sweep period T5 to the second charging period T7 without moving the mobile ions 85 initially disposed in the second reverse sweep period T5.

Accordingly, according to the above embodiment, the progress of the deterioration of the liquid crystal layer 4 can be tracked with high sensitivity from initial use of the liquid crystal panel 100 with higher measurement reproducibility.

In the liquid crystal apparatus 1000 of the first embodiment, the measurement circuit 200 includes the first node N1 electrically coupled to the detection electrode 22, the common electrode line L1 electrically coupled to the common electrode 28, the ground potential line L2 to which the ground potential is applied, the first capacitor C1 electrically coupled between the first node N1 and the ground potential line L2, the second capacitor C2 electrically coupled between the common electrode line L1 and the ground potential line L2, the first switch SW1, the second switch SW2, the third switch SW3, the fourth switch SW4, the measurement potential generation circuit 40 that outputs the measurement potential Vs corresponding to the reference voltage Vsref, the third control circuit (the central control circuit 45) that outputs the reference voltage Vs to the measurement potential generation circuit 40 and controls the first to fourth switches SW1 to SW4, and the potential measurement circuit (the amplification circuit 43 and the A/D converter 44) that measures the potential of the first node N1 as the detection electrode potential Vd and outputs the measured value of the detection electrode potential Vd to the central control circuit 45.

The first node N1 is electrically coupled to the ground potential line 12 via the first switch SW1. The first node N1 is electrically coupled to the output terminal of the measurement potential generation circuit 40 via the second switch SW2. The common electrode line L1 is electrically coupled to the ground potential line L2 via the third switch SW3. The common electrode line L1 is electrically coupled to the output terminal of the measurement potential generation circuit 40 via the fourth switch SW4.

By using the measurement circuit 200 having the above configuration, it is possible to realize functions required for the measurement circuit 200 with a simple circuit configuration and to reduce a noise component included in the measured value of the detection electrode potential Vd.

In the liquid crystal apparatus 1000 of the first embodiment, the first switch SW1 and the second switch SW2 are controlled so that the first switch SW1 and the second switch SW2 come to an ON state by the first voltage (5 V), and the third switch SW3 and the fourth switch SW4 are controlled so that the third switch SW3 and the fourth switch SW4 come to an ON state by the second voltage (15 V) higher than the first voltage. Thus, the third switch SW3 and the fourth switch SW4 electrically coupled to the common electrode line L1 are controlled so that the third switch SW3 and the fourth switch SW4 come to an ON state due to a relatively high second voltage, such that on-resistances of the third switches SW3 and the fourth switches SW4 can be reduced, and thus, it is possible to improve the responsiveness of the common electrode line L1 and to curb a leakage current from the detection electrode 22.

As a result, since the first charging period T3 and the second charging period T7 can be shortened, the action of the mobile ions 85 having high mobility can be captured as change in the measured value, and the influence of variation in characteristics of each switch component on the measured value can be curbed. Further, the first switch SW1 and the second switch SW2 are preferably not integrated with the central control circuit 45. For example, the first switch SW1 and the second switch SW2 are mounted as a first integrated circuit chip, and the central control circuit 45 is mounted as a second integrated circuit chip. The central control circuit 45 may include a circuit system driven at high speed and may generate heat to reach a higher temperature. Accordingly, when the first switch SW1 and the second switch SW2 are not integrated with the central control circuit 45, an increase in temperature of the first switch SW1 and the second switch SW2 is reduced, and a leakage current through each switch is curbed. As a result, change in the potential of the detection electrode 22 in the first discharging period T4 or the second discharging period T8 is more suitable for measurement since the action of the mobile ions 85 is more dominated.

2. Second Embodiment

Hereinafter, a second embodiment of the present disclosure will be described. In the second embodiment to be exemplified below, configurations common to the first embodiment are denoted by the same reference signs as those used in the first embodiment, and detailed description thereof will be omitted appropriately.

The liquid crystal apparatus 1000 includes the liquid crystal panel 100A, the measurement circuit 200, and the COF 300. The liquid crystal panel 100A of the second embodiment has a configuration different from the liquid crystal panel 100 of the first embodiment. The configurations of the measurement circuit 200 and the COF 300 are the same as those in the first embodiment. Therefore, hereinafter, a configuration of the liquid crystal panel 100A will be mainly described.

2-1. Overview of Configuration of Liquid Crystal Panel 100A

Figure 17:
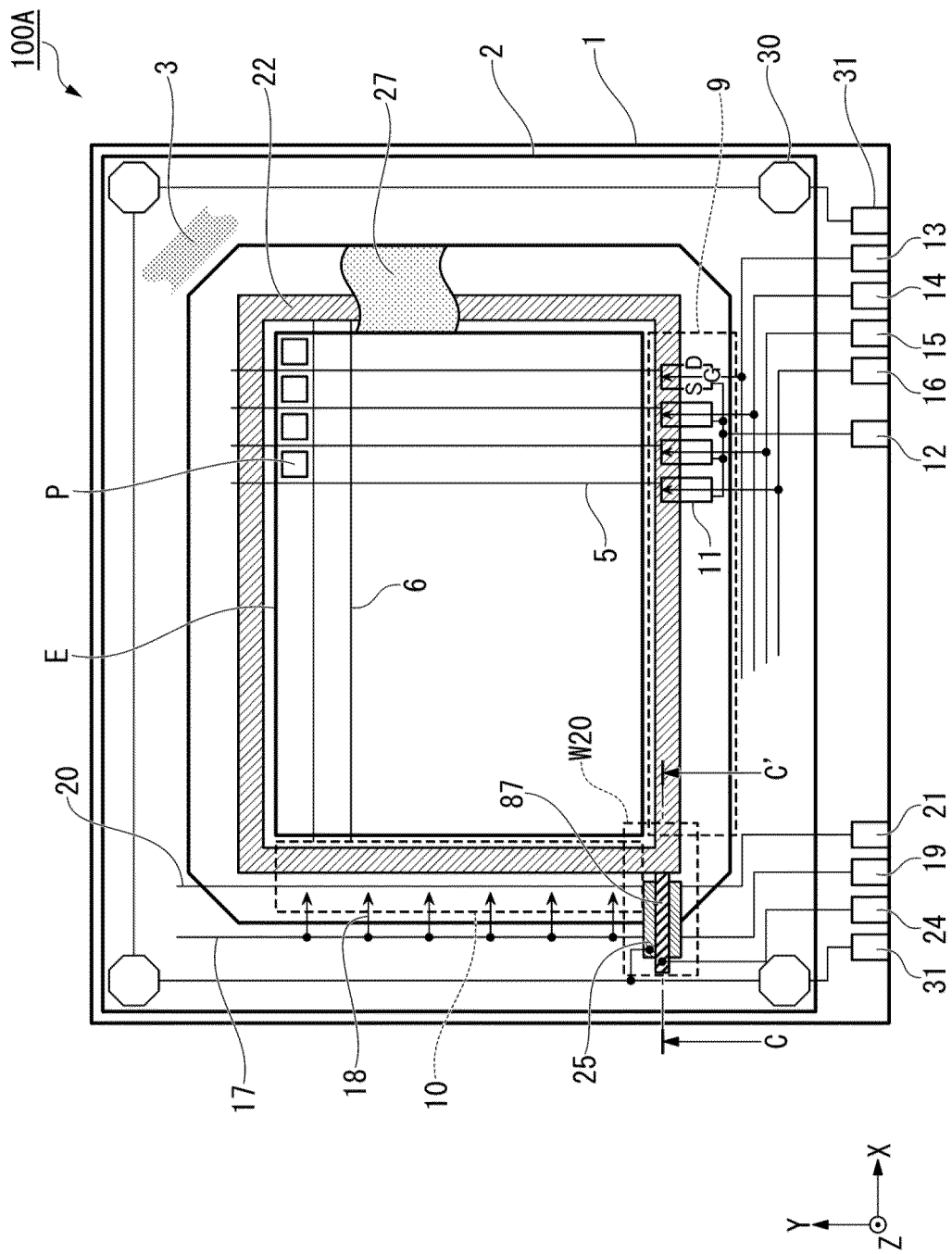
FIG. 17 is a plan view illustrating a schematic configuration of a liquid crystal panel used in a liquid crystal apparatus according to a second embodiment.

FIG. 17 is a plan view illustrating a schematic configuration of the liquid crystal panel 100A used in the liquid crystal apparatus 1000 of the second embodiment. A +X direction may be referred to as rightward or a right side, and a −X direction may be referred to as leftward or a left side, in FIG. 17. Further, a +Y direction is referred to as an upward or upper side, and a −Y direction is referred to as a downward or lower side. Further, viewing from a +Z direction is called a plan view or planar manner.

As illustrated in FIG. 17, the liquid crystal panel 100A includes an electrode lead line 87 instead of the electrode lead line 23 described in the first embodiment. To be more specific, the element substrate 1 of the liquid crystal panel 100A includes the electrode lead line 87 electrically coupled to the detection electrode 22. For example, the electrode lead line 87 extends in the X-axis direction from the lower left corner of the detection electrode 22 to the left side. The detection electrode 22 is electrically coupled to the first electrode coupling terminal 24 via the electrode lead line 87.

As in the first embodiment, the plurality of drive signal lines including the clock signal main line 17, the clock signal branch line 18, and the output control signal line 20 do not overlap the detection electrode 22 in plan view, but the electrode lead line 87 electrically coupled to the detection electrode 22 intersects with the clock signal main line 17 and the output control signal line 20 in plan view. That is, the plurality of drive signal lines include the clock signal main line 17 and the output control signal line 20 as the first drive signal line intersecting the electrode lead line 87 in plan view, similarly to the first embodiment. In the second embodiment, in order to curb the coupling capacitance between the electrode lead line 87 and the first drive signal line, the first conductive layer 25 extending in the X-axis direction is disposed in a region in which the electrode lead line 87 intersects with the first drive signal line. The first conductive layer 25 is disposed between the electrode lead line 87 and the first drive signal line.

Figure 18:
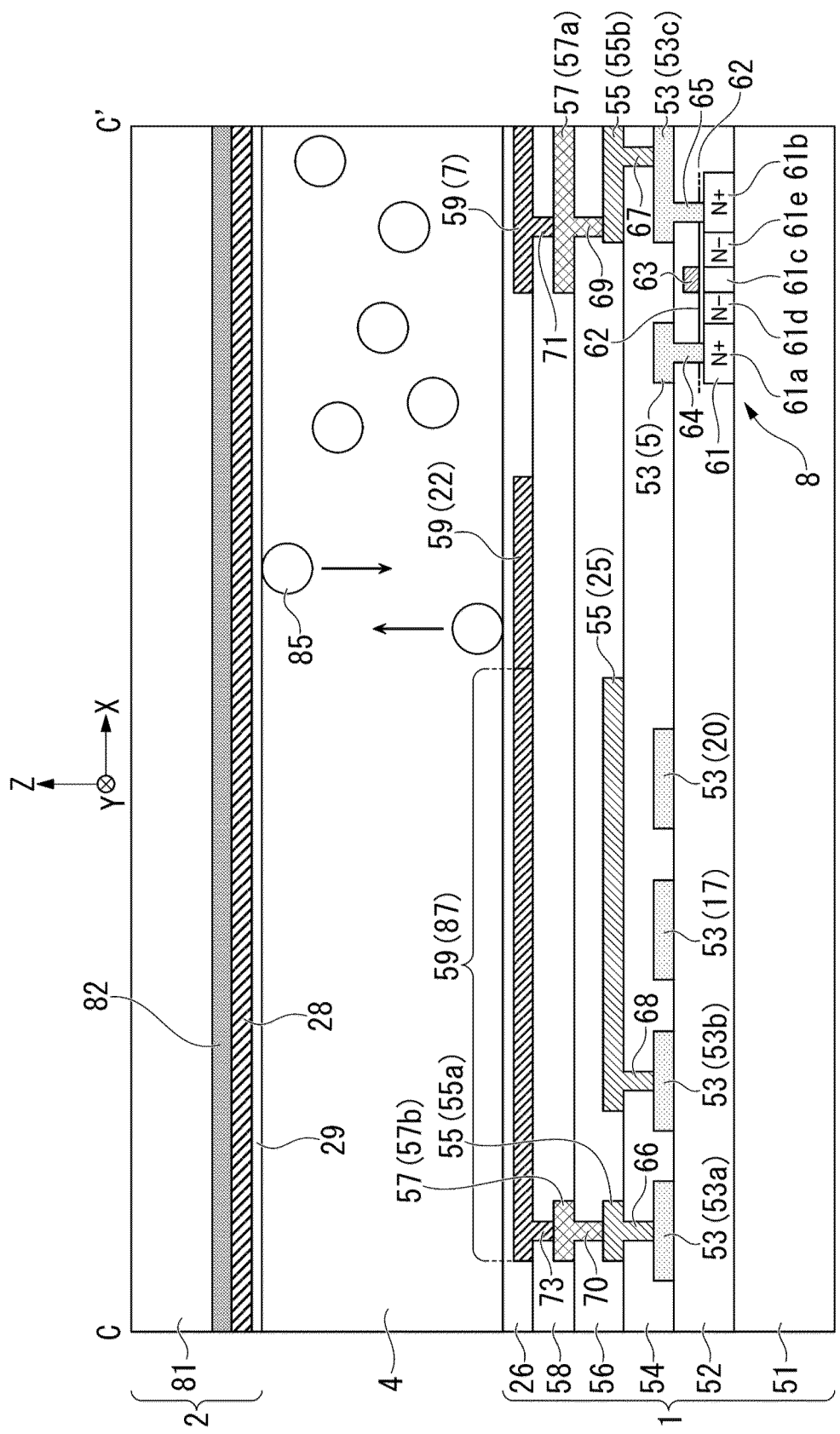
FIG. 18 is a cross-sectional view taken along the line C-C' of a region W20 illustrated in FIG. 17.

FIG. 18 is a cross-sectional view taken along line C-C' of a region W20 illustrated in FIG. 17. In FIG. 18, a +Z direction may be referred to as an upward or upperside, and a −Z direction may be referred to as downward or lower side. Further, in FIG. 18, a +X direction may be referred to as rightward or a right side, and a −X direction may be referred to as leftward or a left side, as in FIG. 17.

As illustrated in FIG. 18, in the second embodiment, the transparent electrode layer 59 of the element substrate 1 includes not only the detection electrode 22 and the pixel electrode 7 but also the electrode lead line 87. That is, the electrode lead line 87 is formed of a transparent conductive material such as ITO, similarly to the detection electrode 22 and the pixel electrode 7. A right end portion of the electrode lead line 87 is electrically coupled to the detection electrode 22. A left end portion of the electrode lead line 87 is electrically coupled to a detection electrode relay line 57b included in the third wiring layer 57 via a contact hole 73.

The detection electrode relay line 57b is electrically coupled to the detection electrode relay line 55a included in the second wiring layer 55 via the contact hole 70. As described in the first embodiment, the detection electrode relay line 55a is electrically coupled to the detection electrode line 53a via a contact holes 66, and the detection electrode line 53a is electrically coupled to the first electrode coupling terminal 24. Therefore, in the liquid crystal panel 100A of the second embodiment, the detection electrode 22 are electrically coupled to the first electrode coupling terminal 24 via the electrode lead line 87 formed in the transparent electrode layer 59 similarly to the detection electrode 22.

The electrode lead line 87 included in the transparent electrode layer 59 extends in the X-axis direction toward the left side from the left end of the detection electrode 22. The clock signal main line 17 and the output control signal line 20 included in the first wiring layer 53 extend in the Y-axis direction and do not overlap the detection electrode 22 in plan view. With such a wiring structure, the electrode lead line 87 electrically coupled to the detection electrode 22 intersects with the first drive signal line including the clock signal main line 17 and the output control signal line 20 in plan view. In the region in which the electrode lead line 87 intersects with the first drive signal line, the first conductive layer 25 extending in the X-axis direction to pass through a region directly above the first drive signal line is disposed in the second wiring layer 55. That is, the first conductive layer 25 is disposed between the electrode lead line 87 and the first drive signal line in the region in which the electrode lead line 87 intersects with the first drive signal line.

As described above, the liquid crystal panel 100A of the second embodiment is different from the liquid crystal panel 100 of the first embodiment in that the transparent electrode layer 59 includes the detection electrode 22 and the electrode lead line 87, and the third wiring layer 57 does not include the electrode lead line 23.

Effects of Second Embodiment

The liquid crystal apparatus 1000 according to the second embodiment includes the transparent electrode layer 59 disposed between the first substrate 51 and the liquid crystal layer 4 and including the detection electrode 22 and the electrode lead line 87, the first wiring layer 53 disposed between the first substrate 51 and the transparent electrode layer 59 and including the first drive signal line, the second wiring layer 55 disposed between the first wiring layer 53 and the transparent electrode layer 59 and including the first conductive layer 25, and the third wiring layer 57 disposed between the second wiring layer 55 and the transparent electrode layer 59.

In the second embodiment, since a region in which a wiring pattern can be freely formed is generated in the third wiring layer 57 in a region in which the electrode lead line 87 and the first drive signal line intersect with each other, it is possible to easily dispose signal wiring, intersection portions of power supply wiring, and the like necessary for a circuit configuration by using the third wiring layer 57, unlike the first embodiment.

3. Third Embodiment

Hereinafter, a third embodiment of the present disclosure will be described. In the third embodiment to be exemplified below, configurations common to the first embodiment are denoted by the same reference signs as those used in the first embodiment, and detailed description thereof will be omitted appropriately.

The liquid crystal apparatus 1000 of the third embodiment includes a liquid crystal panel 100B, a measurement circuit 200, and a COF 300. The liquid crystal panel 100B has a configuration different from that of the liquid crystal panel 100 of the first embodiment. Configurations of the measurement circuit 200 and the COF 300 are the same as those in the first embodiment. Therefore, hereinafter, a configuration of the liquid crystal panel 100B will be mainly described.

3-1. Overview of Configuration of Liquid Crystal Panel 100B

Figure 19:
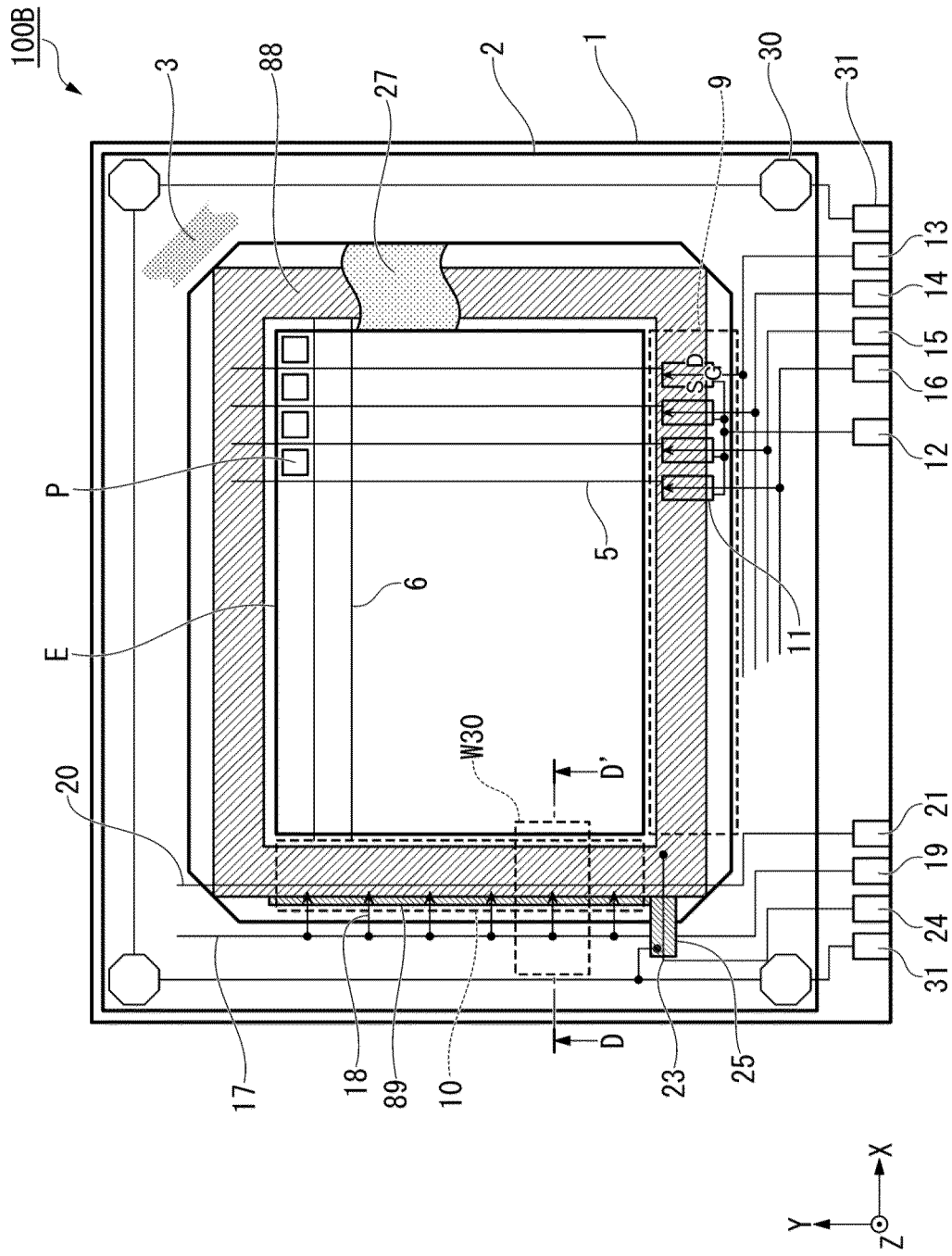
FIG. 19 is a plan view illustrating a schematic configuration of a liquid crystal panel used in a liquid crystal apparatus according to a third embodiment.

FIG. 19 is a plan view illustrating a schematic configuration of the liquid crystal panel 100B used in the liquid crystal apparatus 1000 of the third embodiment. Further, a +X direction may be referred to as rightward or a right side, and a −X direction may be referred to as leftward or a left side, as in FIG. 19. Further, a +Y direction is referred to as an upward or upper side, and a −Y direction is referred to as a downward or lower side. Further, viewing from a +Z direction is called a plan view or planar manner.

As illustrated in FIG. 19, the liquid crystal panel 100B includes a detection electrode 88 having a larger area than the detection electrode 22 of the first embodiment. As a result, in the liquid crystal panel 100B, at least a part of the clock signal branch line 18 and at least a part of the output control signal line 20 overlap the detection electrode 88 in plan view. In the liquid crystal panel 100B, the clock signal main line 17 does not overlap the detection electrode 88 in plan view. The output control signal line 20 is an example of a second drive signal line at least a portion of which overlaps the detection electrode 88 in plan view. The clock signal branch line 18 is an example of a third drive signal line at least a portion of which overlaps the detection electrode 88 in plan view.

Similarly to the first embodiment, in the liquid crystal panel 100B, the electrode lead line 23 electrically coupled to the detection electrode 88 intersects the first drive signal line including the clock signal main lines 17 and the output control signal lines 20 in plan view. In the liquid crystal panel 100B, the first conductive layer 25 extending in the X-axis direction is disposed between the electrode lead line 23 and the first drive signal line in the region in which the electrode lead line 23 intersects with the first drive signal line, similarly to the first embodiment.

In the liquid crystal panel 100B, a second conductive layer 89 extending in the Y-axis direction is disposed between the detection electrode 88 and the clock signal branch line 18 in a region in which the clock signal branch line 18 overlap the detection electrode 88 in plan view. That is, the liquid crystal panel 100B includes the second conductive layer 89, in addition to the first conductive layer 25. As will be described below, in the liquid crystal panel 100B, no conductive pattern is disposed in a region in which the output control signal line 20 overlaps the detection electrode 88 in plan view.

The second conductive layer 89 is electrically coupled to the second electrode coupling terminal 31 via a wiring (not illustrated). That is, the second conductive layer 89 is electrically coupled to the common electrode 28. Therefore, in the liquid crystal panel 100B, the common potential Vcom input to the second electrode coupling terminal 31 is supplied not only to the first conductive layers 25 but also to the second conductive layers 89.

Figure 20:
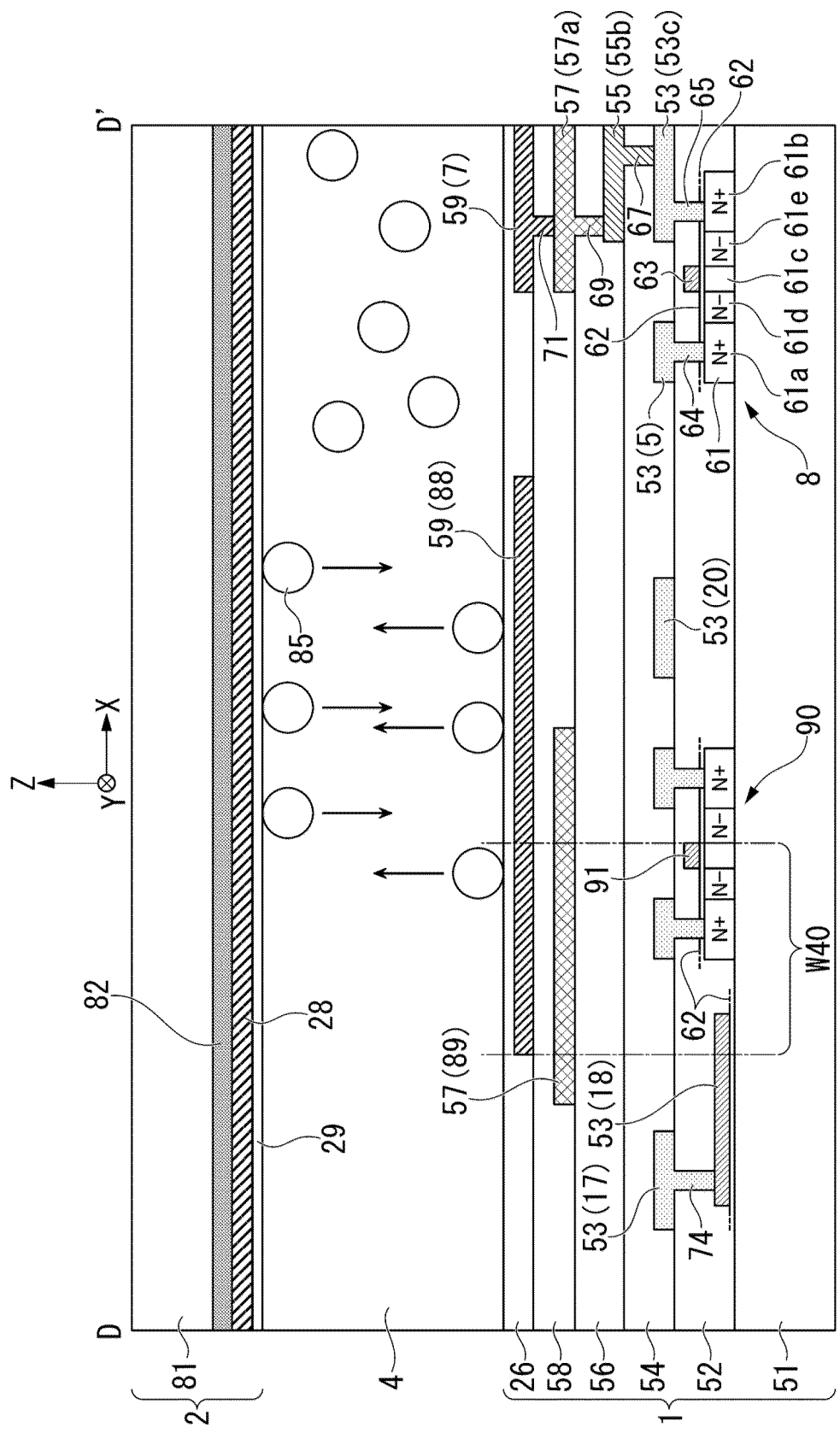
FIG. 20 is a cross-sectional view taken along line D-D' of a region W30 illustrated in FIG. 19.

FIG. 20 is a cross-sectional view taken along line D-D' of a region W30 illustrated in FIG. 19. In FIG. 20, a +Z direction may be referred to as upward or upper side, and a −Z direction may be referred to as downward or lower side. Further, in FIG. 20, a +X direction may be referred to as rightward or a right side, and a −X direction may be referred to as leftward or a left side, as in FIG. 19.

As illustrated in FIG. 20, in the liquid crystal panel 100B, the first wiring layer 53 includes the clock signal main line 17 and the output control signal line 20, and the transparent electrode layer 59 includes the detection electrode 88 and the pixel electrodes 7, similarly to the first embodiment. The clock signal branch line 18 is disposed on the upper surface of the first substrate 51 via the gate insulating film 62. The clock signal branch line 18 extends in the X-axis direction. A left end portion of the clock signal branch line 18 is electrically coupled to the clock signal main line 17 via a contact hole 74. A right end portion of the clock signal branch line 18 is electrically coupled to a gate electrode layer 91 of the switching element 90 constituting the shift register included in the scanning line drive circuit 10. However, in FIG. 20, a coupling between the clock signal branch line 18 and the gate electrode layer 91 of the switching element 90 is not illustrated for the reason of drawing. For example, the switching element 90 is an N-channel TFT. Since a structure of the switching element 90 is the same as that of the pixel switching element 8, description thereof is omitted.

In a region W40 illustrated in FIG. 20, the clock signal branch lines 18 overlap the detection electrode 88 in plan view. Thus, the second conductive layer 89 is disposed on the upper surface of the third insulating film 56 in the region W40 in which the clock signal branch line 18 overlap the detection electrode 88 in plan view. That is, the third wiring layer 57 of the liquid crystal panel 100B includes the second conductive layer 89. With such a wiring structure, the second conductive layer 89 is disposed between the detection electrode 88 and the clock signal branch line 18 in the region W40 in which the clock signal branch line 18 and the detection electrode 88 overlap each other in plan view. The second conductive layer 89 overlaps the switching element 90 in plan view, but does not overlap the output control signal line 20. That is, the second conductive layer 89 is not disposed in the region in which the output control signal line 20 overlaps the detection electrode 88 in plan view. In order to shape a selection waveform of the scanning line 6, the output control signal ENBY preferably has a small time constant by reducing an unnecessary parasitic capacitance. However, the disposition of the second conductive layer 89 in the region in which the output control signal line 20 overlaps the detection electrode 88 in plan view is not prohibited.

3-2. Operation of Liquid Crystal Apparatus 1000 in Third Embodiment

Figure 21:
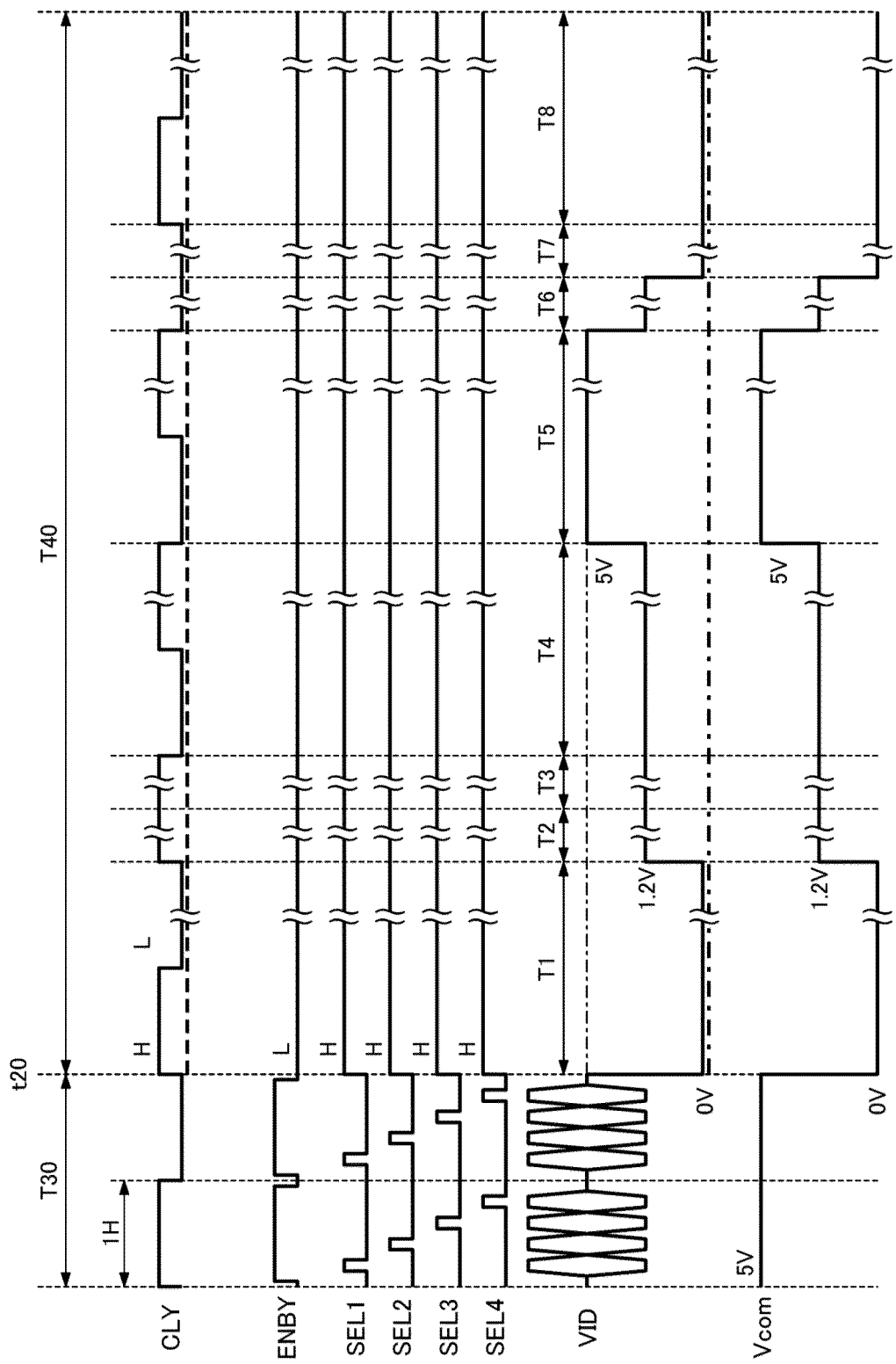
FIG. 21 is a timing chart illustrating an example of a waveform of each signal in a non-measurement period and a measurement period.

Hereinafter, an operation of the liquid crystal apparatus 1000 in the third embodiment will be described with reference to FIG. 21. FIG. 21 is a timing chart illustrating an example of waveforms of the clock signal CLY, the output control signal ENBY, the first to fourth selection signals SEL1 and SEL4, and the video signal VID in a non-measurement period T30 and a measurement period T40. As described above, the non-measurement period T30 is a period in which the liquid crystal apparatus 1000 operates in the normal drive mode, and the measurement period T40 is a period in which the liquid crystal apparatus 1000 operates in the measurement mode. In FIG. 21, "1H" represents one horizontal period. Measurement is started at time t20 in FIG. 21.

As illustrated in FIG. 21, in the non-measurement period T30, the central control circuit 45 and the drive IC 310 cooperate to supply the clock signal CLY having a rectangular waveform and the output control signal ENBY to the liquid crystal panel 100B. That is, in the non-measurement period T30, the first control circuit including the central control circuit 45 and the drive IC 310 changes the potentials of the plurality of drive signal lines into a rectangular waveform. The plurality of drive signal lines include a clock signal main line 17, a clock signal branch line 18, and an output control signal line 20.

Further, in the non-measurement period T30, the central control circuit 45 and the drive IC 310 cooperate to supply the first to fourth selection signals SEL1 and SEL4 and the video signal VID having a rectangular waveform to the liquid crystal panel 100B. That is, in the non-measurement period T30, the second control circuit including the central control circuit 45 and the drive IC 310 changes the potentials of the gate electrodes of the plurality of switching elements 11 included in the signal line drive circuit 9 and the potential supplied to the plurality of signal lines 5 via the plurality of switching elements 11.

Further, as described in the first embodiment, in the non-measurement period T30, the central control circuit 45 controls the first switch SW1, the third switch SW3, and the fourth switch SW4 so that the first switch SW1, the third switch SW3 and the fourth switch SW4 come to an ON state and controls the second switch SW2 and the fifth switch SW5 so that the second switch SW2, and the fifth switch SW5 come to an OFF state. Thus, in the non-measurement period T30, the common potential Vcom output from the common potential generation circuit 41 is supplied to the common electrode 28 of the liquid crystal panel 100B. At the same time, Vsref is adjusted so that the detection electrode 22 becomes Vs=Vcom.

In the measurement period T40, the central control circuit 45 repeatedly executes the first measurement processing and the second measurement processing by controlling the first to fourth switches SW1 to SW4 while maintaining the fifth switch SW5 in an OFF state. Since the first measurement processing and the second measurement processing have been described in the first embodiment, the description will not be repeated here.

Further, in the measurement period T40, the central control circuit 45 and the drive IC 310 cooperate to supply the clock signal CLY having the rectangular waveform and the output control signal ENBY at a low level to the liquid crystal panel 100B. The measurement period T40 includes the first discharging period T4. Therefore, the first control circuit including the central control circuit 45 and the drive IC 310 controls the potential of the output control signal line 20 so that the potential becomes at a low level at least in the first discharging period T4, and changes the potential of the clock signal branch line 18 into a rectangular waveform.

Further, in the measurement period T40, the central control circuit 45 and the drive IC 310 cooperate to supply the first to fourth selection signals SEL1 and SEL4 at a high level and the video signal VID having the same potential as the potential supplied to the common electrode 28 to the liquid crystal panel 100B. That is, at least in the first discharging period T4, the second control circuit including the central control circuit 45 and the drive IC 310 controls the potentials of the gate electrodes of the plurality of switching elements 11 to a potential at which the plurality of switching elements 11 are turned on, and controls the potential supplied to the plurality of signal lines 5 so that the potential becomes the same potential as that of the common electrode 28.

As described above, the first control circuit including the central control circuit 45 and the drive IC 310 controls the potential of the output control signal line 20 so that the potential becomes a low level at least in the first discharging period T4. As a result, the potential of the output control signal line 20 becomes a constant potential at least in the first discharging period T4. Since the second conductive layer 89 electrically coupled to the common electrode 28 is not disposed in the region in which the output control signal line 20 overlaps the detection electrode 88 in plan view, a coupling capacitance is generated between the detection electrode 88 and the output control signal line 20. However, at least in the first discharging period T4, since the potential of the output control signal line 20 is a constant potential, it is possible to curb the influence of the potential of the output control signal line 20 on the potential of the detection electrode 88.

Further, in the first discharging period T4, when the potential of the output control signal line 20 is at a low level, a scanning signal supplied from the scanning line drive circuit 10 to each scanning line 6 is also at a low level. Therefore, even when at least some of the scanning lines 6 overlap the detection electrode 88 in plan view, it is possible to curb the influence of the potential of the scanning lines 6 on the potential of the detection electrode 88 in the first discharging period T4.

The first control circuit including the central control circuit 45 and the drive IC 310 changes the potential of the clock signal branch line 18 into a rectangular waveform at least in the first discharging period T4. In the region W40 in which the clock signal branch line 18 overlaps the detection electrode 88 in plan view, the second conductive layer 89 electrically coupled to the common electrode 28 is disposed between the detection electrode 88 and the clock signal branch line 18. In the first discharging period T4, since a constant potential is supplied to the common electrode 28, the same constant potential as that of the common electrode 28 is also supplied to the second conductive layers 89. With such a configuration, in the first discharging period T4, the coupling capacitance generated between the clock signal branch line 18 and the detection electrode 88 becomes negligibly small. As a result, in the first discharging period T4, it is possible to curb the influence of the potential variation of the clock signal branch line 18 on the potential of the detection electrode 88.

Generally, it is assumed that a clock signal is continuously supplied to the scanning line drive circuit and the like as a rectangular wave signal after the liquid crystal panel is powered on. Therefore, a configuration in which a mode in which supply of the clock signal stops in response to a command from the central control circuit 45 is provided may be adopted. To be specific, as indicated by a dotted line in FIG. 21, the first control circuit including the central control circuit 45 and the drive IC 310 may control the potential of the clock signal branch line 18 to be constant such as a low level, at least in the first discharging period T4.

At least in the first discharging period T4, the second control circuit including the central control circuit 45 and the drive IC 310 controls the potentials of the gate electrodes of the plurality of switching elements 11 so that the potentials become the potential at which the plurality of switching elements 11 are turned on, and controls the potentials supplied to the plurality of signal lines 5 so that the potentials become the same potential as that of the common electrode 28. As a result, at least in the first discharging period T4, the potentials of the gate electrodes of the plurality of switching elements 11 become a constant potential, and the potential of the plurality of signal lines 5 becomes the same potential as that of the common electrode 28. As illustrated in FIG. 20, at least some of the plurality of signal lines 5 and at least some of the gate electrodes of the plurality of switching elements 11 overlap the detection electrode 88 in plan view. Therefore, coupling capacitances are generated between the plurality of signal lines 5 and the detection electrode 88 and between the gate electrodes of the plurality of switching elements 11 and the detection electrode 88. However, at least in the first discharging period T4, since the potentials of the gate electrodes of the plurality of switching elements 11 are constant potentials, and the potentials of the plurality of signal lines 5 are the same potentials as the common electrode 28, it is possible to curb the influence of the potentials on the potential of the detection electrode 88. As indicated by an alternate long and short dash line in FIG. 21, the second control circuit including the central control circuit 45 and the drive IC 310 may control the potential supplied to the plurality of signal lines 5 to be constant such as a low level at least in the first discharging period T4.

Effects of Third Embodiment

The liquid crystal apparatus 1000 of the third embodiment includes the first substrate 51, the liquid crystal layer 4, the second substrate 81 facing the first substrate 51 via the liquid crystal layer 4, the detection electrode 88 disposed between the first substrate 51 and the liquid crystal layer 4, the common electrode 28 disposed between the second substrate 81 and the liquid crystal layer 4, the plurality of drive signal lines (the clock signal main line 17, the clock signal branch line 18, and the output control signal line 20) disposed between the first substrate 51 and the liquid crystal layer 4 and including the second drive signal line (the output control signal line 20) at least portion of which overlaps the detection electrode 88 in plan view, the measurement circuit 200 electrically coupled to each of the detection electrode 88 and the common electrode 28, and the first control circuit (the central control circuit 45 and the drive IC 310) that controls the potentials of the plurality of drive signal lines. The measurement circuit 200 supplies a potential to each of the detection electrode 88 and the common electrode 28 so that the potential difference between the detection electrode 88 and the common electrode 28 becomes the first potential difference Vp1 in the first reverse sweep period T1, supplies a potential to each of the detection electrode 88 and the common electrode 28 so that the potential difference becomes the second potential difference Vp2 having a polarity different from that of the first potential difference Vp1 in the first charging period T3, and stops the supply of the potential to the detection electrode 88 and supplies the same potential as that in the first charging period T3 to the common electrode 28 in the first discharging period T4 to measure the detection electrode potential Vd at least once. The first control circuit controls the potential of the output control signal line 20 so that the potential becomes an inactive level at least in the first discharging period T4.

According to the third embodiment, at least in the first discharging period T4, the potential of the output control signal line 20 becomes at a low level, that is, at a constant potential. Since a conductive pattern electrically coupled to the common electrode 28 is not disposed in the region in which the output control signal line 20 overlaps the detection electrode 88 in plan view, a coupling capacitance is generated between the detection electrode 88 and the output control signal line 20. However, at least in the first discharging period T4, since the potential of the output control signal line 20 is a constant potential, it is possible to curb the influence of the potential of the output control signal line 20 on the potential of the detection electrode 88. Therefore, according to the third embodiment, since, in the first discharging period T4, a slight potential change that appears in the detection electrode 88 depending on the degree of progress of the deterioration of the liquid crystal layer 4 can be captured, it is possible to accurately discriminate the degree of progress of the deterioration of the liquid crystal layer 4.

In addition, according to the third embodiment, since it is possible to allow the plurality of drive signal lines to overlap the detection electrode 88 in plan view, it is possible to increase the area of the detection electrode 88 as compared to the first embodiment. Since the amount of the detectable mobile ions 85 increases as the area of the detection electrode 88 increases, the sensitivity to the increase in the mobile ions 85 can be improved.

The liquid crystal apparatus 1000 of the third embodiment further includes the second conductive layer 89 electrically coupled to the common electrode 28, the plurality of drive signal lines further include the third drive signal line (the clock signal branch line 18) at least portion of which overlaps the detection electrode 88 in a plan view, the second conductive layer 89 is disposed between the detection electrode 88 and the clock signal branch line 18, and the first control circuit changes the potential of the clock signal branch line 18 into a rectangular waveform or controls the potential to be constant at least in the first discharging period T4.

According to the third embodiment, since the constant potential is supplied to the common electrode 28 in the first discharging period T4, the same constant potential as that of the common electrode 28 is also supplied to the second conductive layer 89 disposed between the detection electrode 88 and the clock signal branch line 18. With such a configuration, in the first discharging period T4, the coupling capacitance generated between the clock signal branch line 18 and the detection electrode 88 becomes negligibly small. As a result, in the first discharging period T4, it is possible to curb the influence of the potential variation of the clock signal branch line 18 on the potential of the detection electrode 88.

The liquid crystal apparatus 1000 of the third embodiment further includes the signal line drive circuit 9 including the plurality of switching elements 11 electrically coupled to the plurality of signal lines 5 on a one-to-one basis, and the second control circuit (the central control circuit 45 and the drive IC 310) that controls the potentials of the gate electrodes of the plurality of switching elements 11 and the potentials supplied to the plurality of signal lines 5 via the plurality of switching elements 11, and at least some of the plurality of signal lines 5 and at least some of the gate electrodes of the plurality of switching elements 11 overlap the detection electrode 88 in plan view, and the second control circuit controls the potentials of the gate electrodes of the plurality of switching elements 11 so that the potentials become the potential at which the plurality of switching elements 11 are turned on and controls the potentials supplied to the plurality of signal lines 5 so that the potentials become the same potential as that of the common electrode 28 at least in the first discharging period T4.

According to the third embodiment, at least in the first discharging period T4, the second control circuit controls the potentials of the gate electrodes of the plurality of switching elements 11 so that the potentials become the potential at which the plurality of switching elements 11 are turned on, and controls the potentials supplied to the plurality of signal lines 5 so that the potentials become the same potential as that of the common electrode 28. As a result, at least in the first discharging period T4, the potentials of the gate electrodes of the plurality of switching elements 11 become a constant potential, and the potentials of the plurality of signal lines 5 become the same potential as that of the common electrode 28. At least some of the plurality of signal lines 5 and at least some of the gate electrodes of the plurality of switching elements 11 overlap the detection electrode 88 in plan view. Therefore, coupling capacitances are generated between the plurality of signal lines 5 and the detection electrode 88 and between the gate electrodes of the plurality of switching elements 11 and the detection electrode 88. However, at least in the first discharging period T4, since the potentials of the gate electrodes of the plurality of switching elements 11 are constant potentials, and the potentials of the plurality of signal lines 5 are the same potentials as the common electrode 28, it is possible to curb the influence of the potentials on the potential of the detection electrode 88.

The liquid crystal apparatus 1000 of the third embodiment further includes the electrode lead line 23 disposed between the first substrate 51 and the liquid crystal layer 4 and electrically coupled to the detection electrode 88, and the first conductive layer 25 electrically coupled to the common electrode 28, the plurality of drive signal lines include the first drive signal line (the clock signal main line 17 and the output control signal line 20) that intersects with the electrode lead line 23 in a plan view, and the first conductive layer 25 is arranged between the electrode lead line 23 and the first drive signal line.

According to the third embodiment, in the first discharging period T4, the coupling capacitance generated between the electrode lead line 23 and the first drive signal line intersecting with each other in plan view becomes negligibly small, similarly to the first embodiment. As a result, in the first discharging period T4, an influence of the potential variation of the first drive signal line on the potential of the detection electrode 88 can be curbed, and a slight potential change appearing in the detection electrode 88 depending on the degree of progress of deterioration of the liquid crystal layer 4 can be captured.

4. Overview of Electronic Device

Figure 22:
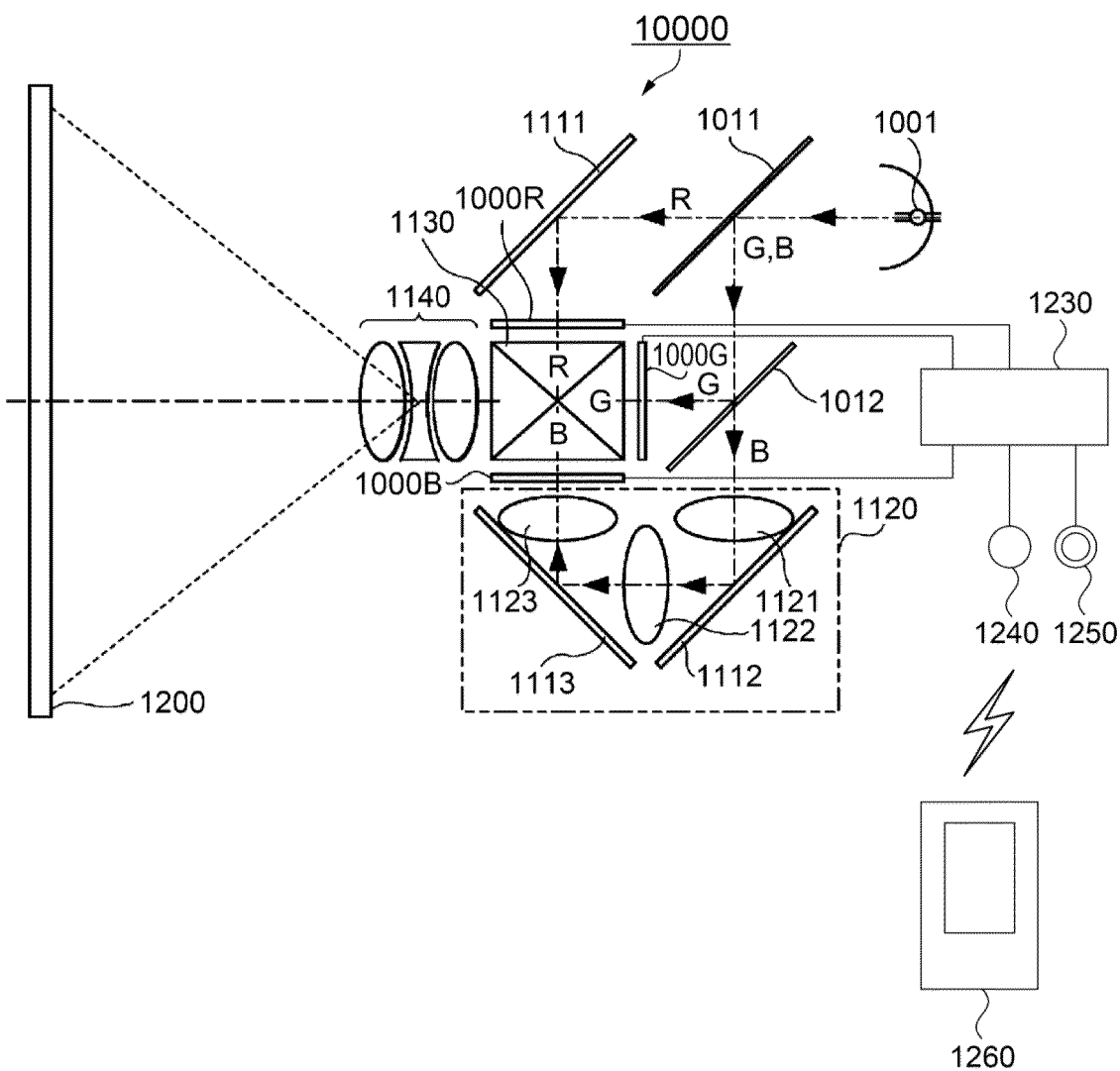
FIG. 22 is an illustrative diagram illustrating a schematic configuration of a projection-type display apparatus as an electronic device.

FIG. 22 is a schematic configuration diagram illustrating a configuration of a projection-type display apparatus serving as an electronic device according to the present embodiment. The projection-type display apparatus 10000 will be described below as an example of an electronic device including the liquid crystal apparatus 1000 of the first embodiment.

The projection-type display apparatus 10000 is a three-panel type projection-type display apparatus and includes a lamp unit 1001 serving as a light source, dichroic mirrors 1011 and 1012 serving as color separation optical systems, a liquid crystal apparatus 1000B corresponding to blue light B, a liquid crystal apparatus 1000G corresponding to green light G, a liquid crystal apparatus 1000R corresponding to red light R, three reflection mirrors 1111, 1112, and 1113, three relay lenses 1121, 1122, and 1123, a dichroic prism 1130 serving as a color synthesis optical system, and a projection lens 1140 serving as a projection optical system. A video is projected onto a screen 1200 by the projection optical system. Further, the relay lenses 1121, 1122, and 1123 and the reflection mirrors 1112 and 1113 form a relay lens system 1120.

Further, the projection-type display apparatus 10000 includes a panel control circuit 1230 that receives measurement data of the deterioration situation of the liquid crystal layer 4 transmitted from the liquid crystal apparatuses 1000B, 1000G, and 1000R, and performs predetermined control based on the received measurement data.

When the panel control circuit 1230 receives data of the deterioration situation of the respective liquid crystal layers 5 from the liquid crystal apparatuses 1000B, 1000G, and 1000R, the panel control circuit 1230 creates and displays display information regarding the deterioration situation of the liquid crystal layer 4 for each of the liquid crystal apparatuses 1000B, 1000G, and 1000R.

Further, the panel control circuit 1230 can report that the liquid crystal panel 100 is reaching the end of the life by lighting a pilot lamp 1240 based on the measurement data of the deterioration situation of the liquid crystal layer 4. For example, when the liquid crystal panel 100 of the liquid crystal apparatus 1000B corresponding to blue is reaching the end of the life, a blue pilot lamp 1240 is turned on. Further, the panel control circuit 1230 may report a deterioration state of the liquid crystal layer 4 of the liquid crystal panel 100 by voice using a speaker 1250. Further, the panel control circuit 1230 may report the deterioration state of the liquid crystal layer 4 of the liquid crystal panel 100 on a remote controller 1260 or a screen of a mobile terminal (not illustrated). A means for reporting the deterioration state of the liquid crystal layer 4 of the liquid crystal panel 100 may be provided, in addition to the display on the liquid crystal apparatuses 1000B, 1000G, and 1000R as described above.

Further, when the panel control circuit 1230 detects from the received measurement data that the liquid crystal panel 100 is reaching the end of the life, the panel control circuit 1230 changes control values regarding control of the liquid crystal apparatuses 1000B, 1000G, and 1000R in order to delay deterioration of the liquid crystal layer 4. For example, it is possible to extend a period of time in which the liquid crystal panel 100 is available, by correcting the control values and, for example, lowering brightness of the lamp unit 1001 that irradiates the liquid crystal apparatuses 1000B, 1000G, and 1000R or changing gradation voltages of the liquid crystal apparatuses 1000B, 1000G, and 1000R to voltage values according to a decrease in brightness of the lamp unit 1001.

5. Overview of Display Screen Example of Measurement Results

Figure 23:
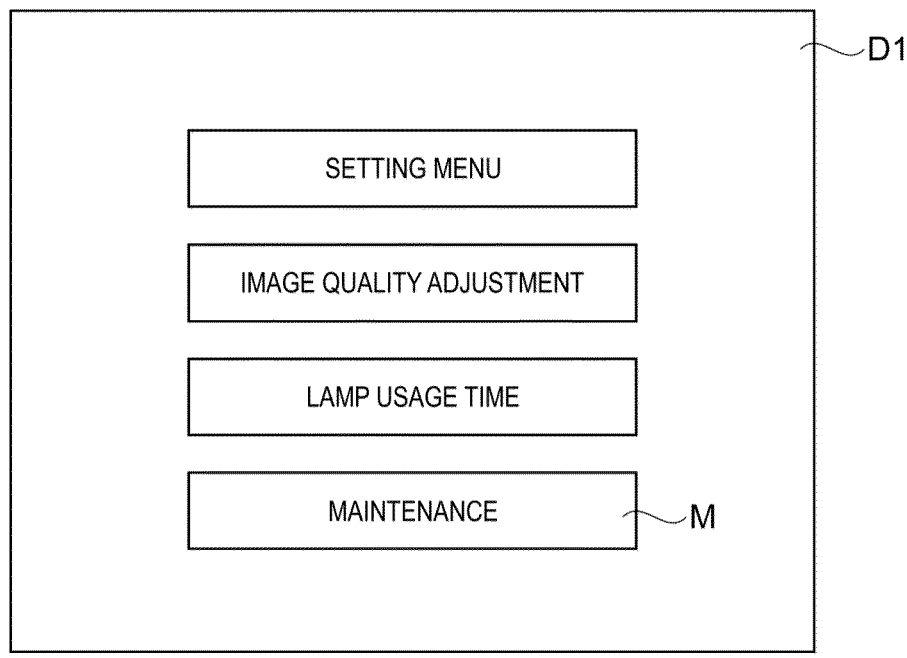
FIG. 23 is an illustrative diagram illustrating an example of a setting menu screen of the projection-type display apparatus.
Figure 24:
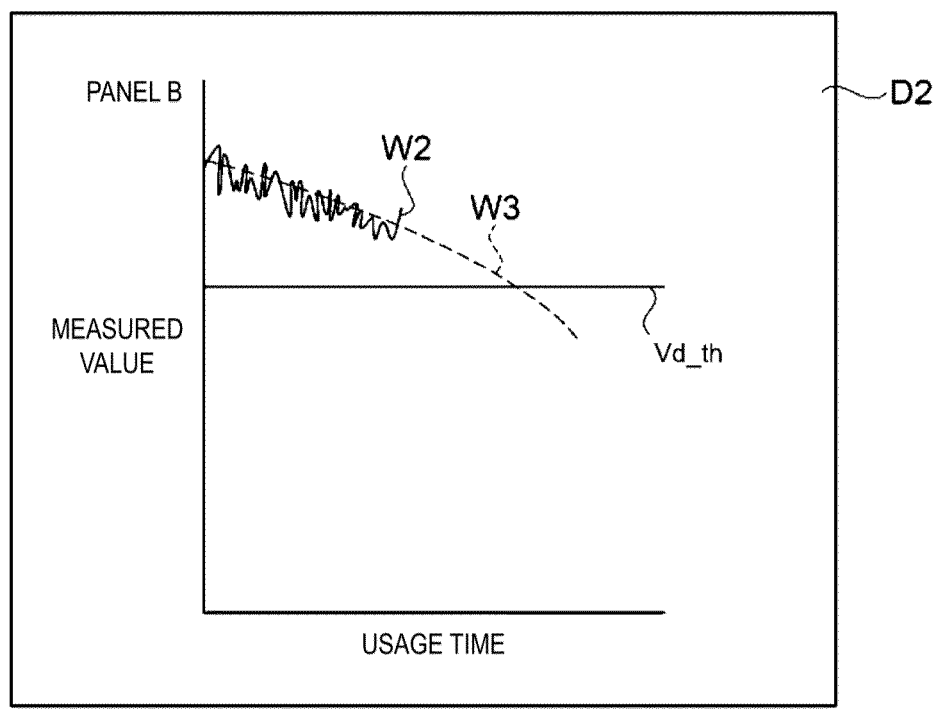
FIG. 24 is an illustrative diagram illustrating an example of a display screen for displaying a deterioration situation of the liquid crystal layer.

FIG. 23 is an illustrative diagram illustrating an example of a setting menu screen of the projection-type display apparatus 10000, and FIG. 24 is an illustrative diagram illustrating an example of a display screen for displaying the deterioration situation of the liquid crystal layer 4.

In FIG. 23, when maintenance M is selected from a setting menu screen D1 projected onto and displayed on the screen 1200, the maintenance menu is displayed, and when a display of the state of the liquid crystal panel 100 is selected therefrom, the panel control circuit 1230 transmits a transmission request for the measurement data of the deterioration situation of the liquid crystal layer 4 to the liquid crystal apparatuses 1000B, 1000G, and 1000R, and displays a display screen D2 as illustrated in FIG. 24 based on the received measurement data of the deterioration situation of the liquid crystal layer 4 of the liquid crystal apparatuses 1000B, 1000G, and 1000R.

The display screen D2 of FIG. 24 is a screen showing the deterioration situation of the liquid crystal layer 4 of the liquid crystal apparatus 1000B. Further, screens showing the deterioration situation of the liquid crystal layers 4 of the liquid crystal apparatuses 1000G and 1000R may be individually displayed by screen switching.

On the display screen D2, a transition line W2 indicating a history of the measured value from the start of usage of the liquid crystal apparatus 1000B to the present, an expected transition line W3 under standard usage conditions, and a line of the threshold Vd_th indicating that the liquid crystal panel 100 is reaching the end of its like are displayed. Further, information on the liquid crystal apparatuses 1000G and 1000R may also be displayed together on the display screen D2. Since it is possible to determine whether or not the usage condition is severer than expected by comparing the transition line W2 with the expected transition line W3, it is possible to perform preventive maintenance such as limiting the brightness of the lamp unit 1001 that irradiates the liquid crystal apparatuses 1000B, 1000G, and 1000R. When the transition line W2 is improved to the expected transition line W3, limitation on the brightness of the lamp unit 1001 may be released.

For the transition line W2 indicating the history of the measured value, a smooth line obtained by averaging a plurality of measured values may be displayed in order to make it easier to discriminate a change trend of the transition line W2. Further, the measured value may be simply displayed as a numerical value, in addition to displaying the transition line W2 indicating the history of the measured value. In this case, a display color of the measured value may be changed through collation with the threshold Vd_th. For example, the measurement may be displayed in green in a state in which the value is greater than the threshold Vd_th, displayed in yellow in a state in which the value approaches the threshold Vd_th, and displayed in red in a state in which the value is equal to or smaller than the threshold Vd_th.

Further, the measured value may be displayed as an index value normalized by an arbitrary value. In this case, for example, when the index value is calculated from the measured value obtained in the second discharging period T8, an index value displayed shortly after the start of usage is, for example, a value close to "1". This value decreases as the deterioration of the liquid crystal layer 4 progresses. Typically, the value tends to decrease as the usage time of the projection-type display apparatus 10000 increases.

Alternatively, when it is expressed in percentage, the value is close to "100," for example. This value decreases as the liquid crystal layer 4 deteriorates. Typically, the value tends to decrease as the usage time of the projection-type display apparatus 10000 increases. Alternatively, when the index value is calculated from the measured value obtained in the first discharging period T4, the index value displayed shortly after the start of usage is, for example, a value close to "O". This value increases with the deterioration of the liquid crystal layer 4. Typically, the value tends to increase as the usage time of the projection-type display apparatus 10000 increases. Using such an index value, the deterioration state of the liquid crystal panel 100 may be displayed using, for example, a bar graph or a pie graph.

When the projection-type display apparatus 10000 is powered on, when the projection-type display apparatus 10000 is powered off, and when measurement of the deterioration situation of the liquid crystal layer 4 is instructed from the maintenance menu, the panel control circuit 1230 transmits a measurement instruction command for the deterioration situation of the liquid crystal layer 4 to the liquid crystal apparatuses 1000B, 1000G, and 1000R. As described in step S10 of the flowchart of FIG. 4, when the liquid crystal apparatuses 1000B, 1000G, and 1000R receive the measurement instruction command for the deterioration situation of the liquid crystal layer 4 from the panel control circuit 1230, the measurement is started.

In general, the preventive maintenance means performing planned maintenance in order to operate the device stably. For a determination of a guideline for replacement of components and the like in this case, there are a division method based on usage time of the components, and a method of evaluating a degree of progress of deterioration of the component. When the liquid crystal panel 100 according to the present disclosure is used, it is possible to obtain, as the measured value, an increase situation of the mobile ions 85 serving as a deterioration index of the liquid crystal layer 4 of the liquid crystal panel 100. Since the change in the measured value can be observed with high sensitivity before display abnormality of the liquid crystal panel 100 appears, the preventive maintenance can be performed. Further, it is also possible to perform predictive maintenance by detecting a behavior of the measured value in which it is easy for stains, unevenness, or the like to occur through analysis using machine learning in comparison with a tendency of transition of the measured value in many individuals.

Although the embodiments of the present disclosure have been described above, the technical scope of the present disclosure is not limited to the above embodiments, and various modifications can be made without departing from the gist of the present disclosure.

Further, in the first embodiment, the second embodiment, and the third embodiment, when the measured value is obtained from only one of the first measurement processing and the second measurement processing, the potential in the charging period (the first charging period T3 or the second charging period T7) may be continuously supplied to the detection electrode 22 in the discharging period (the first discharging period T4 or the second discharging period T8) excluded from measurement targets. Further, although the first conductive layer 25 or the second conductive layer 89 is electrically coupled to the common electrode 28 in the embodiment, for example, a constant potential line such as a ground potential may be electrically coupled in an aspect. Further, although the signal line drive circuit 9 uses the demultiplexer in the embodiment, application to a liquid crystal panel of a phase expansion driving scheme (block sequential driving scheme) is also possible. In this case, the clock signal line and the output control signal line in the signal line drive circuit can be handled like the clock signal line (the clock signal main line 17 and the clock signal branch line 18), the output control signal line 20, and the like of the scanning line drive circuit 10 in each embodiment. In the phase expansion driving scheme, there is an aspect in which a precharge circuit is separately included. Therefore, it is possible to easily control the potential of the signal line 5 by including the precharge circuit and turning on a switch that electrically couples the signal line 5 to a precharge power supply line.

In the first embodiment, the liquid crystal apparatus 1000 including the liquid crystal panel 100 and the measurement circuit 200 provided outside the liquid crystal panel 100 has been exemplified, but a configuration in which the measurement circuit 200 is provided inside the liquid crystal panel 100 may be adopted. That is, the measurement circuit 200 may be disposed on the element substrate 1 together with the signal line drive circuit 9, the scanning line drive circuit 10, and the like. The same applies to the second embodiment and the third embodiment. In each of the embodiments, the potentials of the first electrode and the second electrode are appropriately changed at the time of measurement of the physical property of the liquid crystal layer 4, but this is not mandatory. For example, in an aspect, the potential of the second electrode may be set to a constant potential of 5V, and the potential of the first electrode may be changed appropriately.

In the present embodiment, the projection-type display apparatus 10000 has been exemplified as an electronic device, but the electronic device to which the liquid crystal apparatus 1000 is applied is not limited thereto. For example, the present disclosure may be applied to an electronic device such as a 3D printer that cures a resin liquid using light emitted from the liquid crystal panel 100, a head-up display (HUD), a head mounted display (HMD), a personal computer, a digital camera, or a liquid crystal television. For example, some 3D printers using the liquid crystal panel 100 use UV light, and the deterioration of the liquid crystal panel 100 is a problem. When modeling is started without notice of the fact that the liquid crystal panel 100 is reaching the end of the life, poor curing of the resin liquid or the like may occur during the modeling and may not be noticed until the modeling ends. Here, when the liquid crystal panel 100 according to the present disclosure is used, a deterioration state of the liquid crystal panel 100 can be known. Accordingly, it is possible to replace the liquid crystal panel 100 at an appropriate time as the preventive maintenance by anticipating in advance that poor curing of the resin liquid or the like will occur before the modeling is started.

In the above embodiment, a transmissive liquid crystal apparatus has been exemplified as the liquid crystal apparatus 1000, but a reflective liquid crystal apparatus or a liquid crystal on silicon (LCOS) liquid crystal apparatus may be used as the liquid crystal apparatus 1000.

Conclusion of Present Disclosure

A conclusion of the present disclosure will be appended below.

APPENDIX 1

A liquid crystal apparatus including: a first substrate, a liquid crystal layer, a second substrate facing the first substrate via the liquid crystal layer, a first electrode disposed between the first substrate and the liquid crystal layer, a second electrode disposed between the second substrate and the liquid crystal layer, an electrode lead line disposed between the first substrate and the liquid crystal layer and electrically coupled to the first electrode, a plurality of drive signal lines disposed between the first substrate and the liquid crystal layer and including a first drive signal line intersecting with the electrode lead line in plan view, a first conductive layer disposed between the electrode lead line and the first drive signal line and electrically coupled to the second electrode, and a measurement circuit electrically coupled to each of the first electrode and the second electrode, wherein the measurement circuit supplies a potential to each of the first electrode and the second electrode so that a potential difference between the first electrode and the second electrode becomes a first potential difference in a first period, supplies a potential to each of the first electrode and the second electrode so that the potential difference becomes a second potential difference having a polarity different from that of the first potential difference in a second period after the first period, and stops the supply of the potential to the first electrode and supplies the same potential to the second electrode as that in the second period in a third period after the second period.

As described above, the first period is inserted before the second period and the third period. Thus, in the first period, the mobile ions contained in the liquid crystal layer can be effectively initially disposed in one of the first electrode and the second electrode. Thus, it is possible to obtain measurement reproducibility for the measured value of the potential of the first electrode obtained in the third period by adjusting the initial disposition of the mobile ions before the second period starts. Further, since the influence of the internal electric field due to the mobile ions is also reflected in the measured value, it is easy for an increase in the mobile ions to appear as the change in the measured value. As a result, the progress of the deterioration of the liquid crystal layer can be tracked with high sensitivity from the initial stage of the usage of the liquid crystal panel including the first electrode, the second electrode, and the liquid crystal layer.

Further, in the third period, the same potential as that in the second period is supplied to the second electrode. Therefore, in the third period, the same constant potential as that of the second electrode is supplied to the first conductive layer disposed between the electrode lead line and the first drive signal line. Accordingly, in the third period, the coupling capacitance generated between the electrode lead line and the first drive signal line intersecting with each other in plan view becomes negligibly small. As a result, since, in the third period, the influence of the potential variation of the first drive signal line on the potential of the first electrode can be curbed, and a slight potential change appearing in the first electrode according to the degree of progress of the deterioration of the liquid crystal layer can be captured, it is possible to accurately discriminate the degree of progress of the deterioration of the liquid crystal layer.

APPENDIX 2

The liquid crystal apparatus according to appendix 1, wherein the plurality of drive signal lines do not overlap the first electrode in plan view.

It is possible to avoid generation of a coupling capacitance between the first electrode and the plurality of drive signal lines by adopting the configuration of appendix 2. As a result, since in the third period, the influence of the potential variation of the plurality of drive signal lines on the potential of the first electrode can be further curbed, and the slight potential change appearing in the first electrode according to the degree of progress of the deterioration of the liquid crystal layer can be more accurately captured, it is possible to more accurately discriminate the degree of progress of the deterioration of the liquid crystal layer.

APPENDIX 3

The liquid crystal apparatus according to appendix 1 or 2, further including: a first control circuit configured to control potentials of the plurality of drive signal lines, wherein the first control circuit changes the potentials of the plurality of drive signal lines at least in the third period.

As in appendix 3, when the potentials of the plurality of drive signal lines change in the third period, the potential variation in the first drive signal line causes the potential of the first electrode to vary via the coupling capacitance generated between the electrode lead line and the first drive signal line intersecting each other in plan view. However, in the third discharging period, the constant potential is supplied to the first conductive layer disposed between the electrode lead line and the first drive signal line, so that the coupling capacitance generated between the electrode lead line and the first drive signal line becomes negligibly small. As a result, since, in the third period, the influence of the potential variation of the first drive signal line on the potential of the first electrode can be curbed, and a slight potential change appearing in the first electrode according to the degree of progress of the deterioration of the liquid crystal layer can be captured, it is possible to accurately discriminate the degree of progress of the deterioration of the liquid crystal layer. Further, since the measurement can be performed even when the potential of the first drive signal line changes, it is not necessary to stop the clock signal or the like and it is possible to curb an increase in a register setting of the first control circuit.

APPENDIX 4

The liquid crystal apparatus according to appendix 3, wherein the third period is longer than a period in which the potentials of the plurality of drive signal lines are held at a maximum value or a minimum value at the time of normal driving.

When the third period is longer than the period in which the potentials of the plurality of drive signal lines are held at the maximum value or the minimum value as in appendix 4, the potential of the first drive signal line is not a constant potential in the third period. In this case, the potential variation having a rectangular waveform in the first drive signal line causes the potential of the first electrode to vary via the coupling capacitance generated between the electrode lead line and the first drive signal line that intersect each other in plan view. However, in the third period, the constant potential is supplied to the first conductive layer disposed between the electrode lead line and the first drive signal line, so that the coupling capacitance generated between the electrode lead line and the first drive signal line becomes negligibly small. As a result, in the third period, the influence of the potential variation of the first drive signal line on the potential of the first electrode can be curbed, and the first discharging period can be set to be long. Therefore, since the slight potential change appearing in the first electrode according to the degree of progress of the deterioration of the liquid crystal layer can be captured, it is possible to accurately discriminate the degree of progress of the deterioration of the liquid crystal layer.

APPENDIX 5

The liquid crystal apparatus according to any one of appendices 1 to 4, further including: an electrode layer disposed between the first substrate and the liquid crystal layer and including the first electrode, a first wiring layer disposed between the first substrate and the electrode layer and including the first drive signal line, a second wiring layer disposed between the first wiring layer and the electrode layer and including the first conductive layer, and a third wiring layer disposed between the second wiring layer and the electrode layer and including the electrode lead line.

According to appendix 5, since the first electrode, the electrode lead line, and the first conductive layer can be disposed by using a typical wiring structure of a liquid crystal panel, it is possible to curb an increase in manufacturing cost.

APPENDIX 6

The liquid crystal apparatus according to any one of appendices 1 to 4, further including: an electrode layer disposed between the first substrate and the liquid crystal layer and including the first electrode and the electrode lead line, a first wiring layer disposed between the first substrate and the electrode layer and including the first drive signal line, and a second wiring layer disposed between the first wiring layer and the electrode layer and including the first conductive layer, and a third wiring layer disposed between the second wiring layer and the electrode layer.

According to appendix 6, since a region in which the wiring pattern can be freely formed is generated in the third wiring layer in the region in which the electrode lead line and the first drive signal line intersect with each other, it is possible to easily dispose signal wiring, intersection portions of power supply wiring, and the like necessary for the circuit configuration by using the third wiring layer.

APPENDIX 7

A liquid crystal apparatus including: a first substrate, a liquid crystal layer, a second substrate facing the first substrate via the liquid crystal layer, a first electrode disposed between the first substrate and the liquid crystal layer, a second electrode disposed between the second substrate and the liquid crystal layer, a plurality of drive signal lines disposed between the first substrate and the liquid crystal layer and including a second drive signal line at least a portion of which overlaps the first electrode in plan view, a measurement circuit electrically coupled to each of the first electrode and the second electrode, and a first control circuit configured to control potentials of the plurality of drive signal lines, wherein the measurement circuit supplies a potential to each of the first electrode and the second electrode so that a potential difference between the first electrode and the second electrode becomes a first potential difference in a first period, supplies a potential to each of the first electrode and the second electrode so that the potential difference becomes a second potential difference having a polarity different from that of the first potential difference in a second period after the first period, and stops the supply of the potential to the first electrode and supplies the same potential to the second electrode as that in the second period in a third period after the second period, and the first control circuit controls the potential of the second drive signal line to be constant at least in the third period.

According to appendix 7, the potential of the second drive signal line becomes a constant potential at least in the third period. Since a conductive pattern electrically coupled to the second electrode is not disposed in a region in which the second drive signal line overlaps the first electrode in plan view, a coupling capacitance is generated between the first electrode and the second drive signal line. However, since the potential of the second drive signal line is a constant potential at least in the third period, it is possible to curb the influence of the potential of the second drive signal line on the potential of the first electrode. Therefore, according to appendix 7, since in the third period, the slight potential change that appears in the first electrode according to the degree of progress of the deterioration of the liquid crystal layer can be captured, it is possible to accurately discriminate the degree of progress of the deterioration of the liquid crystal layer.

APPENDIX 8

The liquid crystal apparatus according to appendix 7, further including: a second conductive layer electrically coupled to the second electrode, wherein the plurality of drive signal lines include a third drive signal line at least a portion of which overlaps the first electrode in plan view, wherein the second conductive layer is disposed between the first electrode and the third drive signal line, and the first control circuit changes the potential of the third drive signal line or controls the potential to be constant at least in the third period.

According to appendix 8, since the constant potential is supplied to the second electrode in the third period, the same constant potential as that of the second electrode is also supplied to the second conductive layer disposed between the first electrode and the third drive signal line. With such a configuration, in the third period, a coupling capacitance generated between the third drive signal line and the first electrode becomes negligibly small. As a result, in the third period, it is possible to curb the influence of the potential variation of the third drive signal line on the potential of the first electrode.

APPENDIX 9

The liquid crystal apparatus according to appendix 7 or 8, further including: A plurality of signal lines, a signal line drive circuit including a plurality of switching elements electrically coupled to the plurality of signal lines on a one-to-one basis, and a second control circuit configured to control potentials of gate electrodes of the plurality of switching elements and potentials supplied to the plurality of signal lines via the plurality of switching elements, wherein at least some of the plurality of signal lines and at least some of the gate electrodes of the plurality of switching elements overlap the first electrode in plan view, and the second control circuit controls the potentials of the gate electrodes of the plurality of switching elements to a potential at which the plurality of switching elements are turned on and controls the potentials supplied to the plurality of signal lines to be constant at least in the third period.

According to appendix 9, the second control circuit controls the potential of the gate electrodes of the plurality of switching elements so that the potentials become the potential at which the plurality of switching elements are turned on, and controls the potential supplied to the plurality of signal lines so that the potentials become the same potential as that of the second electrode at least in the third period. As a result, at least in the third period, the potentials of the gate electrodes of the plurality of switching elements become a constant potential, and the potentials of the plurality of signal lines become the same potential as that of the second electrode. At least some of the plurality of signal lines and at least some of the gate electrodes of the plurality of switching elements overlap the first electrode in plan view. Therefore, a coupling capacitance is generated between the plurality of signal lines and the first electrode and between the gate electrodes of the plurality of switching elements and the first electrode. However, since at least in the third period, the potentials of the gate electrodes of the plurality of switching elements are constant potentials, and the potentials of the plurality of signal lines are the same as the potential of the common electrode, an influence of these potentials on the potential of the first electrode can be curbed.

APPENDIX 10

The liquid crystal apparatus according to any one of appendices 7 to 9, further including: an electrode lead line disposed between the first substrate and the liquid crystal layer and electrically coupled to the first electrode, and a first conductive layer electrically coupled to the second electrode, wherein the plurality of drive signal lines include a first drive signal line intersecting the electrode lead line in plan view, and the first conductive layer is disposed between the electrode lead line and the first drive signal line.

According to appendix 10, in the third period, the coupling capacitance generated between the electrode lead line and the first drive signal line intersecting with each other in plan view becomes negligibly small. As a result, in the third period, the influence of the potential variation of the first drive signal line on the potential of the first electrode can be curbed, and the slight potential change appearing in the first electrode according to the degree of progress of the deterioration of the liquid crystal layer can be captured.

APPENDIX 11

The liquid crystal apparatus according to any one of appendices 1 to 10, further including: a plurality of scanning lines, and
 a scanning line drive circuit configured to sequentially select the plurality of scanning lines, wherein the plurality of drive signal lines are electrically coupled to the scanning line drive circuit.

In general, a high-amplitude and high-frequency potential variation occurs in a plurality of drive signal lines electrically coupled to the scanning line drive circuit. Therefore, when the plurality of drive signal lines described above include the first drive signal line intersecting with the electrode lead line in plan view, the coupling capacitance generated between the electrode lead line and the first drive signal line becomes a particularly large problem. However, in the configuration of appendix 11, since the first conductive layer is disposed between the first drive signal line electrically coupled to the scanning line drive circuit and the electrode lead line, the coupling capacitance generated between the first drive signal line in which the high-amplitude and high-frequency potential variation occurs and the electrode lead line can be reduced to a negligible level.

APPENDIX 12

The liquid crystal apparatus according to any one of appendices 1 to 11, further including: a plurality of pixel electrodes disposed in a display region, wherein the first electrode is provided outside the display region.

According to appendix 12, since the first electrode is disposed outside the display region, it is possible to increase an area of the first electrode while sufficiently securing an area of the pixel electrode in the display region. Since the amount of the detectable mobile ions increases as the area of the first electrode increases, the sensitivity to the increase in the mobile ions can be improved.

APPENDIX 13

The liquid crystal apparatus according to any one of appendices 1 to 12, wherein to each of the first electrode and the second electrode so that the potential difference becomes a third potential difference having the same polarity as the first potential difference and having an absolute value smaller than the absolute value of the first potential difference in a fourth period between the first period and the second period.

It is possible to perform transition from the first period to the second period without moving the mobile ions initially disposed in the first period by inserting the fourth period between the first period and the second period, as in appendix 13. Accordingly, according to appendix 13, it is possible to track the progress of the deterioration of the liquid crystal layer with high sensitivity from the initial use of the liquid crystal panel with higher measurement reproducibility.

APPENDIX 14

The liquid crystal apparatus according to any one of appendices 1 to 13, wherein
the measurement circuit
supplies a potential to each of the first electrode and the second electrode so that the potential difference becomes a fourth potential difference having a polarity different from that of the first potential difference and having the same absolute value as that of the first potential difference in a fifth period after the third period,
supplies a potential to each of the first electrode and the second electrode so that the potential difference becomes a fifth potential difference having a polarity different from the fourth potential difference in a sixth period after the fifth period, and
stops the supply of the potential to the first electrode and supplies the same potential as that in the sixth period to the second electrode in a seventh period after the sixth period.

As in appendix 14, the fifth period is inserted before the sixth period and the seventh period. Thus, in the fifth period, the mobile ions contained in the liquid crystal layer can be effectively initially disposed in one of the first electrode and the second electrode. Thus, it is possible to obtain measurement reproducibility for the measured value of the potential of the first electrode obtained in the seventh period by adjusting the initial disposition of the mobile ions before the sixth period starts. Further, since the influence of the internal electric field due to the mobile ions is also reflected in the measured value, it is easy for an increase in the mobile ions to appear as the change in the measured value. As a result, the progress of the deterioration of the liquid crystal layer can be tracked with high sensitivity from the initial stage of the usage of the liquid crystal panel.

Further, according to appendix 14, since the liquid crystal layer is AC-driven, it is possible to curb deterioration of the liquid crystal layer caused by application of a DC voltage to the liquid crystal layer at the time of measurement of the potential of the first detection electrode.

APPENDIX 15

The liquid crystal apparatus according to appendix 14, wherein
the measurement circuit supplies a potential to each of the first electrode and the second electrode so that the potential difference becomes a sixth potential difference having the same polarity as the fourth potential difference and having an absolute value smaller than the absolute value of the fourth potential difference in an eighth period between the fifth period and the sixth period.

As in appendix 15, it is possible to transition from the fifth period to the sixth period without moving the mobile ions initially disposed in the fifth period by inserting the eighth period between the fifth period and the sixth period. Accordingly, according to appendix 15, it is possible to track the progress of the deterioration of the liquid crystal layer with high sensitivity from the initial use of the liquid crystal panel with higher measurement reproducibility.

APPENDIX 16

The liquid crystal apparatus according to any one of appendices 1 to 15, wherein the measurement circuit includes: a first node electrically coupled to the first electrode, a second electrode line electrically coupled to the second electrode,
a ground potential line to which a ground potential is applied, a first capacitor electrically coupled between the first node and the ground potential line, a second capacitor electrically coupled between the second electrode line and the ground potential line, a first switch, a second switch, a third switch, a fourth switch, a measurement potential generation circuit configured to output a measurement potential corresponding to a reference voltage, a third control circuit configured to output the reference voltage to the measurement potential generation circuit and control the first to fourth switches, and a potential measurement circuit configured to measure a potential of the first node as a potential of the first electrode and output the potential to the third control circuit, the first node is electrically coupled to the ground potential line via the first switch, the first node is electrically coupled to an output terminal of the measurement potential generation circuit via the second switch, the second electrode line is electrically coupled to the ground potential line via the third switch, and the second electrode line is electrically coupled to the output terminal of the measurement potential generation circuit via the fourth switch.

By using the measurement circuit having the configuration of appendix 16, it is possible to realize functions required for the measurement circuit with a simple circuit configuration and to reduce a noise component included in the measured value of the first potential.

APPENDIX 17

The liquid crystal apparatus according to appendix 16, wherein the first switch and the second switch are controlled to be in an ON state by a first voltage, and the third switch and the fourth switch are controlled to be in an ON state by a second voltage higher than the first voltage.

As described above, since the third switch and the fourth switch electrically coupled to the second electrode line are controlled to be in an ON state by the relatively high second voltage, an ON resistance of the third switch and the fourth switch can be reduced, and thus, the responsiveness of the second electrode line can be improved, and the leakage current from the first electrode can be curbed. As a result, since the second period and the sixth period can be shortened, it is possible to capture the action of the mobile ions having high mobility as change in the measured value, and to curb an influence of variation in characteristics of each switch component on the measured value.

APPENDIX 18

An electronic device including the liquid crystal apparatus according to any one of appendices 1 to 17.

What is claimed is:

1. A liquid crystal apparatus comprising:
a first substrate;
a liquid crystal layer;
a second substrate facing the first substrate via the liquid crystal layer;
a first electrode disposed between the first substrate and the liquid crystal layer;
a second electrode disposed between the second substrate and the liquid crystal layer;
an electrode lead line disposed between the first substrate and the liquid crystal layer and electrically coupled to the first electrode;
a plurality of drive signal lines disposed between the first substrate and the liquid crystal layer and including a first drive signal line intersecting with the electrode lead line in plan view;
a first conductive layer disposed between the electrode lead line and the first drive signal line and electrically coupled to the second electrode; and
a measurement circuit electrically coupled to each of the first electrode and the second electrode, wherein
the measurement circuit
supplies a potential to each of the first electrode and the second electrode so that a potential difference between the first electrode and the second electrode becomes a first potential difference in a first period,
supplies a potential to each of the first electrode and the second electrode so that the potential difference becomes a second potential difference having a polarity different from that of the first potential difference in a second period after the first period, and
stops the supply of the potential to the first electrode and supplies the same potential to the second electrode as that in the second period in a third period after the second period.

2. The liquid crystal apparatus according to claim 1, wherein
the plurality of drive signal lines do not overlap the first electrode in plan view.

3. The liquid crystal apparatus according to claim 1, further comprising:
a first control circuit configured to control potentials of the plurality of drive signal lines, wherein
the first control circuit changes the potentials of the plurality of drive signal lines at least in the third period.

4. The liquid crystal apparatus according to claim 3, wherein
the third period is longer than a period in which the potentials of the plurality of drive signal lines are held at a maximum value or a minimum value at the time of normal driving.

5. The liquid crystal apparatus according to claim 1, further comprising:
an electrode layer disposed between the first substrate and the liquid crystal layer and including the first electrode;
a first wiring layer disposed between the first substrate and the electrode layer and including the first drive signal line;
a second wiring layer disposed between the first wiring layer and the electrode layer and including the first conductive layer; and
a third wiring layer disposed between the second wiring layer and the electrode layer and including the electrode lead line.

6. The liquid crystal apparatus according to claim 1, further comprising:
an electrode layer disposed between the first substrate and the liquid crystal layer and including the first electrode and the electrode lead line;
a first wiring layer disposed between the first substrate and the electrode layer and including the first drive signal line; and
a second wiring layer disposed between the first wiring layer and the electrode layer and including the first conductive layer; and
a third wiring layer disposed between the second wiring layer and the electrode layer.

7. A liquid crystal apparatus comprising:
a first substrate;
a liquid crystal layer;
a second substrate facing the first substrate via the liquid crystal layer;
a first electrode disposed between the first substrate and the liquid crystal layer;
a second electrode disposed between the second substrate and the liquid crystal layer;
a plurality of drive signal lines disposed between the first substrate and the liquid crystal layer and including a second drive signal line at least a portion of which overlaps the first electrode in plan view;
a measurement circuit electrically coupled to each of the first electrode and the second electrode; and
a first control circuit configured to control potentials of the plurality of drive signal lines, wherein
the measurement circuit
supplies a potential to each of the first electrode and the second electrode so that a potential difference between the first electrode and the second electrode becomes a first potential difference in a first period,
supplies a potential to each of the first electrode and the second electrode so that the potential difference becomes a second potential difference having a polarity different from that of the first potential difference in a second period after the first period, and
stops the supply of the potential to the first electrode and supplies the same potential to the second electrode as that in the second period in a third period after the second period, and
the first control circuit controls the potential of the second drive signal line to be constant at least in the third period.

8. The liquid crystal apparatus according to claim 7, further comprising:
a second conductive layer electrically coupled to the second electrode, wherein
the plurality of drive signal lines include a third drive signal line at least a portion of which overlaps the first electrode in plan view, wherein
the second conductive layer is disposed between the first electrode and the third drive signal line, and
the first control circuit changes a potential of the third drive signal line or controls the potential to be constant at least in the third period.

9. The liquid crystal apparatus according to claim 7, further comprising:
a plurality of signal lines;
a signal line drive circuit including a plurality of switching elements electrically coupled to the plurality of signal lines on a one-to-one basis; and
a second control circuit configured to control potentials of gate electrodes of the plurality of switching elements and potentials supplied to the plurality of signal lines via the plurality of switching elements, wherein at least some of the plurality of signal lines and at least some of the gate electrodes of the plurality of switching elements overlap the first electrode in plan view, and the second control circuit controls the potentials of the gate electrodes of the plurality of switching elements to a potential at which the plurality of switching elements are turned on and controls the potentials supplied to the plurality of signal lines to be constant at least in the third period.

10. The liquid crystal apparatus according to claim 7, further comprising:

an electrode lead line disposed between the first substrate and the liquid crystal layer and electrically coupled to the first electrode; and a first conductive layer electrically coupled to the second electrode, wherein the plurality of drive signal lines include a first drive signal line intersecting the electrode lead line in plan view, and the first conductive layer is disposed between the electrode lead line and the first drive signal line.

11. The liquid crystal apparatus according to claim 1, further comprising:

a plurality of scanning lines; and a scanning line drive circuit configured to sequentially select the plurality of scanning lines, wherein the plurality of drive signal lines are electrically coupled to the scanning line drive circuit.

12. The liquid crystal apparatus according to claim 1, further comprising:

a plurality of pixel electrodes disposed in a display region, wherein the first electrode is provided outside the display region.

13. The liquid crystal apparatus according to claim 1, wherein the measurement circuit supplies a potential to each of the first electrode and the second electrode so that the potential difference becomes a third potential difference having the same polarity as the first potential difference and having an absolute value smaller than the absolute value of the first potential difference in a fourth period between the first period and the second period.

14. The liquid crystal apparatus according to claim 1, wherein the measurement circuit supplies a potential to each of the first electrode and the second electrode so that the potential difference becomes a fourth potential difference having a polarity different from that of the first potential difference and having the same absolute value as that of the first potential difference in a fifth period after the third period, supplies a potential to each of the first electrode and the second electrode so that the potential difference becomes a fifth potential difference having a polarity different from the fourth potential difference in a sixth period after the fifth period, and stops the supply of the potential to the first electrode and supplies the same potential as that in the sixth period to the second electrode in a seventh period after the sixth period.

15. The liquid crystal apparatus according to claim 14, wherein the measurement circuit supplies a potential to each of the first electrode and the second electrode so that the potential difference becomes a sixth potential difference having the same polarity as the fourth potential difference and having an absolute value smaller than the absolute value of the fourth potential difference in an eighth period between the fifth period and the sixth period.

16. The liquid crystal apparatus according to claim 1, wherein the measurement circuit includes:

a first node electrically coupled to the first electrode;

a second electrode line electrically coupled to the second electrode;

a ground potential line to which a ground potential is applied;

a first capacitor electrically coupled between the first node and the ground potential line;

a second capacitor electrically coupled between the second electrode line and the ground potential line;

a first switch;

a second switch;

a third switch;

a fourth switch;

a measurement potential generation circuit configured to output a measurement potential corresponding to a reference voltage;

a third control circuit configured to output the reference voltage to the measurement potential generation circuit and control the first to fourth switches; and a potential measurement circuit configured to measure a potential of the first node as a potential of the first electrode and output the potential to the third control circuit, the first node is electrically coupled to the ground potential line via the first switch, the first node is electrically coupled to an output terminal of the measurement potential generation circuit via the second switch, the second electrode line is electrically coupled to the ground potential line via the third switch, and the second electrode line is electrically coupled to the output terminal of the measurement potential generation circuit via the fourth switch.

17. The liquid crystal apparatus according to claim 16, wherein the first switch and the second switch are controlled to be in an ON state by a first voltage, and the third switch and the fourth switch are controlled to be in an ON state by a second voltage higher than the first voltage.

18. An electronic device comprising the liquid crystal apparatus according to claim 1.

* * * * *